(12) United States Patent
Yamazaki et al.

(10) Patent No.: US 8,232,880 B2
(45) Date of Patent: Jul. 31, 2012

(54) SEMICONDUCTOR DEVICE

(75) Inventors: Shunpei Yamazaki, Tokyo (JP); Jun Koyama, Kanagawa (JP); Masato Ishii, Kanagawa (JP); Tomoaki Atsumi, Kanagawa (JP); Takeshi Osada, Kanagawa (JP); Takayuki Ikeda, Kanagawa (JP); Yoshiyuki Kurokawa, Kanagawa (JP); Yutaka Shionoiri, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 842 days.

(21) Appl. No.: 11/716,018

(22) Filed: Mar. 9, 2007

(65) Prior Publication Data

US 2007/0229279 A1    Oct. 4, 2007

(30) Foreign Application Priority Data

Mar. 10, 2006    (JP) .................................. 2006-066808

(51) Int. Cl.
  *G08B 13/14*    (2006.01)
(52) U.S. Cl. .................. 340/572.7; 340/10.1; 340/572.1
(58) Field of Classification Search .... 340/572.1–572.8, 340/10.1
  See application file for complete search history.

(56) References Cited

U.S. PATENT DOCUMENTS

| | | | |
|---|---|---|---|
| 5,124,699 A * | 6/1992 | Tervoert et al. ............. | 340/10.2 |
| 5,790,946 A * | 8/1998 | Rotzoll ...................... | 455/343.1 |
| 6,427,913 B1 * | 8/2002 | Maloney ..................... | 235/383 |
| 6,509,217 B1 | 1/2003 | Reddy | |
| 6,737,302 B2 | 5/2004 | Arao | |
| 6,837,438 B1 | 1/2005 | Takasugi et al. | |
| 7,180,421 B2 * | 2/2007 | Pahlaven et al. .......... | 340/572.1 |
| 7,209,771 B2 * | 4/2007 | Twitchell, Jr. ............. | 455/574 |
| 7,301,830 B2 * | 11/2007 | Takahashi et al. .......... | 365/194 |
| 7,394,382 B2 * | 7/2008 | Nitzan et al. .............. | 340/572.8 |
| 2002/0049714 A1 | 4/2002 | Yamazaki et al. | |
| 2003/0017804 A1 * | 1/2003 | Heinrich et al. ............. | 455/41 |
| 2003/0104848 A1 * | 6/2003 | Brideglall .................... | 455/574 |
| 2004/0077383 A1 * | 4/2004 | Lappetelainen et al. ..... | 455/574 |
| 2004/0128246 A1 | 7/2004 | Takayama et al. | |
| 2004/0131897 A1 * | 7/2004 | Jenson et al. ................ | 429/7 |
| 2004/0145454 A1 | 7/2004 | Powell et al. | |
| 2005/0020321 A1 * | 1/2005 | Rotzoll ........................ | 455/572 |
| 2005/0215119 A1 | 9/2005 | Kaneko | |
| 2005/0254183 A1 | 11/2005 | Ishida et al. | |
| 2006/0009251 A1 * | 1/2006 | Noda et al. ................ | 455/550.1 |

(Continued)

FOREIGN PATENT DOCUMENTS

JP    10-069533 A    3/1998

(Continued)

OTHER PUBLICATIONS

International Search Report (Application No. PCT/JP2007/054609) dated Jun. 19, 2007.

(Continued)

*Primary Examiner* — Eric M Blount
(74) *Attorney, Agent, or Firm* — Eric J. Robinson; Robinson Intellectual Property Law Office, P.C.

(57) ABSTRACT

The present invention provides a battery as a power supply for supplying power in the RFID, and another antenna for charging the battery, in addition to an antenna which transmits and receives individual information to and from outside as a means for supplying power to the battery.

15 Claims, 33 Drawing Sheets

U.S. PATENT DOCUMENTS

| | | |
|---|---|---|
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229281 A1* | 10/2007 | Shionoiri et al. .......... 340/572.7 |
| 2007/0278998 A1 | 12/2007 | Koyama |
| 2007/0285246 A1 | 12/2007 | Koyama |

FOREIGN PATENT DOCUMENTS

| | | |
|---|---|---|
| JP | 10-307898 | 11/1998 |
| JP | 2000-137779 A | 5/2000 |
| JP | 2000-172812 A | 6/2000 |
| JP | 2001-067446 A | 3/2001 |
| JP | 2002-042076 A | 2/2002 |
| JP | 2003-006592 | 1/2003 |
| JP | 2003-070187 | 3/2003 |
| JP | 2003-299255 | 10/2003 |
| JP | 2004-343410 | 12/2004 |
| JP | 2004343410 A * | 12/2004 |
| JP | 2005-316724 | 11/2005 |
| JP | 2005323019 A * | 11/2005 |
| JP | 2005-352434 | 12/2005 |
| JP | 2005-354888 | 12/2005 |
| JP | 2006-004015 | 1/2006 |
| JP | 2006-024087 | 1/2006 |
| JP | 2006-503376 | 1/2006 |
| JP | 2008306689 A * | 12/2008 |
| JP | 2009021970 A * | 1/2009 |

OTHER PUBLICATIONS

Written Opinion (Application No. PCT/JP2007/054609) dated Jun. 19, 2007.

Office Action (Application No. 200780008583.0) Dated Mar. 10, 2010.

* cited by examiner

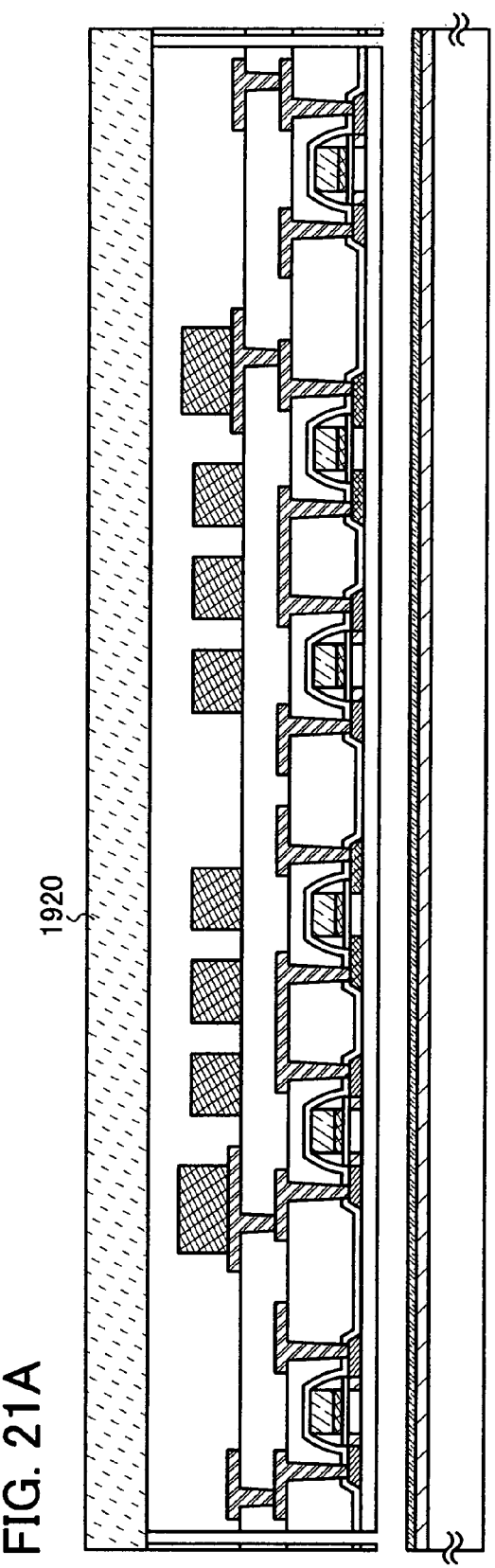
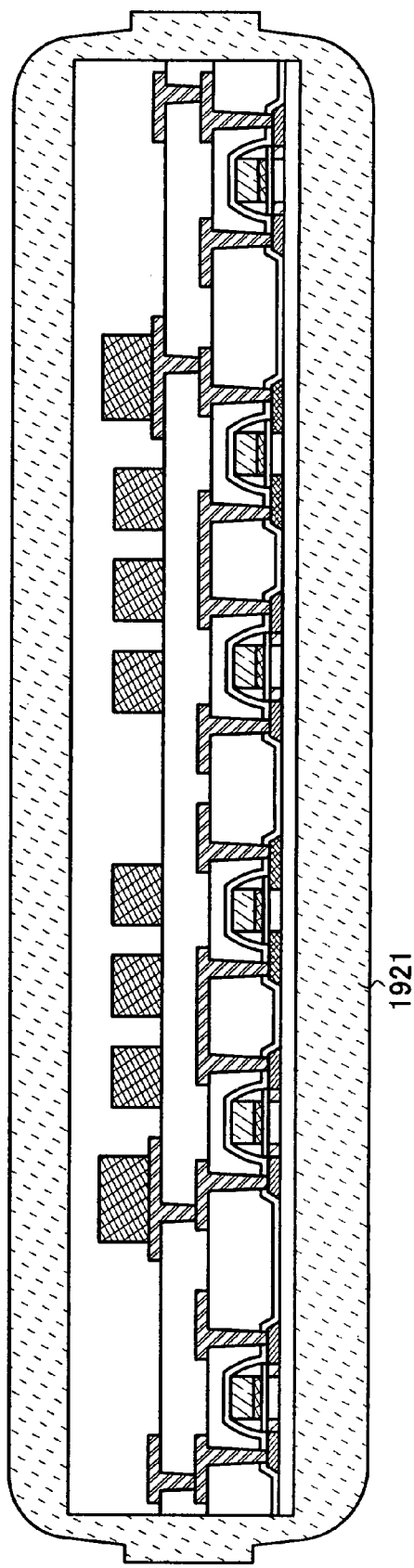
FIG. 21A
FIG. 21B
1920
1921

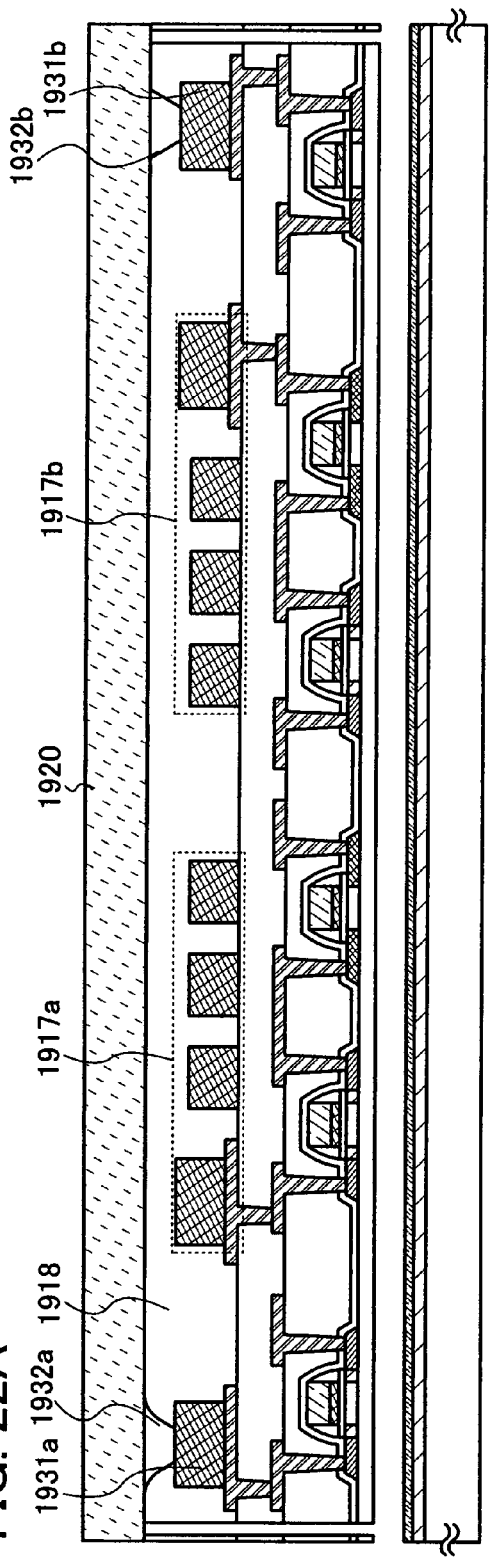
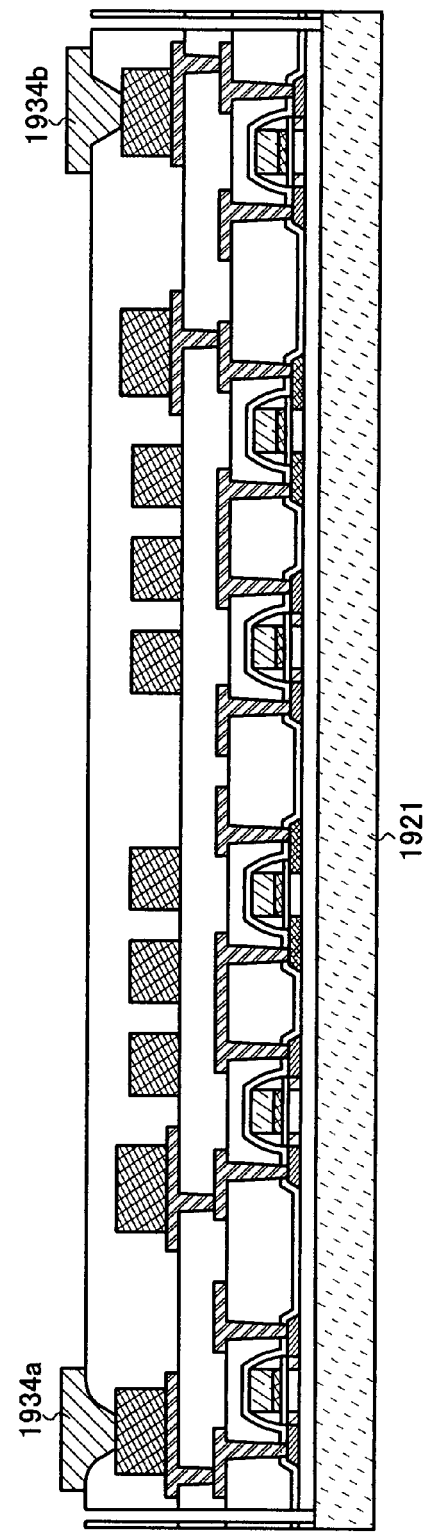

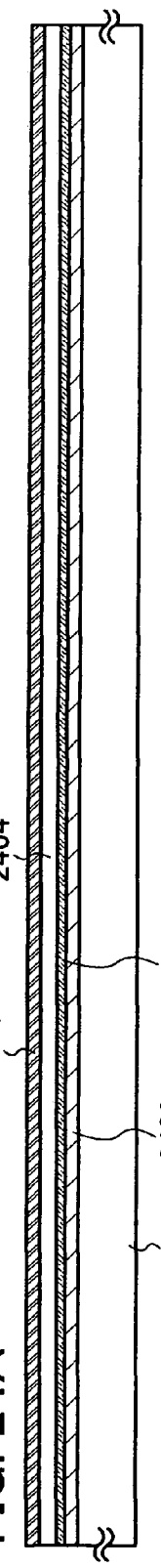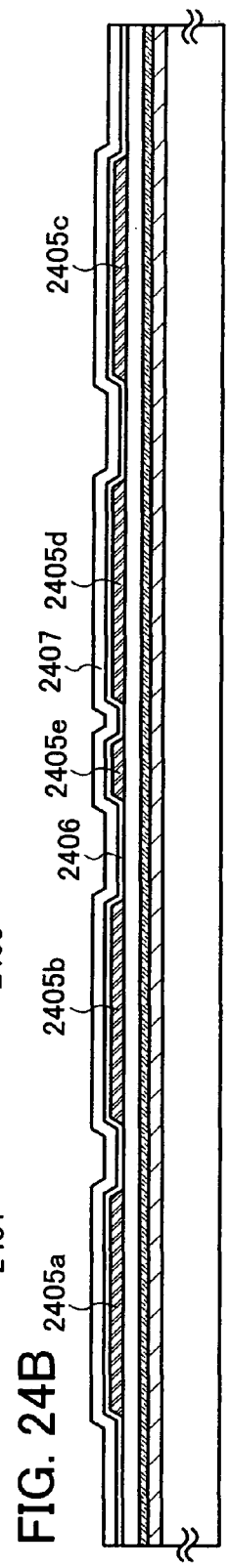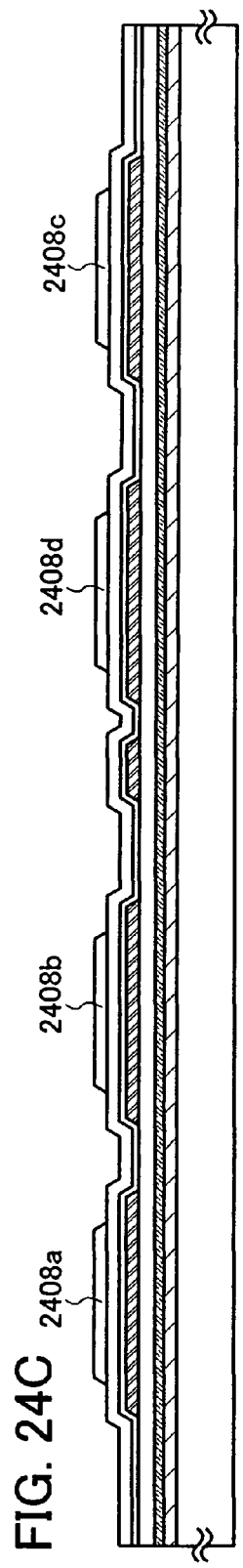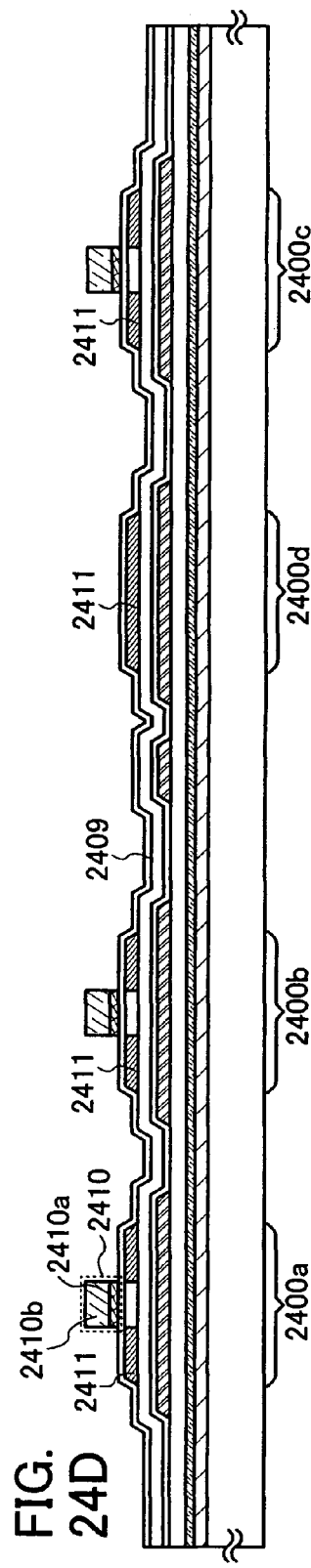

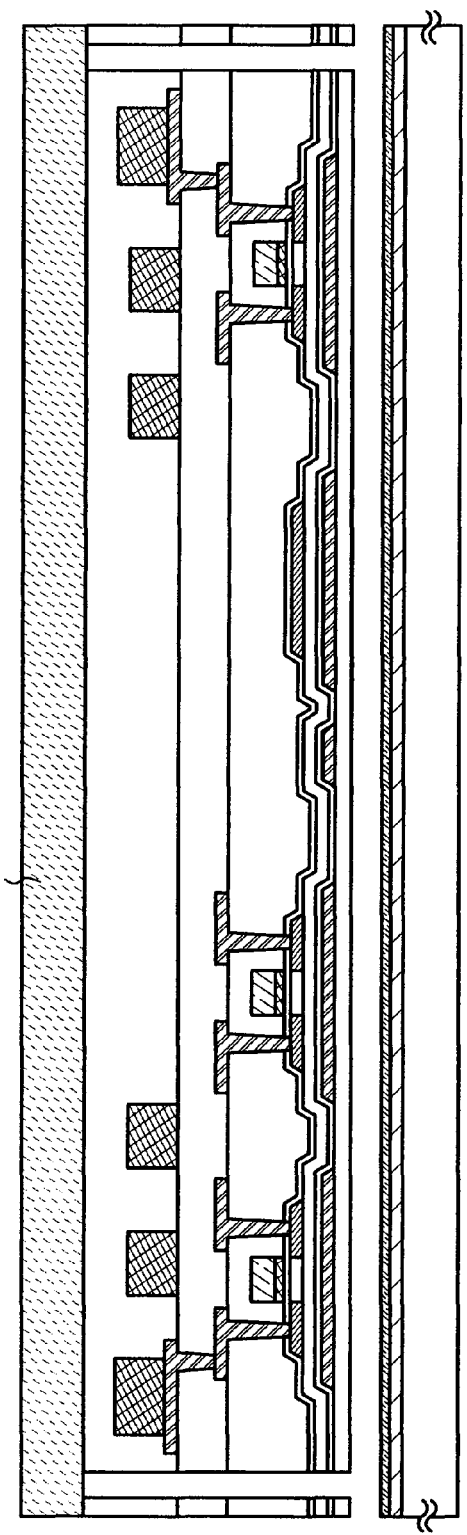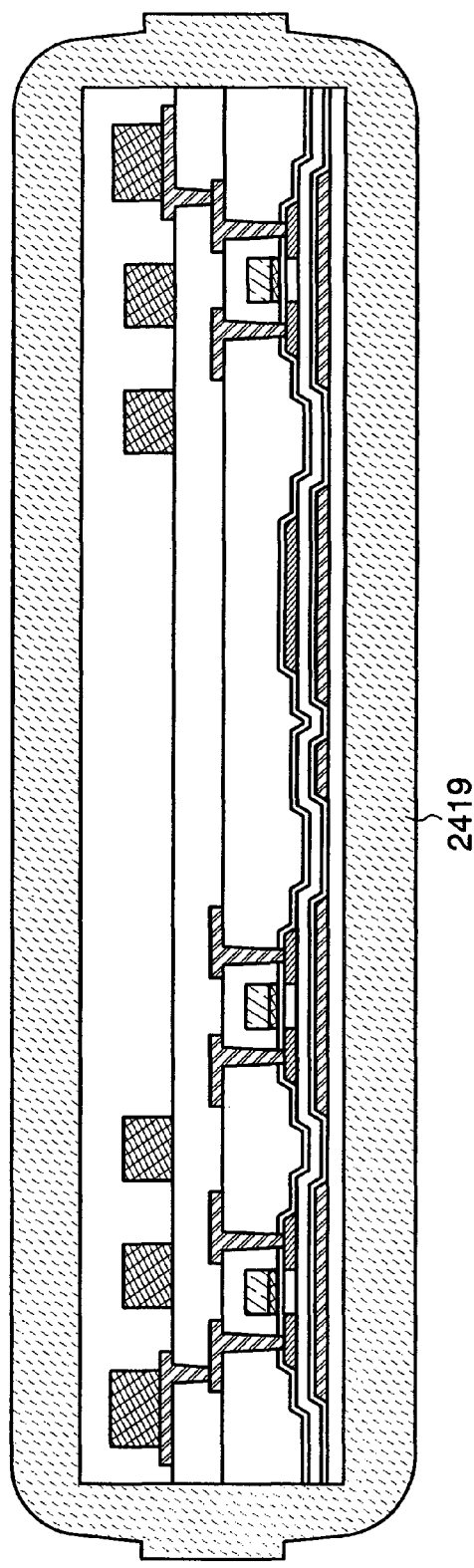

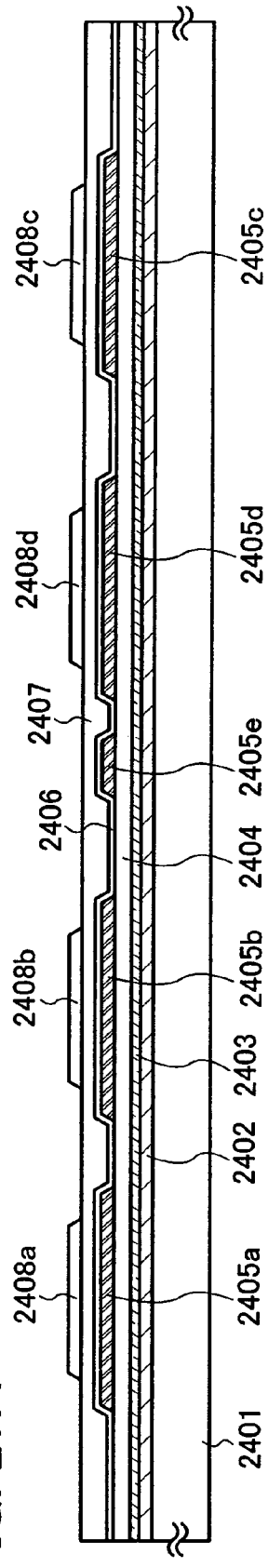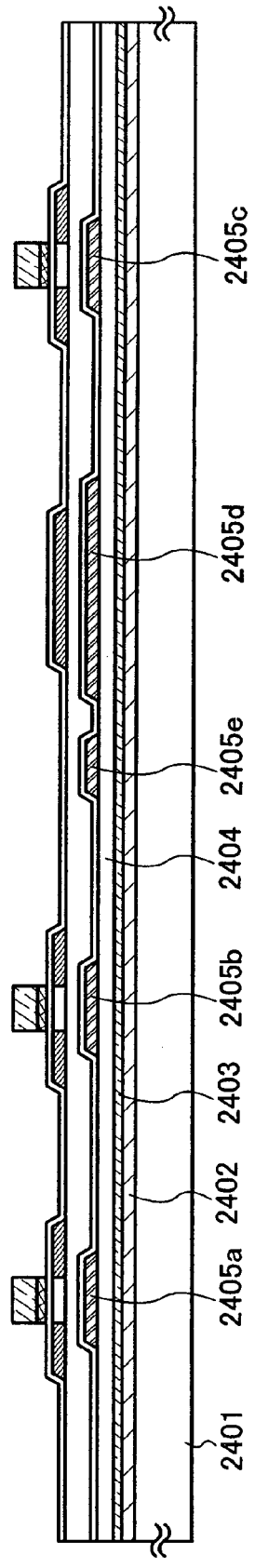

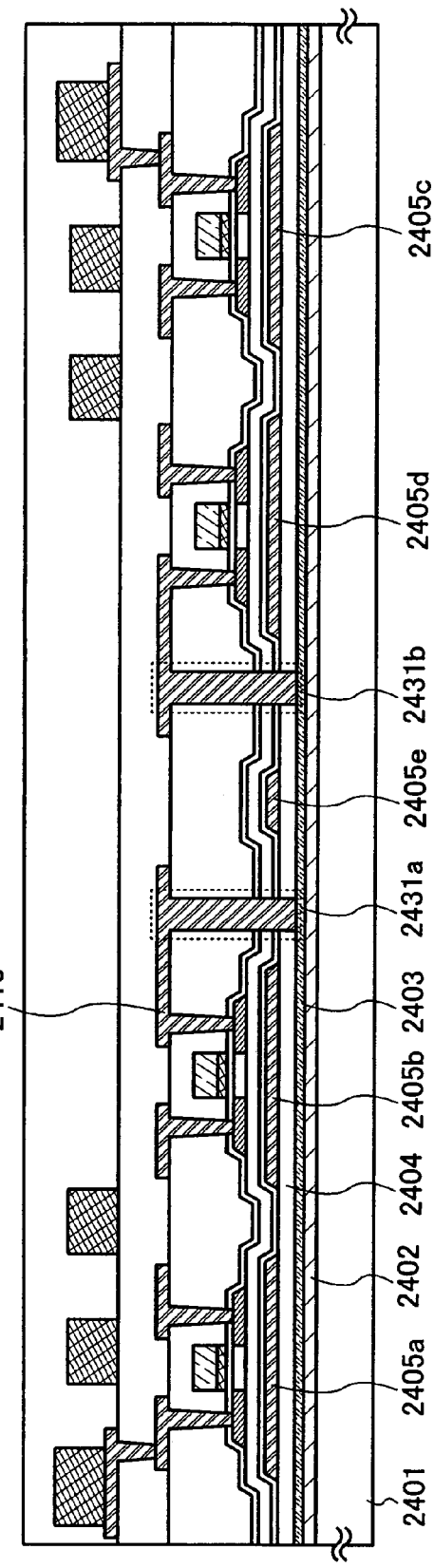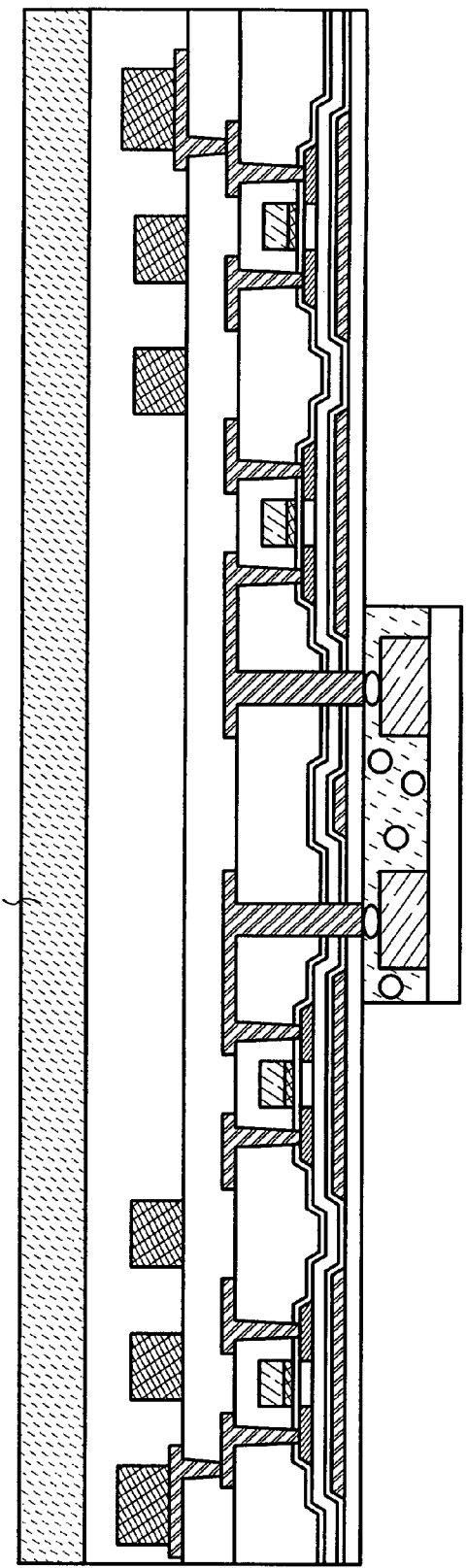

Gift Certificate

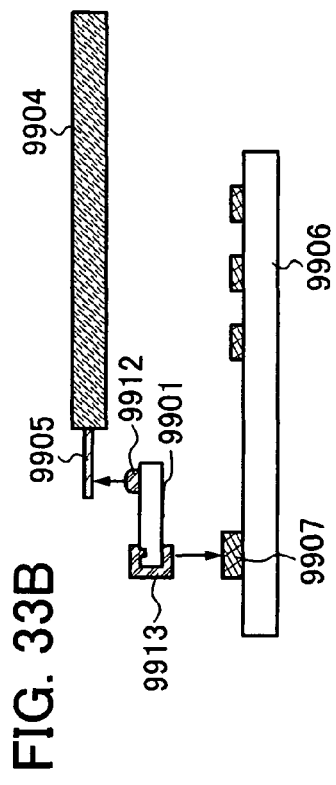
FIG. 33A
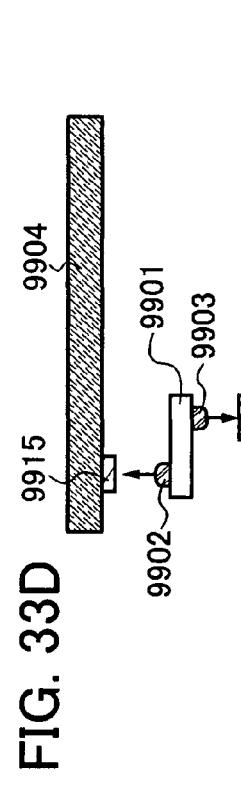
FIG. 33B
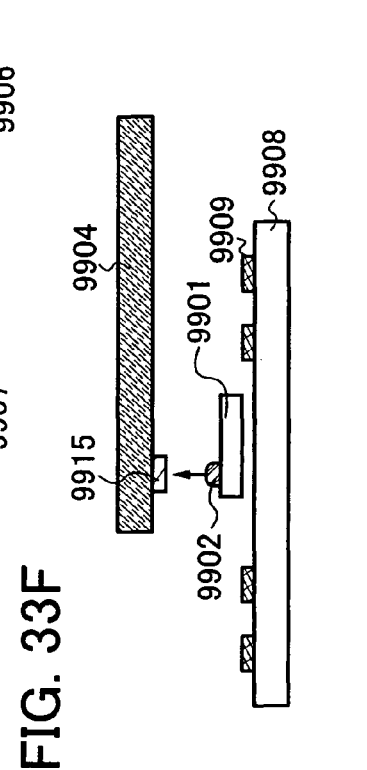
FIG. 33C
FIG. 33D
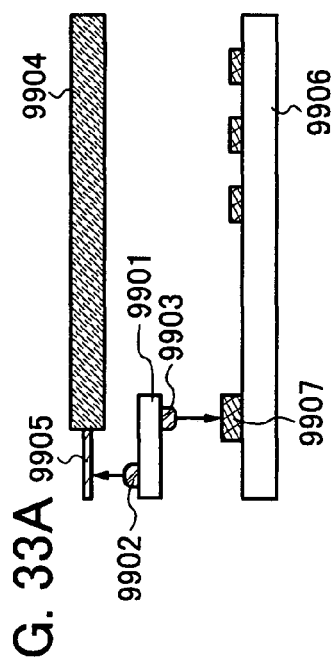
FIG. 33E
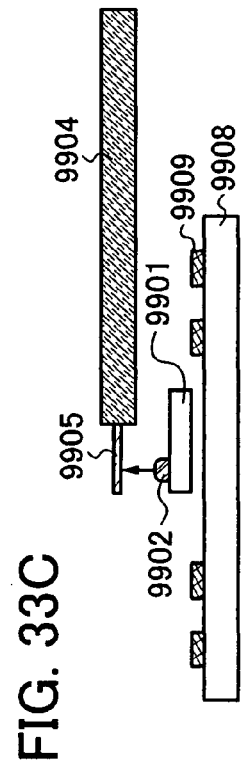
FIG. 33F
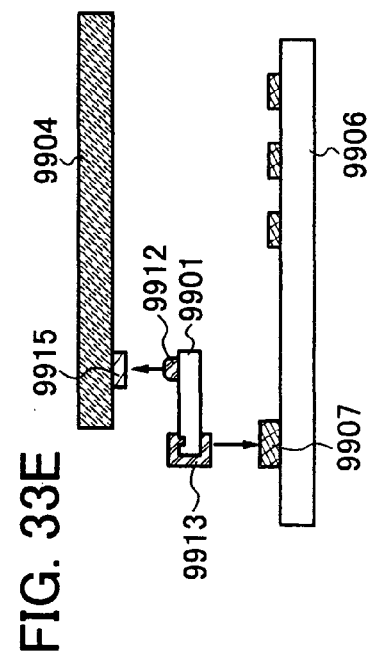

SEMICONDUCTOR DEVICE

TECHNICAL FIELD

The present invention relates to a semiconductor device. In particular, the present invention relates to a semiconductor device which transmits and receives data through radio waves and receives power. Furthermore, the present invention relates to a communication system using a semiconductor device through radio waves, an antenna and a reader/writer which transmit and receive data to and from the semiconductor device, and an antenna and a charger which supply power to the semiconductor device.

Note that a semiconductor device in this specification refers to all devices which can function by using a semiconductor property.

BACKGROUND ART

In recent years, an individual identification technique using radio waves such as electromagnetic waves for wireless communication has attracted attention. In particular, as a semiconductor device which communicates data by wireless communication, an individual identification technique using an RFID (Radio Frequency Identification) tag has attracted attention. The RFID tag (hereinafter referred to simply as an RFID) is also called an IC (Integrated Circuit) tag, an IC chip, an RF tag, a wireless tag, or an electronic tag. The individual identification technique using an RFID has been useful for production, management, and the like of an individual object, and has been expected to be applied to personal authentication.

Depending on whether a power supply is incorporated in an RFID or whether a power supply is supplied from outside, the RFID can be divided into two types: an active type RFID capable of transmitting radio waves including information on the RFID, and a passive type RFID which is driven using radio waves from outside or power of radio waves (carrier waves) (the active type RFID is referred to Reference 1: Japanese Published Patent Application No. 2005-316724; and the passive type RFID is referred to Reference 2: Japanese Translation of PCT International Application No. 2006-503376). Of these, the active type RFID has a structure in which a power supply for driving the RFID is incorporated and a cell is provided as the power supply. In addition, the passive type RFID has a structure in which a power supply for driving the RFID is generated using power of radio waves (carrier waves) from outside, so that a structure without a cell is realized.

FIG. 31 is a block diagram showing a specific structure of an active type RFID. In an active type RFID 3100 of FIG. 31, a communication signal received by an antenna circuit 3101 is inputted to a demodulation circuit 3105 and an amplifier 3106 in a signal processing circuit 3102. The communication signal is usually transmitted after a carrier such as a 13.56 MHz carrier or a 915 MHz carrier is processed using ASK modulation, PSK modulation, or the like. Here, in FIG. 31, an example of a 13.56 MHz carrier is shown as the communication signal. In FIG. 31, a clock signal which is a reference for processing a signal is required, and a 13.56 MHz carrier is used as a clock here. The amplifier 3106 amplifies the 13.56 MHz carrier and supplies it to a logic circuit 3107 as the clock. In addition, the ASK modulated communication signal or the PSK modulated communication signal is demodulated by the demodulation circuit 3105. The signal which has been demodulated is also transmitted to the logic circuit 3107 to be analyzed. The signal analyzed by the logic circuit 3107 is transmitted to a memory control circuit 3108, and based on it, the memory control circuit 3108 controls a memory circuit 3109, and data stored in the memory circuit 3109 is taken out and transmitted to a logic circuit 3110. The signal stored in the memory circuit 3109 is subjected to encode processing by the logic circuit 3110 and then amplified by an amplifier 3111, so that the carrier is modulated by a modulation circuit 3112 with the signal. Here, a power supply in FIG. 31 is supplied by a cell 3103 provided outside the signal processing circuit through a power supply circuit 3104. The power supply circuit 3104 supplies power to the amplifier 3106, the demodulation circuit 3105, the logic circuit 3107, the memory control circuit 3108, the memory circuit 3109, the logic circuit 3110, the amplifier 3111, the modulation circuit 3112, and the like. In this manner, the active type RFID operates.

FIG. 32 is a block diagram showing a specific structure of a passive type RFID. In a passive type RFID 3200 of FIG. 32, a communication signal received by an antenna circuit 3201 is inputted to a demodulation circuit 3205 and an amplifier 3206 in a signal processing circuit 3202. A communication signal is usually transmitted after a carrier such as a 13.56 MHz carrier or a 915 MHz carrier is processed using ASK modulation, PSK modulation, or the like. Here, in FIG. 32, an example of a 13.56 MHz carrier is shown as a communication signal. In FIG. 32, a clock signal which is a reference for processing a signal is required, and a 13.56 MHz carrier is used as the clock here. The amplifier 3206 amplifies the 13.56 MHz carrier and supplies it to a logic circuit 3207 as the clock. In addition, the ASK modulated communication signal or the PSK modulated communication signal is demodulated by the demodulation circuit 3205. The signal which has been demodulated is also transmitted to the logic circuit 3207 to be analyzed. The signal analyzed by the logic circuit 3207 is transmitted to a memory control circuit 3208, and based on it, the memory control circuit 3208 controls a memory circuit 3209, and data stored in the memory circuit 3209 is taken out and transmitted to a logic circuit 3210. The signal stored in the memory circuit 3209 is subjected to encode processing by the logic circuit 3210 and then amplified by an amplifier 3211, so that the carrier is modulated by a modulation circuit 3212 with the signal. On the other hand, the communication signal inputted to a rectifier circuit 3203 is rectified and is inputted to a power supply circuit 3204. The power supply circuit 3204 supplies power to the amplifier 3206, the demodulation circuit 3205, the logic circuit 3207, the memory control circuit 3208, the memory circuit 3209, the logic circuit 3210, the amplifier 3211, the modulation circuit 3212, and the like. In this manner, the passive type RFID operates.

DISCLOSURE OF INVENTION

However, as shown in FIG. 31, in the case of a semiconductor device which has an active type RFID provided with a cell for driving, there has been a problem in that the cell consumes over time, and eventually power required for transmitting and receiving individual information cannot be generated in accordance with transmission and reception of individual information and setting of the intensity of radio waves required for transmission and reception. Accordingly, there has been a problem in that confirmation of remaining capacity of a cell and replacement of a cell are generated in order to continuously use a semiconductor device which has an active type RFID provided with a cell for driving.

In addition, as shown in FIG. 32, in the case of a semiconductor device having a passive type RFID which generates a power supply for driving by using power of radio waves (carrier waves) from outside, there has been a problem in that it is difficult to transmit and receive signals from a long distance and to secure power for transmitting radio waves required for transmission and reception, so that it is difficult to realize transmission and reception in excellent condition. Accordingly, there has been a problem in that a distance from an antenna of a reader/writer which is a power supply means to which enough power of radio waves (carrier waves) from outside is supplied is limited to be short, in order to use a semiconductor device having a passive type RFID which generates a power supply for driving by using power of radio waves (carrier waves) from outside.

In view of the foregoing problems, it is an object of the present invention to provide a semiconductor device including an RFID, in which individual information can be transmitted and received, and transmission and reception of individual information are kept in excellent condition even when enough power of radio waves (carrier waves) from outside is not supplied to a power supply for driving without confirmation of remaining capacity of a cell and replacement of a cell associated with deterioration over time of a cell for a driving power supply.

In order to solve the above-mentioned problems, the present invention provides a battery (also referred to as a secondary cell) as a power supply for supplying power in an RFID. The present invention provides another antenna for charging the battery as a means for supplying power to the battery, in addition to an antenna which transmits and receives individual information to and from outside. Hereinafter, a specific structure of the present invention is shown.

One feature of the present invention is a semiconductor device including: a first antenna circuit; a second antenna circuit; a signal processing circuit; and a battery, in which the first antenna circuit receives a signal through the booster antenna and transmits a signal for transmitting data stored in the signal processing circuit; and the second antenna circuit receives a signal for charging the battery.

Another feature of the present invention is a semiconductor device including: a first antenna circuit; a second antenna circuit; a signal processing circuit; and a battery, in which the first antenna circuit receives a signal and transmits a signal for transmitting data stored in the signal processing circuit to and from a reader/writer; and the second antenna circuit receives a signal for charging the battery from a charger including an antenna circuit.

Another feature of the present invention is a semiconductor device including: a first antenna circuit; a second antenna circuit; a booster antenna; a signal processing circuit; and a battery, in which the first antenna circuit receives a signal through the booster antenna and transmits a signal for transmitting data stored in the signal processing circuit; and the second antenna circuit receives a signal for charging the battery through the booster antenna.

Another feature of the present invention is a semiconductor device including: a first antenna circuit; a second antenna circuit; a booster antenna; a signal processing circuit; and a battery, in which the first antenna circuit receives a signal and transmits a signal for transmitting data stored in the signal processing circuit; and the second antenna circuit receives a signal for charging the battery through the booster antenna.

Another feature of the present invention is a semiconductor device including: a first antenna circuit; a second antenna circuit; a booster antenna; a signal processing circuit; and a battery, in which the first antenna circuit receives a signal and transmits a signal for transmitting data stored in the signal processing circuit through the booster antenna; and the second antenna circuit receives a signal for charging the battery from a charger including an antenna circuit through the booster antenna.

Another feature of the present invention is a semiconductor device including: a first antenna circuit; a second antenna circuit; a booster antenna; a signal processing circuit; and a battery, in which the first antenna circuit receives a signal and transmits a signal for transmitting data stored in the signal processing circuit to and from a reader/writer through the booster antenna; and the second antenna circuit receives a signal for charging the battery.

Another feature of the present invention is a semiconductor device including: a first antenna circuit; a second antenna circuit; a booster antenna; a signal processing circuit; and a battery, in which the first antenna circuit receives a signal and transmits a signal for transmitting data stored in the signal processing circuit to and from a reader/writer; and the second antenna circuit receives a signal for charging the battery from a charger including an antenna circuit through the booster antenna.

Another feature of the present invention is a semiconductor device including: a first antenna circuit; a second antenna circuit; a booster antenna; a signal processing circuit; and a battery, in which the first antenna circuit receives a signal and transmits a signal for transmitting data stored in the signal processing circuit to and from a reader/writer through the booster antenna; and the second antenna circuit receives a signal for charging the battery from a charger including an antenna circuit through the booster antenna.

The battery of the present invention may supply power to a power supply circuit included in the signal processing circuit.

The first antenna circuit and the second antenna circuit of the present invention may transmit and receive a radio signal by an electromagnetic induction method.

In the present invention, a relation of 0.5 m<M<1.5 m may be satisfied, where a frequency of a signal which is received by the first antenna circuit is set M (M is a positive number) and a frequency of a signal which is received by the second antenna circuit is set m (m is a positive number).

The battery of the present invention may be a lithium cell, a nickel metal hydride cell, a nickel cadmium cell, or a capacitor.

The semiconductor device of the present invention includes a battery. Therefore, similarly to a conventional semiconductor device, the semiconductor device of the present invention can prevent power shortage for transmitting and receiving individual information associated with deterioration over time of a cell. In addition, the semiconductor device of the present invention has an antenna which receives a signal for supplying power to the battery. Therefore, when power of radio waves from outside is used, the battery can be charged without direct connection between the semiconductor device and a charger. Accordingly, the semiconductor device of the present invention can be continuously used without generating confirmation of remaining capacity of a cell and replacement of a cell, like an active type RFID. In addition, power for driving the RFID is always held in the battery, so that enough power for operating the RFID can be obtained and a communication distance between a reader/writer and the RFID can be extended.

BRIEF DESCRIPTION OF DRAWINGS

FIGS. 21A and 21B are diagrams showing a structure of a semiconductor device of Embodiment Mode 3.

FIGS. 22A and 22B are diagrams showing a structure of a semiconductor device of Embodiment Mode 3.

FIGS. 24A to 24D are diagrams showing a structure of a semiconductor device of Embodiment Mode 4.

FIGS. 26A and 26B are diagrams showing a structure of a semiconductor device of Embodiment Mode 4.

FIGS. 27A and 27B are diagrams showing a structure of a semiconductor device of Embodiment Mode 4.

FIGS. 28A and 28B are diagrams showing a structure of a semiconductor device of Embodiment Mode 4.

FIGS. 33A to 33F are diagrams each showing a structure of a semiconductor device of Embodiment Mode 5.

BEST MODE FOR CARRYING OUT THE INVENTION

Figure 1:
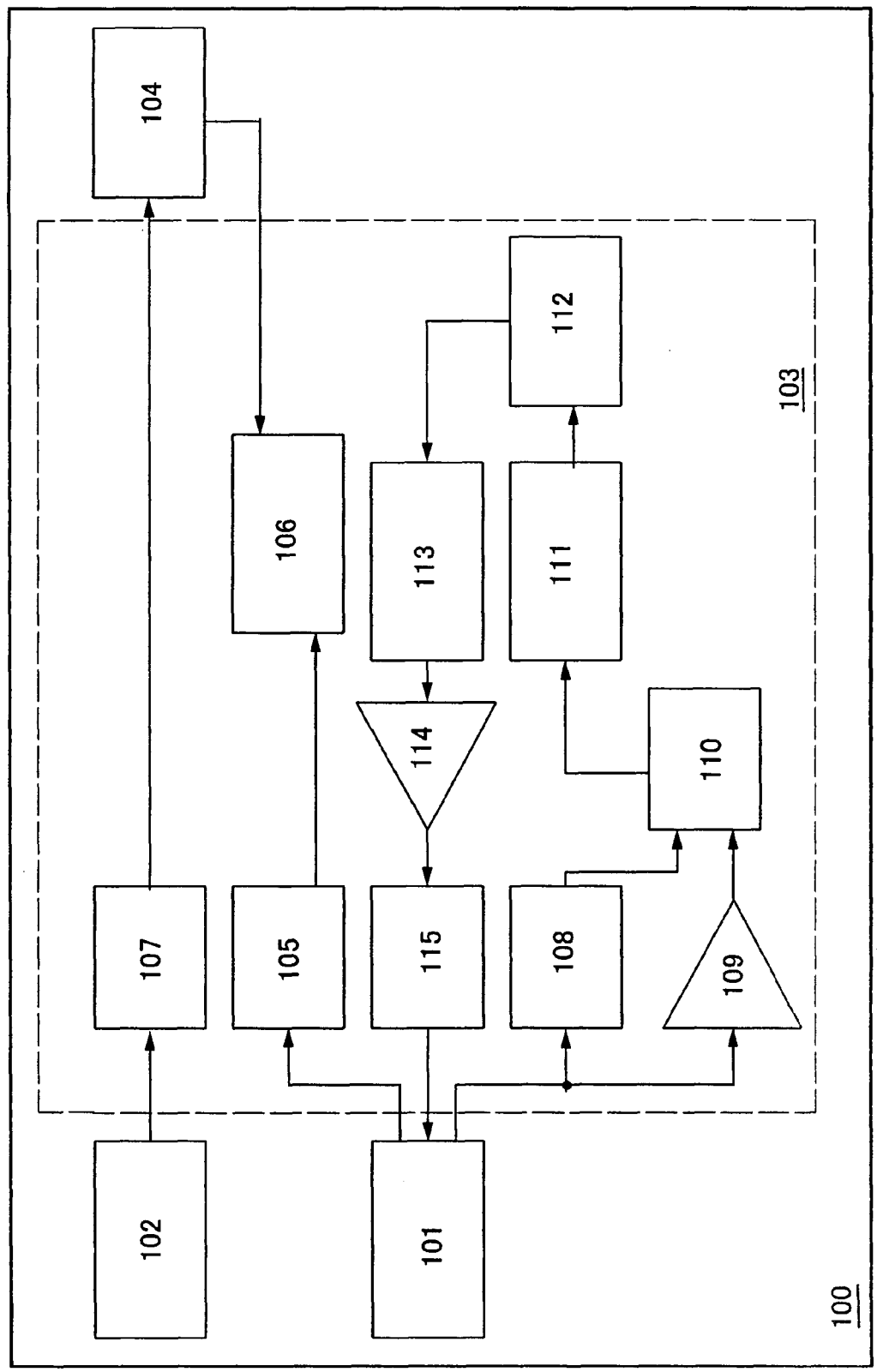
FIG. 1 is a diagram showing a structure of a semiconductor device of Embodiment Mode 1.

Hereinafter, embodiment modes of the present invention will be described with reference to the accompanying drawings. However, the present invention can be implemented in various modes. As is easily known to a person skilled in the art, the mode and the detail of the present invention can be variously changed without departing from the spirit and the scope of the present invention. Thus, the present invention is not interpreted as being limited to the following description of the embodiment modes. Note that the same reference numeral is commonly used to denote the same component among different drawings in structures of the present invention explained below.

Embodiment Mode 1

A semiconductor device used for an RFID of the present invention will be described with reference to block diagrams shown in FIGS. 1 and 2.

An RFID 100 of FIG. 1 includes a first antenna circuit 101, a second antenna circuit 102, a signal processing circuit 103, and a battery 104. The signal processing circuit 103 includes a first rectifier circuit 105, a power supply circuit 106, a second rectifier circuit 107, a demodulation circuit 108, an amplifier 109, a logic circuit 110, a memory control circuit 111, a memory circuit 112, a logic circuit 113, an amplifier 114, and a modulation circuit 115.

Figure 2:
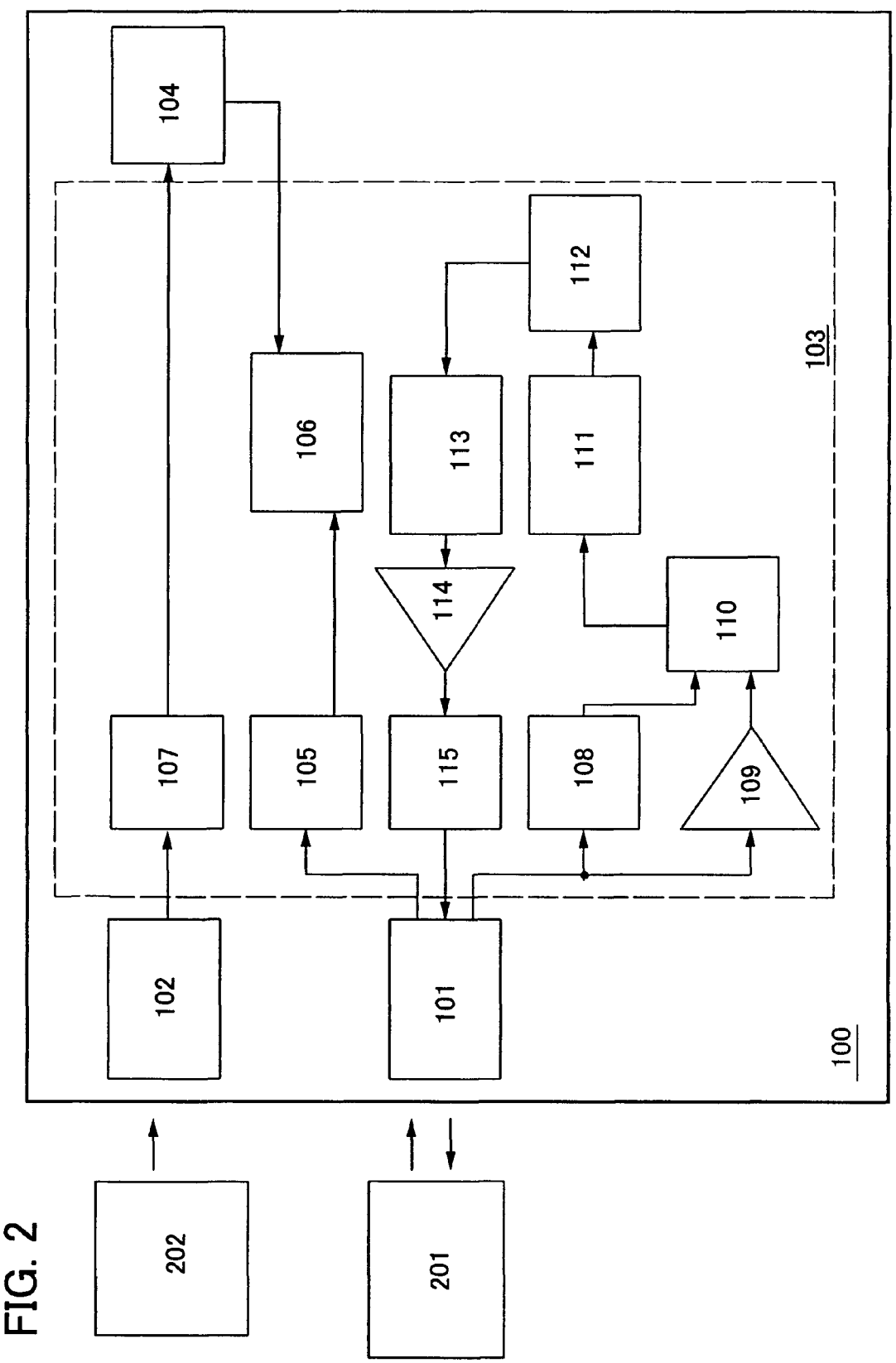
FIG. 2 is a diagram showing a structure of a semiconductor device of Embodiment Mode 1.

In addition, FIG. 2 shows a block diagram in which the first antenna circuit 101 transmits and receives a signal to and from a reader/writer 201, and the second antenna circuit 102 receives a signal from a charger 202. In FIG. 2, the signal received by the first antenna circuit 101 is inputted to the power supply circuit 106 through the first rectifier circuit 105. In FIG. 2, the signal received by the second antenna circuit 102 is inputted to the battery 104 through the second rectifier circuit 107, and power is supplied to the power supply circuit 106 from the battery 104, as appropriate.

Figure 3A:
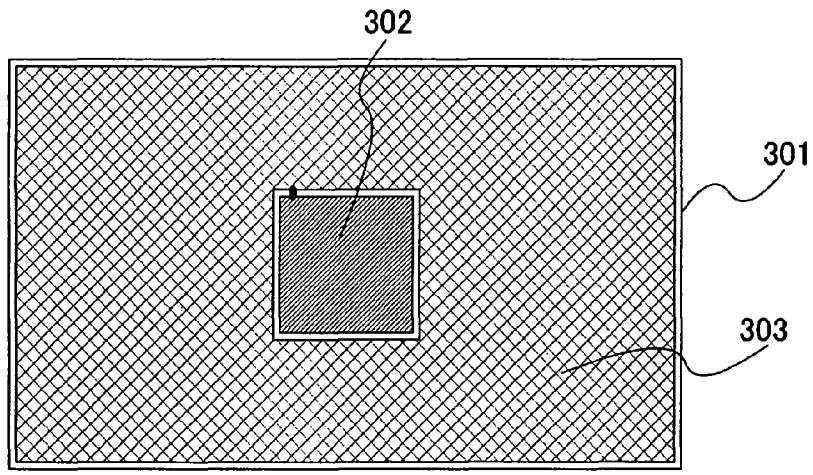
FIGS. 3A to 3E are views each showing a structure of a semiconductor device of Embodiment Mode 1.
Figure 3B:
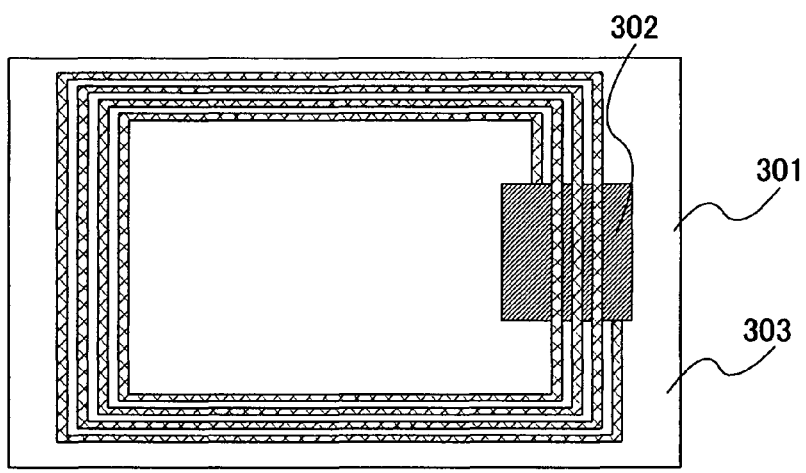
Figure 3C:
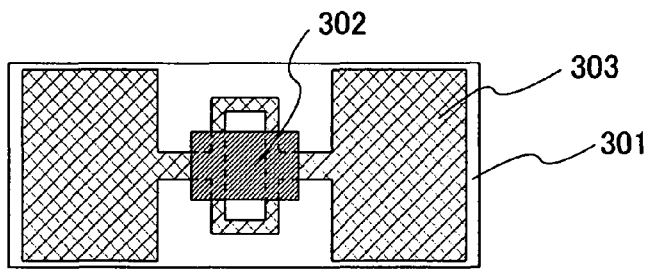
Figure 3D:
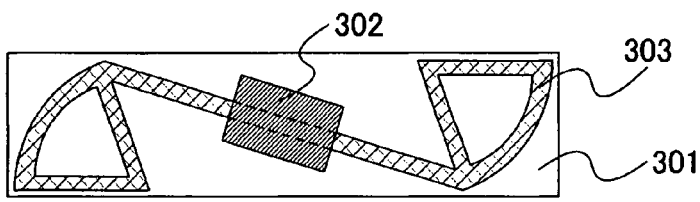
Figure 3E:
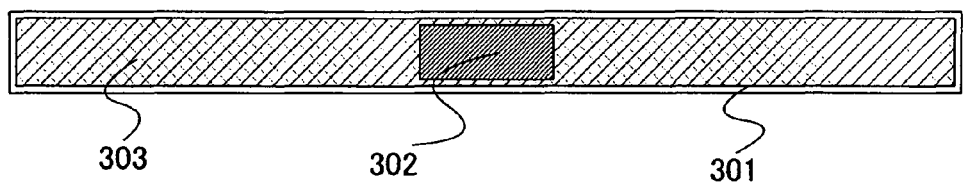
Figure 4A:
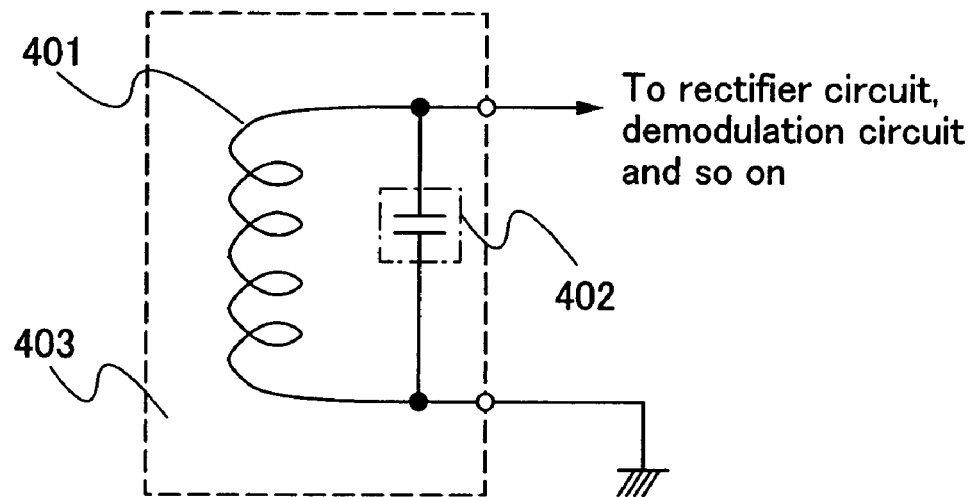
FIGS. 4A and 4B are diagrams each showing a structure of a semiconductor device of Embodiment Mode 1.

Note that each of shapes of antennas of the first antenna circuit 101 and the second antenna circuit 102 is not particularly limited. For example, as shown in FIG. 3A, a structure in which an antenna 303 covers the periphery of a signal processing circuit 302 over a substrate 301 may be used. In addition, as shown in FIG. 3B, a structure in which the signal processing circuit 302 is arranged so as to be superimposed over the antenna 303 which is circularly formed over the substrate 301 may be used. Further, as shown in FIG. 3C, the shape of the antenna 303 for receiving a high frequency electromagnetic wave in accordance with the signal processing circuit 302 over the substrate 301 may be used. In addition, as shown in FIG. 3D, the 180 degree omnidirectional antenna 303 (capable of receiving signals similarly from any direction) in accordance with the signal processing circuit 302 over the substrate 301 may be used. In addition, as shown in FIG. 3E, the shape of the antenna 303 which is extended to be a stick shape in accordance with the signal processing circuit 302 over the substrate 301 may be used. Furthermore, connection between the signal processing circuit 103 and the antennas in the first antenna circuit 101 and the second antenna circuit 102 is not particularly limited. For example, the antenna 303 and the signal processing circuit 302 are connected by wire bonding or bump bonding. Alternatively, the signal processing circuit 302 being a chip having an electrode over an entire surface thereof may be attached to the antenna 303. In this method, by using an ACF (Anisotropic Conductive Film), the signal processing circuit 302 and the antenna 303 can be attached to each other. In this embodiment mode, the shape shown in FIG. 3B is adopted as each of the shapes of the first antenna circuit 101 and the second antenna circuit 102. That is, as shown in FIG. 4A, each of the first antenna circuit 101 and the second antenna circuit 102 is described to have a structure including an antenna 401 and a resonant capacitor 402, and an antenna circuit 403 refers to a combination of the antenna 401 and the resonant capacitor 402.

Figure 4B:
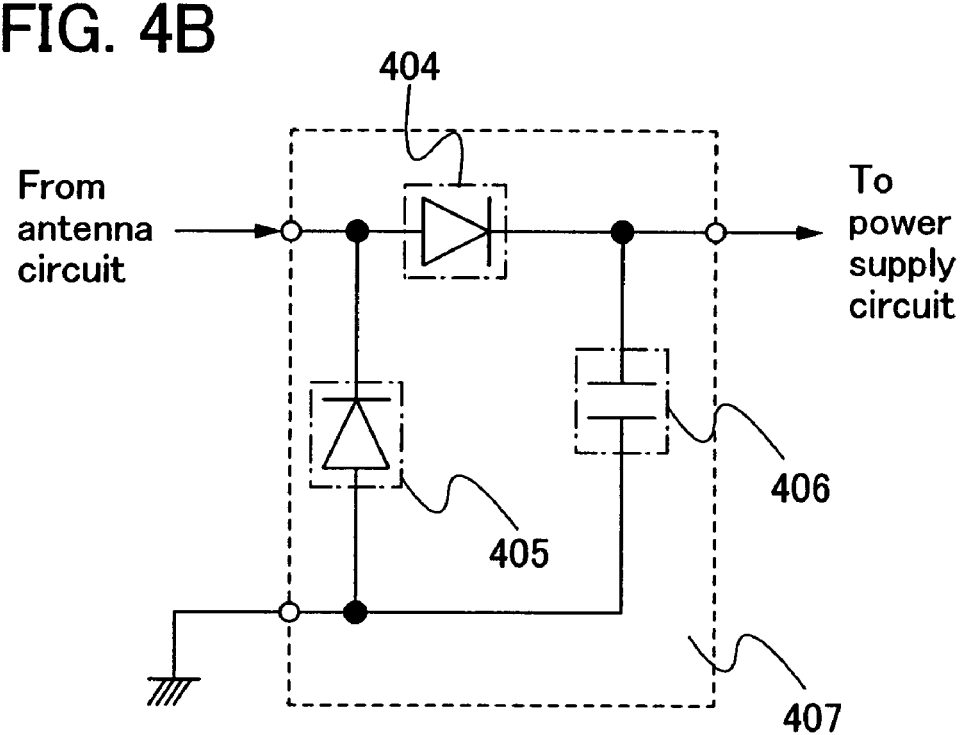

In addition, the first rectifier circuit 105 and the second rectifier circuit 107 may be circuits in which AC signals induced by electromagnetic waves which are received by the first antenna circuit 101 and the second antenna circuit 102 are converted to DC signals. For example, as shown in FIG. 4B, a rectifier circuit 407 may include a diode 404, a diode 405, and a smoothing capacitor 406.

Note that the reader/writer 201 in FIG. 2 is described with reference to FIG. 5. A reader/writer 500 in FIG. 5 includes a receiving portion 501, a transmitting portion 502, a control portion 503, an interface portion 504, and antenna circuits 505. The control portion 503 controls the receiving portion 501 and the transmitting portion 502 to output a data processing instruction and a data processing result by control of a higher-level device 506 via the interface portion 504. The transmitting portion 502 modulates a data processing instruction that is to be transmitted to the RFID 100, and outputs it as an electromagnetic wave from the antenna circuits 505. The receiving portion 501 demodulates a signal received by the antenna circuits 505, and outputs it as a data processing result to the control portion 503.

Figure 5:
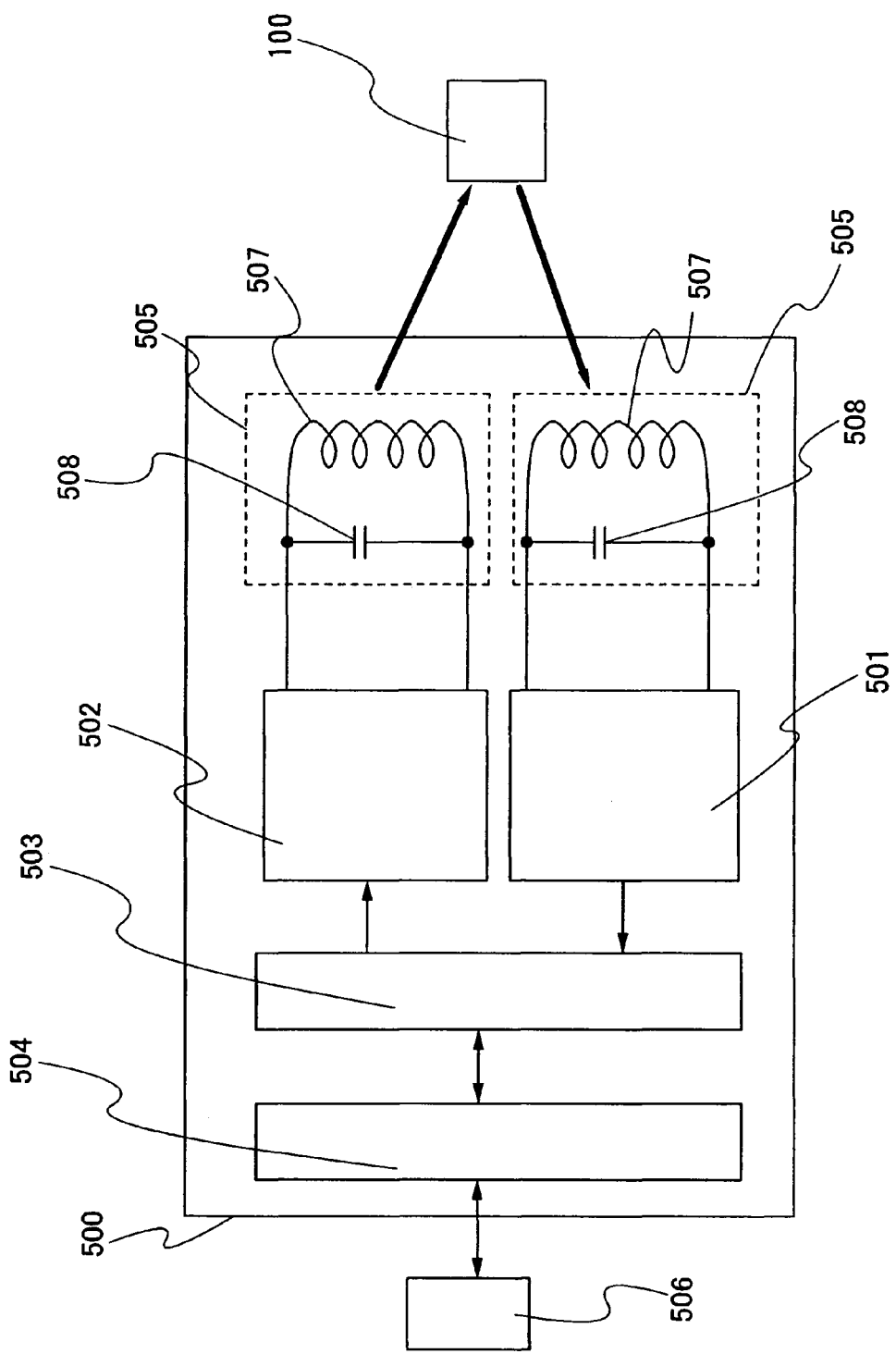
FIG. 5 is a diagram showing a structure of a semiconductor device of Embodiment Mode 1.

In this embodiment mode, the antenna circuits 505 of the reader/writer 500 shown in FIG. 5 are connected to the receiving portion 501 and the transmitting portion 502 and each of the antenna circuits 505 includes an antenna 507 and a resonant capacitor 508 which form an LC parallel resonant circuit. The antenna circuits 505 receive an electromotive force that is induced in the antenna circuits 505 by a signal outputted from the RFID 100 as an electrical signal, at the time of receiving data. In addition, at the time of transmitting data, a current flows through the antenna circuits 505, and the antenna circuits 505 transmit signals to the RFID 100.

Note that the charger 202 in FIG. 2 is described with reference to FIG. 6. A charger 600 in FIG. 6 includes a transmission control portion 601 and an antenna circuit 602. The transmission control portion 601 modulates an electrical signal for charging to be transmitted to the RFID 100, and the signal for charging is transmitted from the antenna circuit 602.

Figure 6:
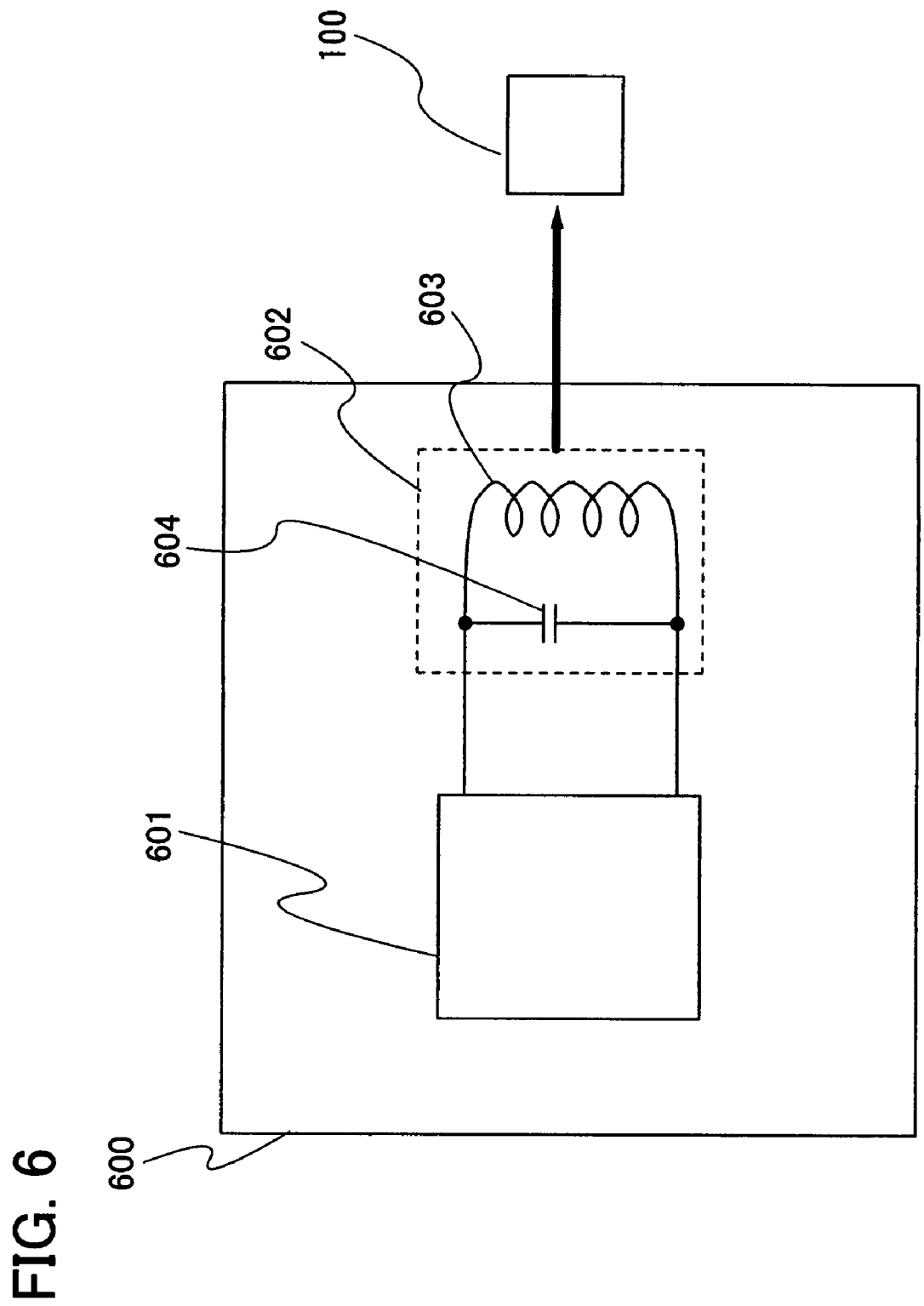
FIG. 6 is a diagram showing a structure of a semiconductor device of Embodiment Mode 1.

In this embodiment mode, the antenna circuit 602 of the charger 600 shown in FIG. 6 is connected to the transmission control portion 601, and includes an antenna 603 and a resonant capacitor 604 which form an LC parallel resonant circuit. In the antenna circuit 602, a current flows through the antenna circuit 602, and a signal for charging to the RFID 100 is transmitted by the antenna 603, at the time of transmitting data.

Note that in FIG. 1, the first antenna circuit 101 and the second antenna circuit 102 may be stacked over the same substrate with the signal processing circuit 103, or may be provided as external antennas.

Figure 7:
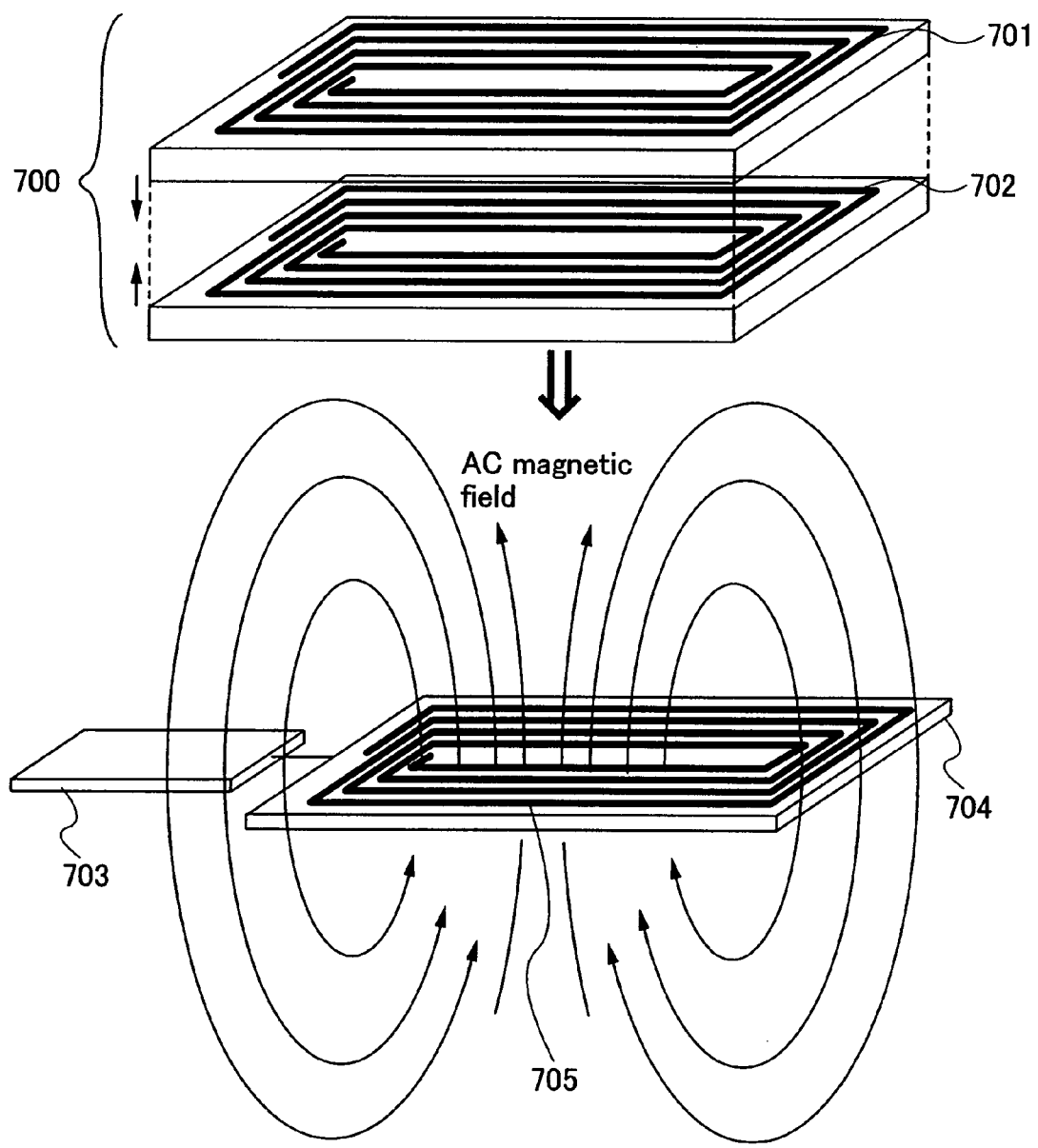
FIG. 7 is a view showing a structure of a semiconductor device of Embodiment Mode 1.

In addition, in this embodiment mode, signals received by the first antenna circuit 101 and the second antenna circuit 102 preferably perform communication of signals by an electromagnetic induction method. Accordingly, the RFID 100 in FIGS. 1 and 2 preferably has a structure including the first coiled antenna circuit 101 and the second coiled antenna circuit 102. For example, FIG. 7 shows a positional relationship of the first antenna circuit and the second antenna circuit, and shapes of antennas in a semiconductor device including an RFID. FIG. 7 shows a structure in which a first coiled antenna circuit 701 and a second coiled antenna circuit 702 are provided over a front surface and a rear surface of an RFID 700 respectively, and in which a signal from an antenna of a charger is received.

Figure 8:
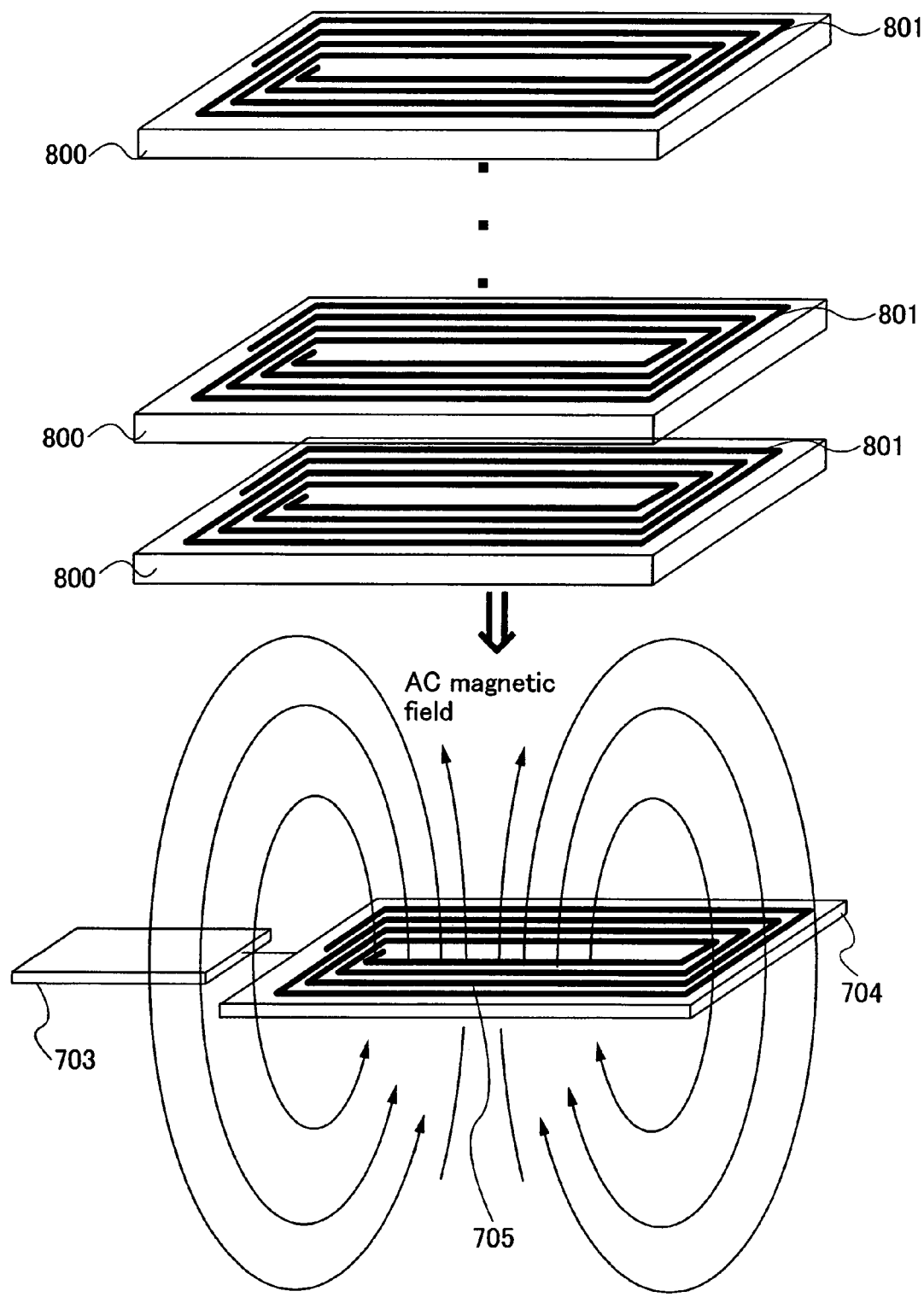
FIG. 8 is a view showing a structure of a semiconductor device of Embodiment Mode 1.
Figure 9:
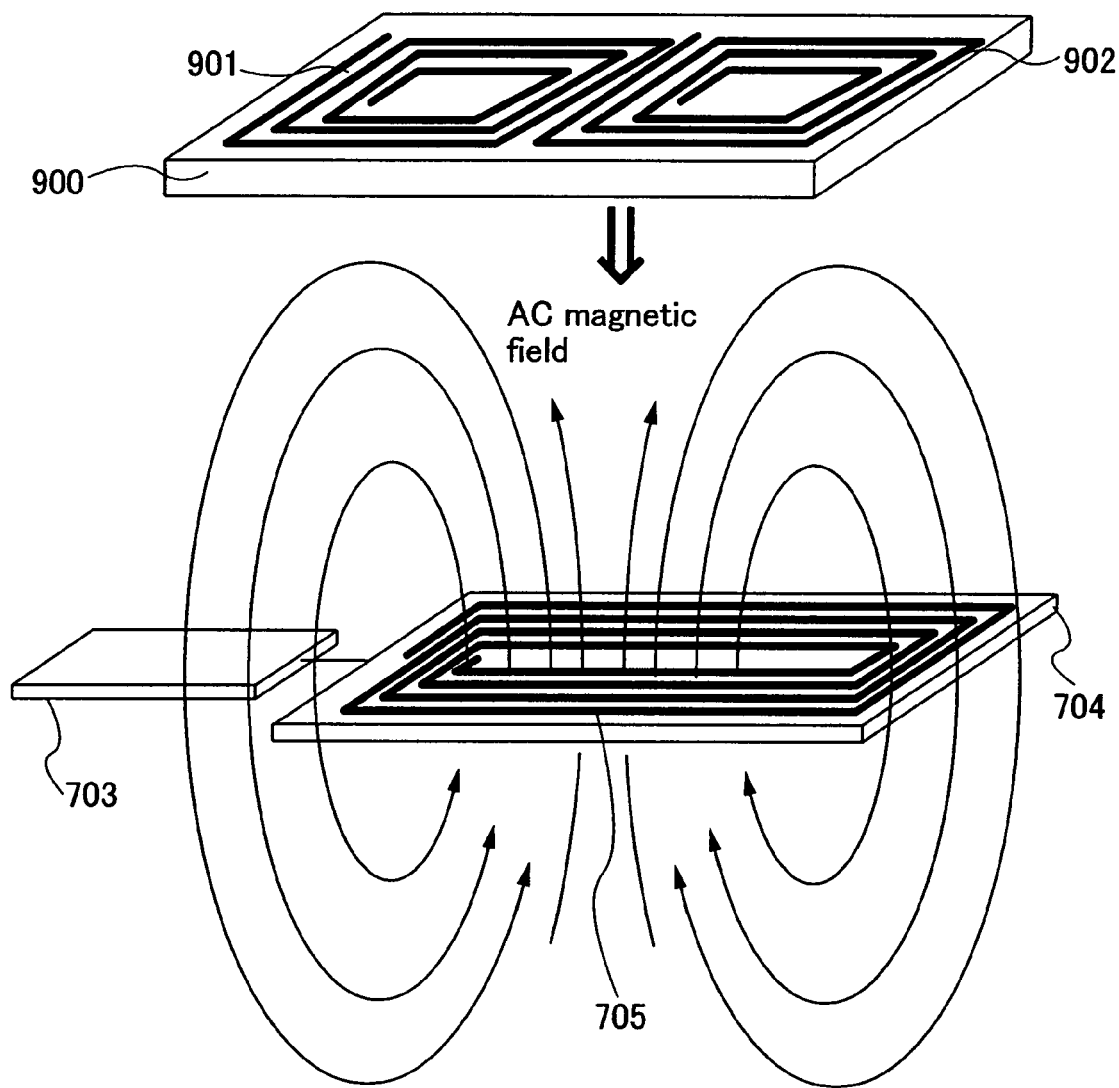
FIG. 9 is a view showing a structure of a semiconductor device of Embodiment Mode 1.

In FIG. 7, when a coiled antenna 705 in an antenna circuit 704 of a charger connected to a transmission control portion 703 is brought close to the second antenna circuit 702 of the RFID, an AC magnetic field is generated from the coiled antenna 705 of the antenna circuit 704 in the charger. The AC magnetic field passes through the second coiled antenna circuit 702 in the RFID 700, so that an electromotive force is generated between terminals (between one end of the antenna and the other end thereof) of the second coiled antenna circuit 702 in the RFID 700 due to electromagnetic induction. A battery in the RFID 700 can be charged by the electromotive force. Note that as shown in FIG. 8, a second antenna circuit 801 for charging which is provided over a front surface or a rear surface of a substrate in an RFID 800 can be charged from a charger even when the RFIDs 800 are superimposed. In addition as shown in FIG. 9, an RFID 900 may have a structure in which a first antenna circuit 901 and a second antenna circuit 902 may be arranged side by side over the same substrate, and a signal from the antenna circuit 704 of the charger is received.

Note that a frequency of a signal transmitted and received between the first antenna circuit 101 and the reader/writer 201 is 125 kHz, 13.56 MHz, 915 MHz, 2.45 GHz, or the like, and each of which is standardized by ISO or the like. Naturally, a frequency of a signal transmitted and received between the first antenna circuit 101 and the reader/writer 201 is not limited to this, and for example, any of the following can be used: a submillimeter wave of 300 GHz to 3 THz; a millimeter wave of 30 GHz to 300 GHz; a microwave of 3 GHz to 30 GHz; an ultrashort wave of 300 MHz to 3 GHz; a very short wave of 30 MHz to 300 MHz; a short wave of 3 MHz to 30 MHz; a medium wave of 300 KHz to 3 MHz; a long wave of 30 KHz to 300 KHz; and a very long wave of 3 KHz to 30 KHz. In addition, a signal transmitted and received between the first antenna circuit 101 and the reader/writer 201 is a signal in which a carrier wave is modulated. A modulation method of a carrier wave may be either analog modulation or digital modulation, or may be any of amplitude modulation, phase modulation, frequency modulation, and spread spectrum. Preferably, amplitude modulation or frequency modulation may be used.

Note that when a frequency of a signal transmitted and received between the second antenna circuit 102 and the charger 202 is set m (m is a positive number) and a frequency of a signal transmitted and received by the first antenna circuit 101 and the reader/writer 201 is set M (M is a positive number), a frequency which satisfies a relation of $0.5\,m < M < 1.5\,m$ and $m \neq M$ is preferably used. When a frequency of a signal inputted to the second antenna circuit 102 is set within the above range, design can be performed without significantly changing the shapes of the first antenna circuit 101 and the second antenna circuit 102, which is preferable.

Note that power can be supplied to the power supply circuit 106 in FIGS. 1 and 2 by two ways: one is a power supply which is made such that a signal of a carrier wave is rectified in the first rectifier circuit 105 similarly to the passive type RFID described in the conventional example, and a power supply which drives each circuit of the signal processing circuit 103 is generated through the power supply circuit 106; the other is a power supply which is made such that the battery 104 is charged by a battery charging signal inputted from the second antenna circuit 102 through the second rectifier circuit 107, and power which is charged in the battery 104 is supplied. The power which is charged in the battery 104 can be supplied to the power supply circuit 106 in the case where enough power cannot be obtained from the first antenna circuit 101 of the RFID 100 when a communication distance extends.

An example of the power supply circuit in FIGS. 1 and 2 is described with reference to FIG. 10. The power supply circuit includes a reference voltage circuit and a buffer amplifier. The reference voltage circuit includes a resistor 1001, diode-connected transistors 1002 and 1003, and generates a reference voltage which is equivalent to twice VGS of a transistor. The buffer amplifier includes a differential circuit including transistors 1005 and 1006; a current mirror circuit including transistors 1007 and 1008; and a common-source amplifier including a current supply resistor 1004, a transistor 1009, and a resistor 1010.

Figure 10:
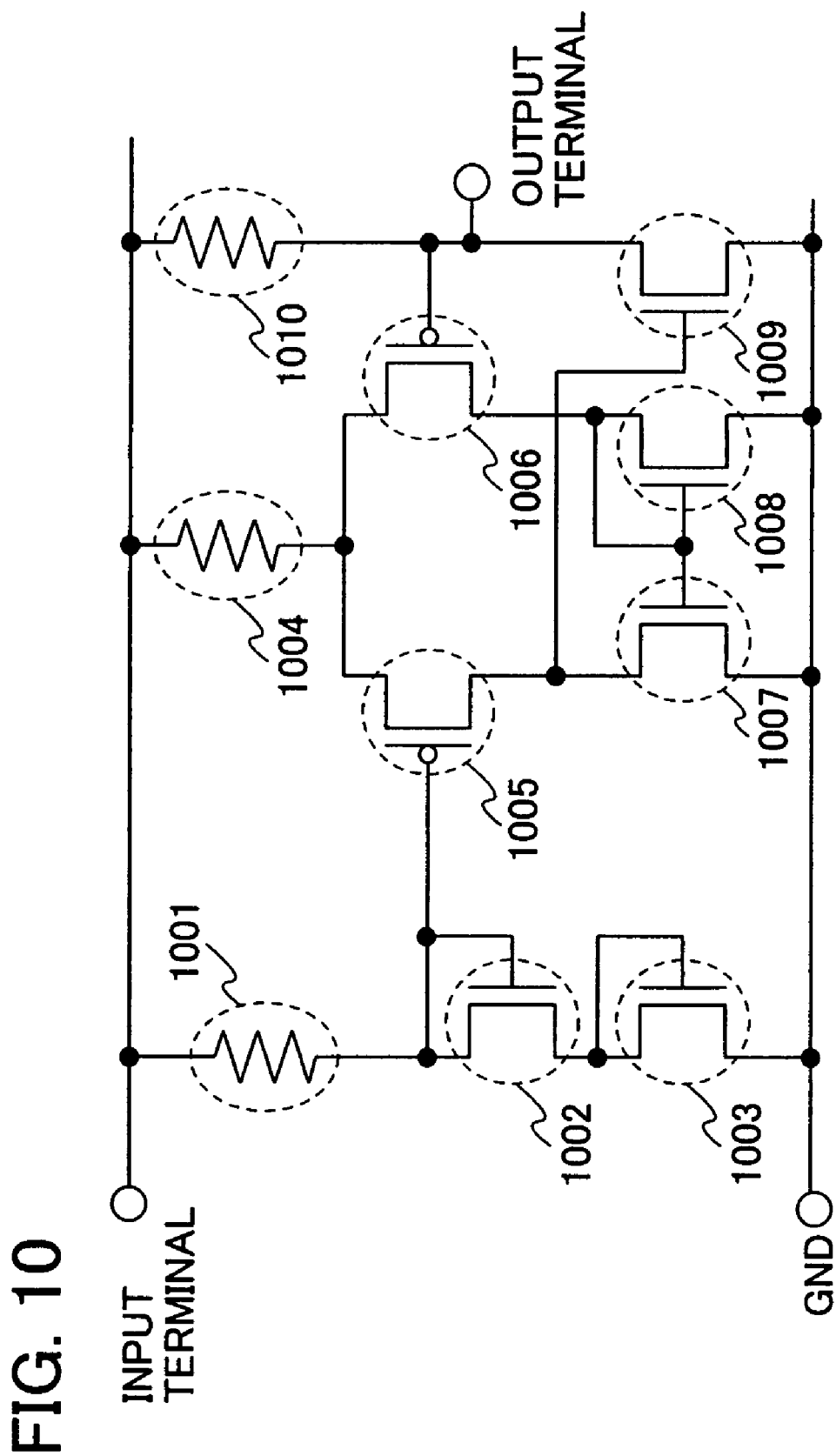
FIG. 10 is a view showing a structure of a semiconductor device of Embodiment Mode 1.

In the power supply circuit shown in FIG. 10, when a current flowing from an output terminal is large, a current supplied to the transistor 1009 is small, whereas when a current flowing from an output terminal is small, a current supplied to the transistor 1009 is large. Thus, an operation is performed so that a current flowing to the resistor 1010 is constant. Further, a potential of the output terminal has almost the same value as the reference voltage circuit. Here, the power supply circuit including the reference voltage circuit and the buffer amplifier is shown; however, the present invention is not limited to the power supply circuit in FIG. 10 and it may be other circuits as well.

Note that in this specification, a battery means a cell which can recover a continuous using time by charging. Note that a sheet-like cell is preferably used as the battery. For example, the battery can be made smaller by using a lithium cell, preferably a lithium polymer cell using a gel-like electrolyte, a lithium ion cell, or the like. Naturally, any cell can be used as the battery as long as it is a chargeable cell, and a cell capable of charging and discharging such as a nickel metal hydride cell or a nickel cadmium cell may be used, or a capacitor having high capacity or the like may be used.

Next, an operation when data is transmitted from the reader/writer 201 to the RFID 100 shown in FIGS. 1 and 2 is described below. A signal received by the first antenna circuit 101 is half-wave rectified by the first rectifier circuit 105 and then smoothed. A voltage which is half-wave rectified and smoothed by the first rectifier circuit 105 is inputted to the power supply circuit 106. The power supply circuit supplies a voltage which has been stabilized to the first rectifier circuit 105, the power supply circuit 106, the second rectifier circuit 107, the demodulation circuit 108, the amplifier 109, the logic circuit 110, the memory control circuit 111, the memory circuit 112, the logic circuit 113, the amplifier 114, and the modulation circuit 115.

In addition, the signal received by the first antenna circuit 101 is inputted to the logic circuit 110 as a clock signal through the amplifier 109. Further, the signal inputted from the first antenna circuit 101 is demodulated by the demodulation circuit 108 and inputted to the logic circuit 110 as data.

In the logic circuit 110, the inputted data is decoded. The reader/writer 201 transmits data after having encoded it with a deformation mirror code, an NRZ-L code, or the like and it is decoded by the logic circuit 110. The decoded data is sent to the memory control circuit 111; accordingly, data stored in the memory circuit 112 is read out. It is necessary that the memory circuit 112 be a nonvolatile memory circuit which can store data even when the power is OFF, and a masked ROM or the like is used.

In addition, when the reader/writer 201 receives the data stored in the memory circuit 112 in the RFID 100 shown in FIGS. 1 and 2, an operation is performed as follows. The signal received by the first antenna circuit 101 is half-wave rectified and then smoothed by the first rectifier circuit 105. A voltage which is half-wave rectified and smoothed by the first rectifier circuit 105 is inputted to the power supply circuit 106. The power supply circuit supplies a voltage which has been stabilized to the first rectifier circuit 105, the power supply circuit 106, the second rectifier circuit 107, the demodulation circuit 108, the amplifier 109, the logic circuit 110, the memory control circuit 111, the memory circuit 112, the logic circuit 113, the amplifier 114, and the modulation circuit 115.

Further, an AC signal received by the first antenna circuit 101 is inputted to the logic circuit 110 through the amplifier 109, and a logic operation is performed. Then, the memory control circuit 111 is controlled using the signal from the logic circuit 110, and the data stored in the memory circuit 112 is called out. The data called out from the memory circuit 112 is processed by the logic circuit 113, amplified by the amplifier 114, and then, the modulation circuit 115 is operated. Although the data processing is carried out in accordance with a standard such as ISO14443, ISO15693, or ISO18000, processing system other than these standards can be adopted as long as compatibility with the reader/writer is ensured.

When the modulation circuit 115 operates, impedance of the first antenna circuit 101 is changed. Accordingly, a signal of the reader/writer 201 which is reflected on the first antenna circuit 101 changes. When the reader/writer reads this change, the data stored in the memory circuit 112 in the RFID 100 can be recognized. Such a modulation method is referred to as a load modulation method.

Next, an operation when power is charged in the RFID 100 shown in FIGS. 1 and 2 by the charger 202 is described below. The signal received by the second antenna circuit is half-wave rectified and smoothed by the second rectifier circuit 107. A voltage which is half-wave rectified and smoothed by the second rectifier circuit 107 is once held in the battery 104. The power held in the battery 104 is used as power to be supplied to the power supply circuit 106. Note that when the signal supplied by the first antenna circuit can be received but there is a shortage of power for transmitting the signal to the reader/writer, a structure provided with a circuit which determines whether power is supplied by the battery may be used.

Next, an example of a top view of the RFID 100 shown in FIG. 1 is shown. In terms of function and size of the RFID 100, the RFID 100 can have a layout in which the first antenna circuit, the second antenna circuit, the signal processing circuit, and the battery are stacked or arranged side by side over the substrate. In addition, the signal processing circuit can be divided into a circuit associated with the first antenna circuit and a circuit associated with the second antenna circuit. The circuit associated with the first antenna circuit is referred to as a first signal processing circuit, and the circuit associated with the second antenna circuit is referred to as a second signal processing circuit. Specifically, the first signal processing circuit corresponds to the second rectifier circuit 107 in FIG. 1, and the second signal processing circuit corresponds to a structure other than the second rectifier circuit in the signal processing circuit 103 of FIG. 1. Top views shown in FIGS. 11A and 11B show examples of positional relationships among a first antenna circuit 1101, a second antenna circuit 1102, a first signal processing circuit 1103A, a second signal processing circuit 1103B, and a battery 1104.

Figure 11A:
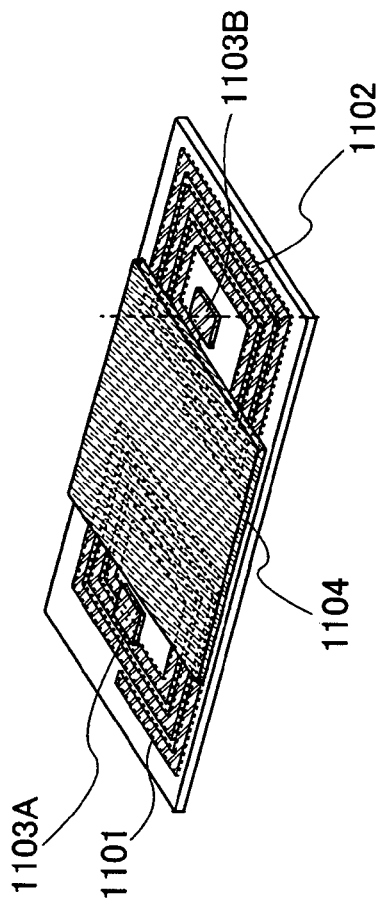
FIGS. 11A and 11B are views each showing a structure of a semiconductor device of Embodiment Mode 2.

A structure of the top view shown in FIG. 11A as an example can be a structure in which the first antenna circuit 1101, the second antenna circuit 1102, the first signal processing circuit 1103A, and the second signal processing circuit 1103B are provided on one surface; and the battery 1104 is provided on the other surface. In addition, a structure of the top view shown in FIG. 11B can be a structure in which the first antenna circuit 1101 and the first signal processing circuit 1103A are provided on one surface; the second antenna circuit 1102 and the second signal processing circuit 1103B are provided on the other surface; and the battery 1104 is provided between the first signal processing circuit 1103A and the second signal processing circuit 1103B.

Figure 11B:
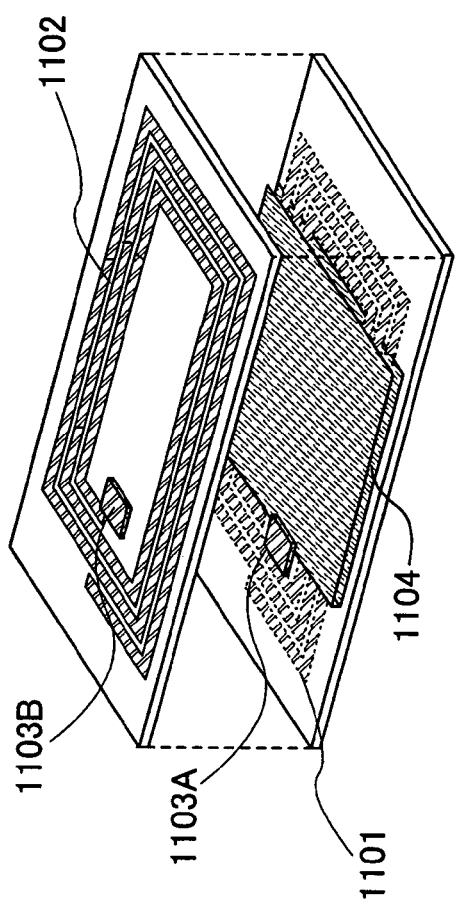

Note that in FIGS. 11A and 11B, the position of the battery 1104 in the RFID is described by illustrating the battery 1104; however, the present invention is not limited to this, depending on kinds of batteries. For example, a lithium ion secondary cell which is thinned to have a thickness of about 10 μm to 100 μm may be formed at the same time as the first signal processing circuit 1103A or the second signal processing circuit 1103B. In addition, a thin film capacitor may be formed at the same time as the first signal processing circuit 1103A or the second signal processing circuit 1103B to be used as the battery 1104. A semiconductor device including an RFID having the battery 1104, the first signal processing circuit 1103A, and the second signal processing circuit 1103B which are made smaller and thinned is preferably used because of wide flexibility and wider application range.

As described above, a semiconductor device including an RFID of the present invention includes a battery. Therefore, similarly to a conventional semiconductor device, the semiconductor device of the present invention can prevent power shortage for transmitting and receiving individual information associated with deterioration over time of a cell. In addition, the semiconductor device of the present invention has an antenna which receives a signal for supplying power to the battery. Therefore, when power of radio waves from outside is used, the battery can be charged without direct connection between the semiconductor device and the charger. Accordingly, the semiconductor device of the present invention can be continuously used without generating confirmation of remaining capacity of a cell and replacement of a cell, like an active type RFID. In addition, power is held in the battery, so that enough power for operating the RFID can be obtained and a communication distance between a reader/writer and the RFID can be extended.

Note that this embodiment mode can be implemented combining with description of other embodiment modes in this specification.

Embodiment Mode 2

This embodiment mode will describe a structure having a booster antenna circuit (hereinafter referred to as a booster antenna) in a semiconductor device having the RFID shown in Embodiment Mode 1, with reference to drawings. Note that in the drawings which are used in this embodiment mode, the same reference numerals are used for the same portions as in Embodiment Mode 1.

Note that a booster antenna described in this embodiment mode means an antenna (hereinafter referred to as a booster antenna) which is larger than an antenna (hereinafter referred to as a first chip antenna or a first antenna circuit) which receives a signal from a reader/writer and outputs it to a signal processing circuit of an RFID included in a semiconductor device, or an antenna (hereinafter referred to as a second chip antenna or a second antenna circuit) which receives a signal from a charger included in the semiconductor device. The booster antenna and the first chip antenna or the second chip antenna resonate at a frequency band and are magnetic-field coupled, so that a signal oscillated by the reader/writer or the charger can be efficiently transmitted to a targeted RFID. Since the booster antenna is connected to a coil antenna through a magnetic field, the booster antenna is not required to be directly connected to the chip antenna and the signal processing circuit, which is preferable.

A semiconductor device which is used for the RFID in this embodiment mode is described with reference to block diagrams shown in FIGS. 12 and 13.

Figure 12:
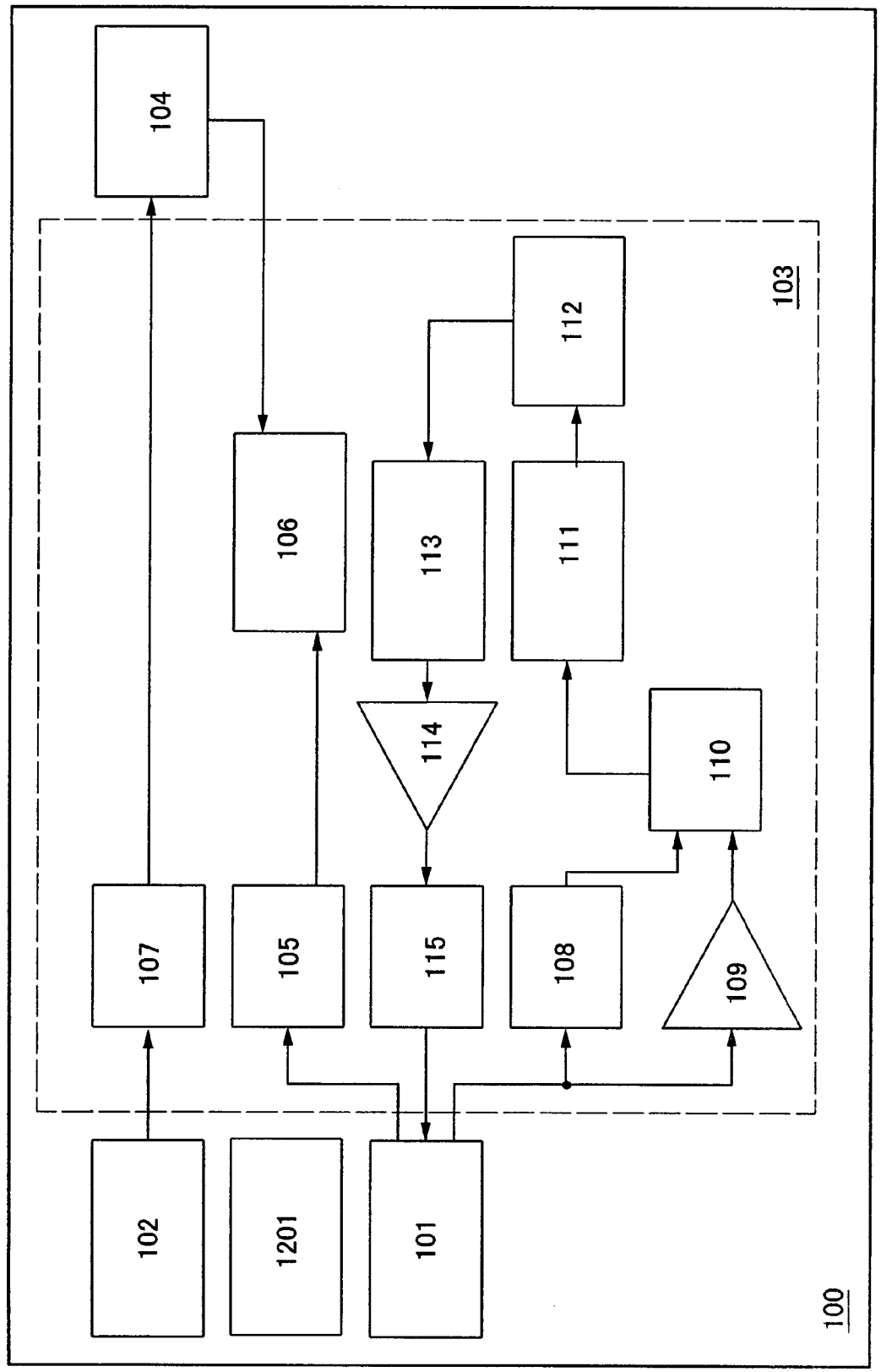
FIG. 12 is a diagram showing a structure of a semiconductor device of Embodiment Mode 2.

The RFID 100 of FIG. 12 includes the first antenna circuit 101, the second antenna circuit 102, a booster antenna 1201, the signal processing circuit 103, and the battery 104. The signal processing circuit 103 includes the first rectifier circuit 105, the power supply circuit 106, the second rectifier circuit 107, the demodulation circuit 108, the amplifier 109, the logic circuit 110, the memory control circuit 111, the memory circuit 112, the logic circuit 113, the amplifier 114, and the modulation circuit 115.

Figure 13:
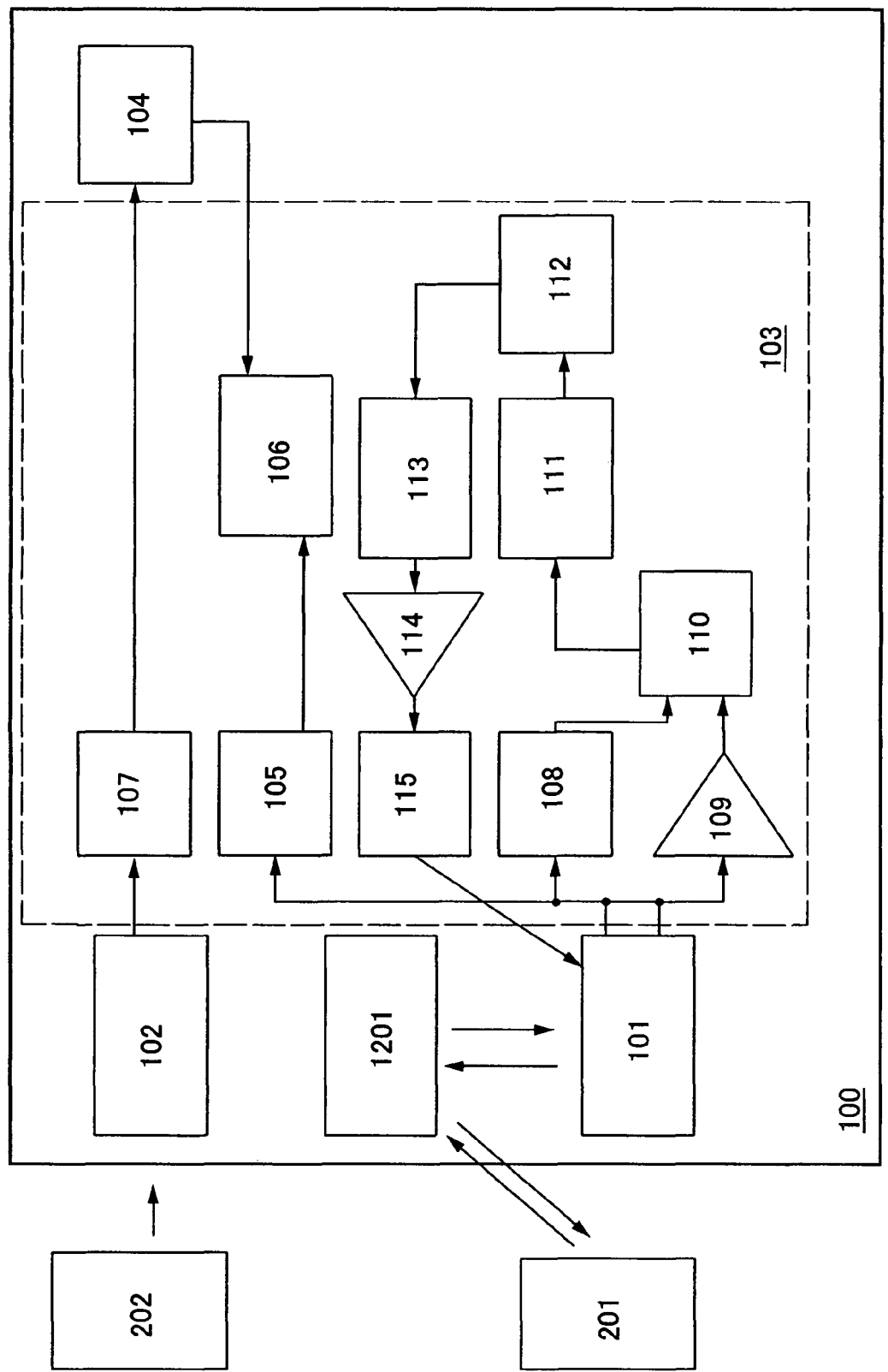
FIG. 13 is a diagram showing a structure of a semiconductor device of Embodiment Mode 2.

FIG. 13 shows a block diagram in which the booster antenna 1201 transmits and receives a signal to and from the reader/writer 201, and is magnetic-field coupled to the first antenna circuit 101, so that a signal from the reader/writer is transmitted and received, and the second antenna circuit 102 receives a signal from the charger 202. In FIG. 13, the booster antenna 1201 receives the signal from the reader/writer 201 and is magnetic-field coupled to the first antenna circuit in accordance with electromagnetic induction, so that the signal received by the first antenna circuit 101 is inputted to the power supply circuit 106 through the first rectifier circuit 105 and inputted to the demodulation circuit 108 and the amplifier 109. In addition in FIG. 13, the signal received by the second antenna circuit 102 is inputted to the battery 104 through the second rectifier circuit 107, and power is supplied to the power supply circuit 106 from the battery 104, as appropriate. With the structure shown in FIG. 13, a communication distance of transmission and reception of a signal between the reader/writer 201 and the RFID 100 can be extended more than Embodiment Mode 1, which is preferable because data can be transmitted and received more surely.

In addition, the tuning of the booster antenna 1201 is not limited to the first antenna circuit, and the booster antenna 1201 can be magnetic-field coupled to another antenna by varying a frequency band that the booster antenna 1201 is tuned.

Figure 14:
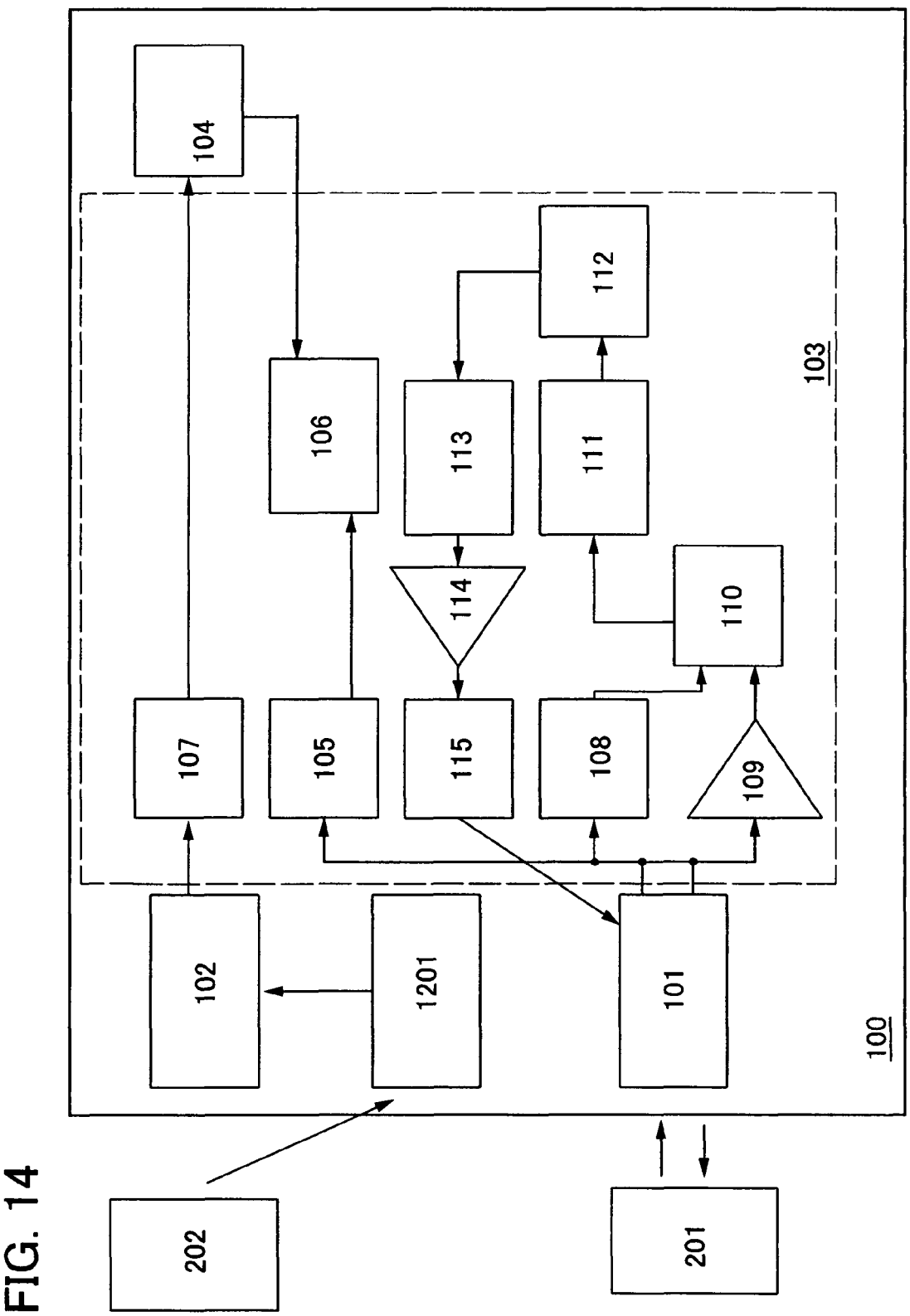
FIG. 14 is a diagram showing a structure of a semiconductor device of Embodiment Mode 2.

For example, FIG. 14 shows a block diagram in which the booster antenna 1201 receives a signal from the charger 202 and is magnetic-field coupled to the second antenna circuit 102, so that a signal from the charger is received and the first antenna circuit 101 transmits and receives a signal to and from the reader/writer 201. In FIG. 14, the booster antenna 1201 receives the signal from the charger 202 and is magnetic-field coupled to the second antenna circuit in accordance with electromagnetic induction, so that the signal received by the second antenna circuit 102 is inputted to the battery 104 through the second rectifier circuit 107. Then, power is supplied to the power supply circuit 106 from the battery 104, as appropriate. In addition in FIG. 14, the signal received by the first antenna circuit 101 is inputted to the power supply circuit 106 through the first rectifier circuit 105, and inputted to the demodulation circuit 108 and the amplifier 109. With the structure shown in FIG. 14, a communication distance of transmission and reception of a signal between the charger 202 and the RFID 100 can be extended, which is preferable because charge can be performed to the battery more surely.

Further, the tuning of the booster antenna 1201 is not limited to either the first antenna circuit or the second antenna, and the booster antenna 1201 can be magnetic-field coupled to a plurality of antennas by expanding a frequency band that the booster antenna 1201 is tuned.

Figure 15:
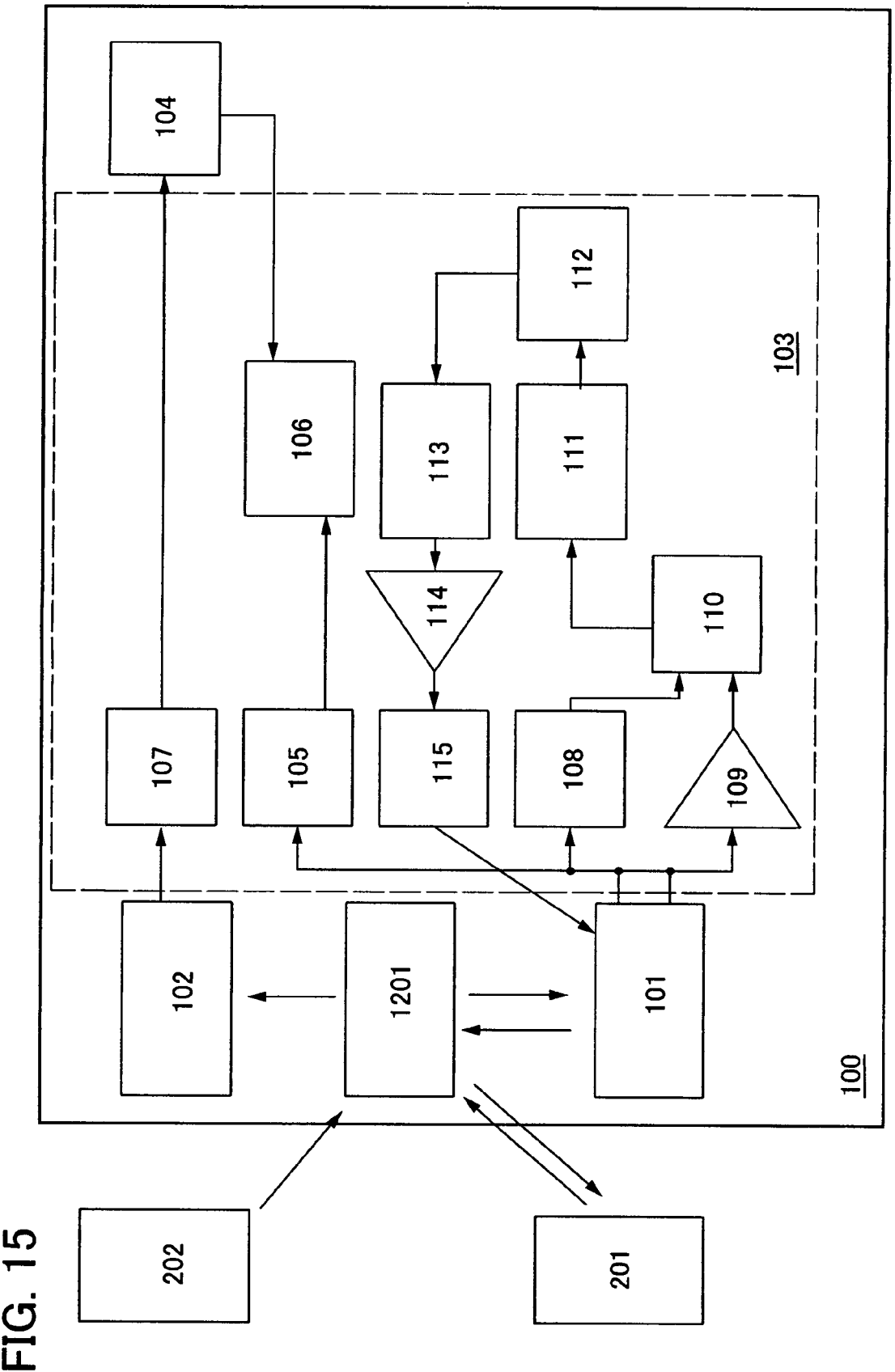
FIG. 15 is a diagram showing a structure of a semiconductor device of Embodiment Mode 2.

For example, FIG. 15 shows a block diagram in which the booster antenna 1201 transmits and receives a signal to and from the reader/writer 201 and the charger 202 and is magnetic-field coupled to the first antenna circuit 101 and the second antenna circuit 102, so that a signal from the reader/writer and a signal from the charger are transmitted and received. In FIG. 15, the booster antenna 1201 receives the signal from the reader/writer 201 and is magnetic-field coupled to the first antenna circuit in accordance with electromagnetic induction, so that the signal received by the first antenna circuit 101 is inputted to the power supply circuit 106 through the first rectifier circuit 105. In addition, in FIG. 15, the booster antenna 1201 receives the signal from the charger 202 and is magnetic-field coupled to the second antenna circuit in accordance with electromagnetic induction, so that the signal received by the second antenna circuit 102 is inputted to the battery 104 through the second rectifier circuit 107. Then, power is supplied to the power supply circuit 106 from the battery 104, as appropriate. Frequencies that the first antenna circuit and the second antenna circuit are tuned are close to each other, so that efficiency of electromagnetic induction in the booster antenna is more increased, which is preferable. Therefore, when a frequency of a signal transmitted and received between the second antenna circuit 102 and the charger 202 is set m (m is a positive number) and a frequency of a signal transmitted and received between the first antenna circuit 101 and the reader/writer 201 is set M (M is a positive number), a frequency which satisfies a relation of $0.5\ m < M < 1.5\ m$ and $m \neq M$ is preferably used. In addition to the above advantageous effect, when a frequency of a signal inputted to the second antenna circuit 102 is set within the above range, design can be performed without significantly changing the shapes of the first antenna circuit 101 and the second antenna circuit 102, which is preferable. With the structure shown in FIG. 15, a communication distance of transmission and reception of a signal between the reader/writer 201 and the RFID 100 and of transmission and reception of a signal between the charger 202 and the RFID 100 can be extended, which is preferable because data can be transmitted and received more surely and charge can be performed to the battery 104 more surely.

Note that shapes of antennas in the first antenna circuit 101, the second antenna circuit 102, and the booster antenna are not particularly limited. For example, the antenna having the shape shown in FIG. 3B described in Embodiment Mode 1 can be adopted. Note that an antenna which has a larger shape than the antenna circuit which is magnetic-field coupled is preferably used as the booster antenna because of its function. In addition, each of the first antenna circuit 101, the second antenna circuit 102, and the booster antenna is described to have a structure including the antenna 401 and the resonant capacitor 402 as shown in FIG. 4A described in Embodiment Mode 1, and the antenna circuit 403 refers to a combination of the antenna 401 and the resonant capacitor 402.

In addition, the first rectifier circuit 105 and the second rectifier circuit 107 in FIGS. 12 to 15 are similar to the ones shown in Embodiment Mode 1, and the rectifier circuit 407 may include the diode 404, the diode 405, and the smoothing capacitor 406, as shown in FIG. 4B.

Note that the reader/writer 201 in FIGS. 13 to 15 is similar to the one shown in Embodiment Mode 1, and the structure shown in FIG. 5 may be used.

Note that the charger 202 in FIGS. 13 to 15 is similar to the one shown in Embodiment Mode 1, and the structure shown in FIG. 6 may be used.

Note that in FIGS. 13 to 15, the first antenna circuit 101 and the second antenna circuit 102 may be stacked over the same substrate with the signal processing circuit 103, or may be provided as external antennas.

Figure 16:
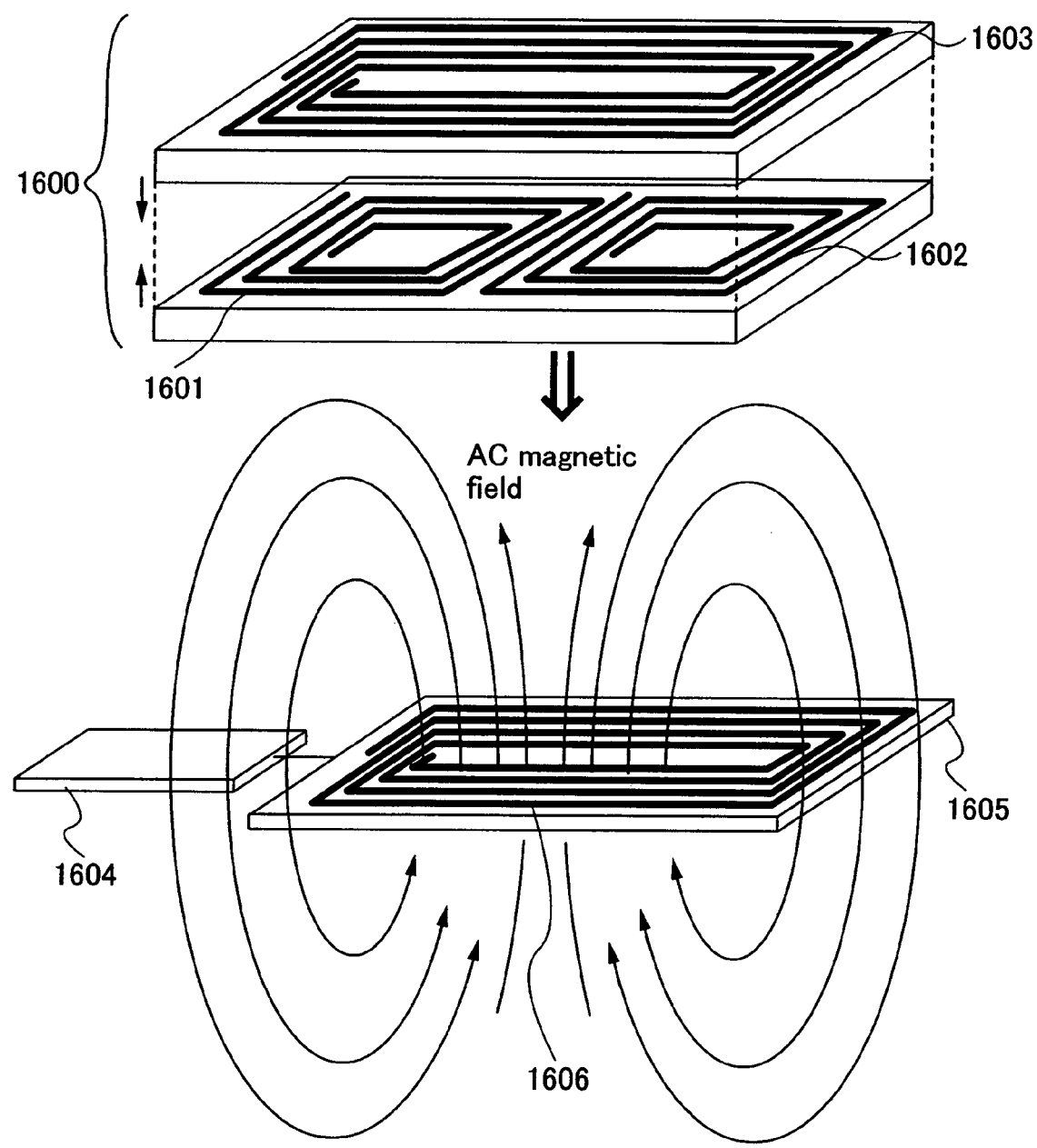
FIG. 16 is a view showing a structure of a semiconductor device of Embodiment Mode 2.

In this embodiment mode, signals received by the first antenna circuit 101, the second antenna circuit 102, and the booster antenna 1201 are preferably communicated by an electromagnetic induction method. Therefore, the RFID 100 in FIGS. 13 to 15 preferably has a structure including the first coiled antenna circuit 101, the second coiled antenna circuit 102, and the coiled booster antenna 1201. For example, FIG. 16 shows a positional relationship among the first antenna circuit, the second antenna circuit, and the booster antenna, and the shapes of antennas in the semiconductor device which includes the RFID having the structure shown in FIG. 14. FIG. 16 shows a structure in which a first coiled antenna circuit 1601 and a second coiled antenna circuit 1602 are provided on one surface of an RFID 1600, and a booster antenna 1603 is provided on the other surface of the RFID 1600, and in which a signal from an antenna of a charger is received.

In FIG. 16, when a coiled antenna 1606 in an antenna circuit 1605 of a charger connected to a transmission control portion 1604 is brought close to the booster antenna 1603 of the RFID, an AC magnetic field is generated from the coiled antenna 1606 of the antenna circuit 1605 in the charger. The AC magnetic field passes through the coiled booster antenna 1603 in the RFID 1600, so that an electromotive force is generated between terminals (between one end of the antenna and the other end thereof) of the coiled booster antenna 1603 in the RFID 1600 due to electromagnetic induction. The electromotive force due to electromagnetic induction is generated in the coiled booster antenna 1603, and an AC magnetic field is generated from the booster coil itself. Then, the AC magnetic field generated from the booster antenna 1603 passes through the second coiled antenna circuit 1602 in the RFID 1600, so that an electromotive force is generated between terminals (between one end of the antenna and the other end thereof) of the second coiled antenna circuit 1602 in the RFID 1600 due to electromagnetic induction. A battery in the RFID 1600 can be charged by the electromotive force.

Figure 17:
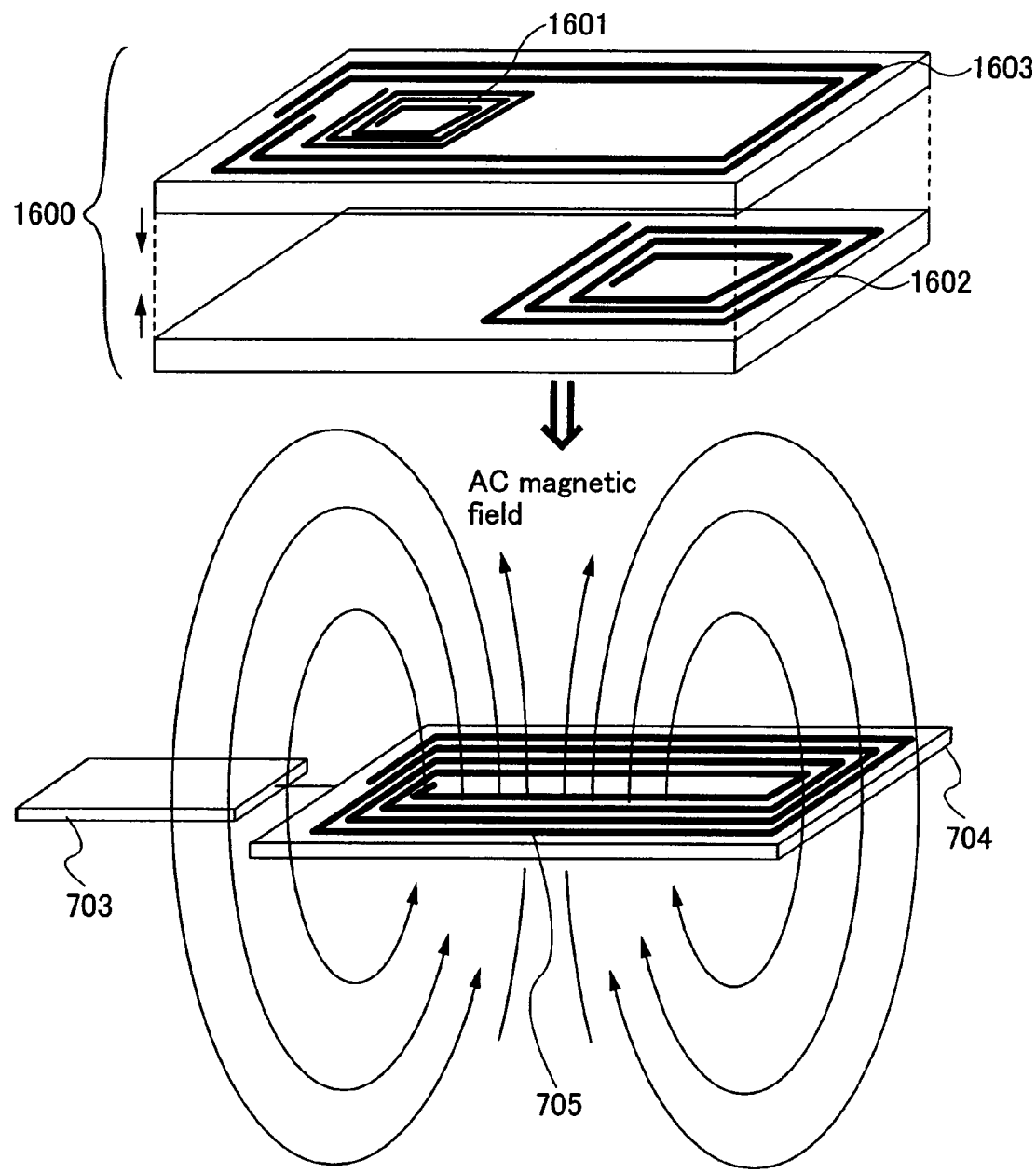
FIG. 17 is a view showing a structure of a semiconductor device of Embodiment Mode 2.

In addition, FIG. 17 shows a structure which is different from the structure shown in FIG. 16. FIG. 17 shows a structure in which the coiled booster antenna 1603 and either the first antenna circuit 1601 or the second antenna circuit 1602 are provided on one surface of the RFID 1600, and the other of the first antenna circuit 1601 and the second antenna circuit 1602 is provided on the other surface of the RFID 1600, and in which a signal from the antenna of the charger is received. In FIG. 17, when the coiled antenna 1606 in the antenna circuit 1605 of the charger connected to the transmission control portion 1604 is brought close to the booster antenna 1603 of the RFID, an AC magnetic field is generated from the coiled antenna 1606 of the antenna circuit 1605 in the charger. The AC magnetic field passes through the coiled booster antenna 1603 in the RFID 1600, so that an electromotive force is generated between the terminals (between the one end of the antenna and the other end thereof) of the coiled booster antenna 1603 in the RFID 1600 due to electromagnetic induction. The electromotive force due to electromagnetic induction is generated in the coiled booster antenna 1603, and an AC magnetic field is generated from the booster coil itself. Then, the AC magnetic field generated from the booster antenna 1603 passes through the second coiled antenna circuit 1602 in the RFID 1600, and an electromotive force is generated between the terminals (between the one end of the antenna and the other end thereof) of the second coiled antenna circuit 1602 in the RFID 1600 due to electromagnetic induction. The battery in the RFID 1600 can be charged by the electromotive force. The arrangement of the first antenna circuit, the second antenna circuit, and the booster antenna in this embodiment mode may be designed so that the antennas are located to make an AC magnetic field pass through the antenna coil. In addition, as shown in FIG. 17, by arranging the first antenna circuit or the second antenna circuit inside the booster antenna which holds a large area, efficient arrangement can be performed; therefore, a battery area or the like can be increased and the number of windings of an antenna can be increased, which is preferable.

The RFID 1600 shown FIGS. 16 and 17 can be charged from the charger even when the RFIDs are superimposed as shown in FIG. 8 in Embodiment Mode 1.

Note that a frequency of a signal transmitted and received between the first antenna circuit 101 and the reader/writer 201 is similar to that of Embodiment Mode 1; therefore, description is omitted in this embodiment mode.

Note that a frequency of a signal transmitted and received between the second antenna circuit 102 and the charger 202 is similar to that of Embodiment Mode 1; therefore, description is omitted in this embodiment mode.

Note that power can be supplied to the power supply circuit 106 in FIGS. 12 to 15 by two ways: one is a power supply which is made such that a signal of a carrier wave is rectified in the first rectifier circuit 105 similarly to the passive type RFID described in the conventional example, and a power supply which drives each circuit of the signal processing circuit 103 is generated through the power supply circuit 106; the other is a power supply which is made such that the battery 104 is charged by a battery charging signal inputted from the second antenna circuit 102 through the second rectifier circuit 107, and power which is charged in the battery 104 is supplied. The power which is charged in the battery 104 can be supplied to the power supply circuit 106 in the case where enough power cannot be obtained from the first antenna circuit 101 of the RFID 100 when a communication distance extends.

The power supply circuit 106 in FIGS. 12 to 15 is similar to the example shown in FIG. 10 in Embodiment Mode 1; therefore, description is omitted in this embodiment mode.

In addition, an operation of the RFID 100 shown in FIGS. 12 to 15 is similar to the operation described in Embodiment Mode 1; therefore, description is omitted in this embodiment mode.

Next, an example of a top view of the RFID 100 shown in FIG. 12 is shown. In terms of function and size of the RFID 100 shown in FIG. 12, the RFID 100 can have a layout in which the first antenna circuit, the second antenna circuit, the booster antenna, the signal processing circuit, and the battery are stacked or arranged side by side over the substrate. In addition, the signal processing circuit can be divided into a circuit associated with the first antenna circuit and a circuit associated with the second antenna circuit. The circuit associated with the first antenna circuit is referred to as a first signal processing circuit, and the circuit associated with the second antenna circuit is referred to as a second signal processing circuit. Specifically, the first signal processing circuit corresponds to the second rectifier circuit 107 in FIG. 12, and the second signal processing circuit corresponds to a structure other than the second rectifier circuit in the signal processing circuit 103 of FIG. 12. A top views shown in FIG. 18 shows an example of a positional relationship among a first antenna circuit 1801, a second antenna circuit 1802, a first signal processing circuit 1803A, a second signal processing circuit 1803B, a battery 1804, and a booster antenna 1805.

Figure 18:
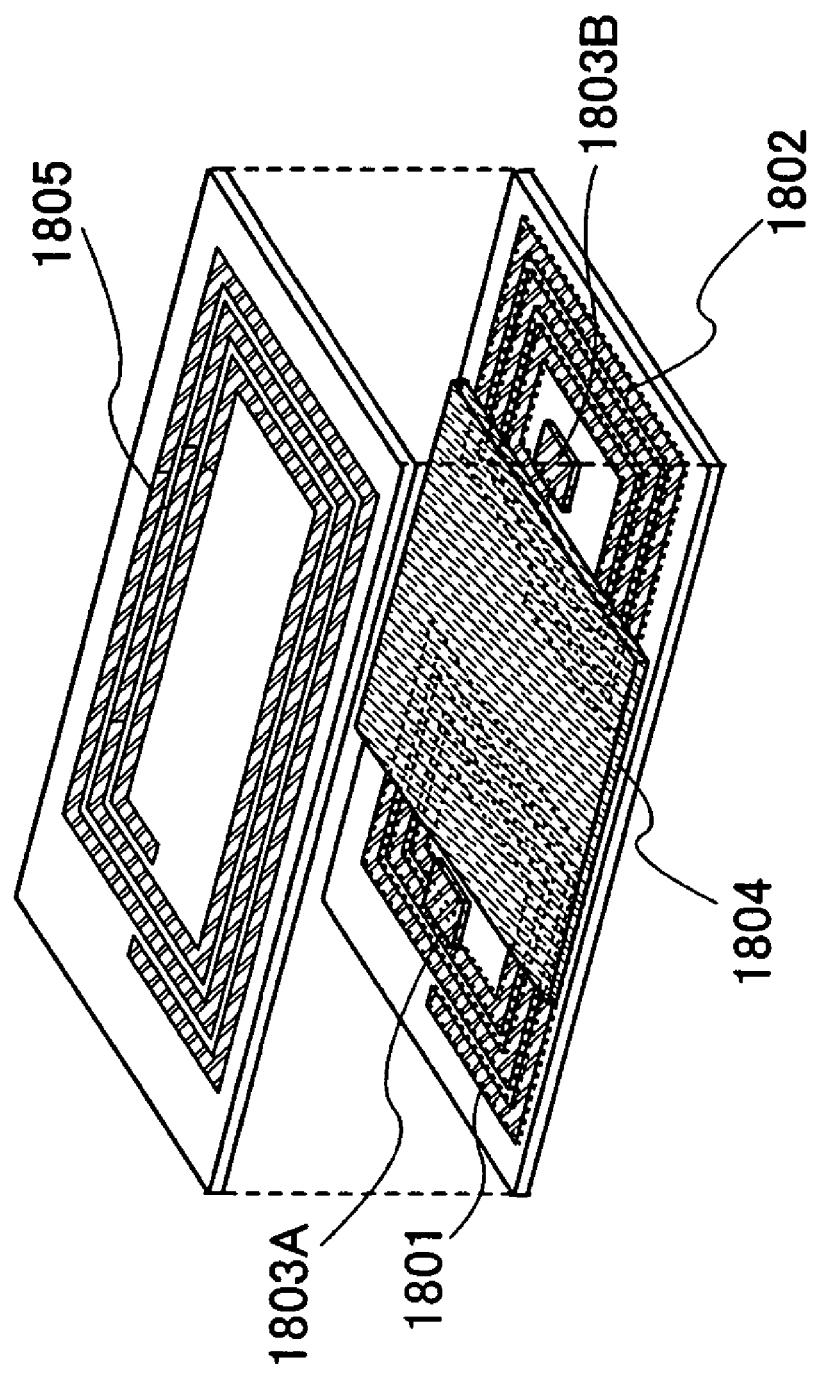
FIG. 18 is a view showing a structure of a semiconductor device of Embodiment Mode 2.

A structure of the top view shown in FIG. 18 as an example can be a structure in which the first antenna circuit 1801, the second antenna circuit 1802, the first signal processing circuit 1803A, and the second signal processing circuit 1803B are provided on one surface; the booster antenna 1805 is provided on the other surface; and the battery 1804 is provided between the first signal processing circuit 1803A and the second signal processing circuit 1803B.

Note that in FIG. 18, the position of the battery 1804 in the RFID is described by illustrating the battery 1804; however, the present invention is not limited to this depending on kinds of batteries. For example, a lithium ion secondary cell which is thinned to have a thickness of about 10 μm to 100 μm may be formed at the same time as the first signal processing circuit 1803A or the second signal processing circuit 1803B. In addition, a thin film capacitor may be formed at the same time as the first signal processing circuit 1803A or the second signal processing circuit 1803B to be used as the battery 1804. A semiconductor device including an RFID having the battery 1804 which is thinned and the first signal processing circuit 1803A or the second signal processing circuit 1803B which is made smaller and thinned is preferably used because of wide flexibility, wider application range, and a shortened manufacturing process.

As described above, a semiconductor device including an RFID of the present invention includes a battery. Therefore, similarly to a conventional semiconductor device, the semiconductor device of the present invention can prevent power shortage for transmitting and receiving individual information associated with deterioration over time of a cell. In addition, the semiconductor device of the present invention has an antenna which receives a signal for supplying power to the battery. Therefore, when power of radio waves from outside is used, the battery can be charged without direct connection between the semiconductor device and the charger. Accordingly, the semiconductor device of the present invention can be continuously used without generating confirmation of remaining capacity of a cell and replacement of a cell, like an active type RFID. In addition, power for driving the RFID is always held in the battery, so that enough power for operating the RFID can be obtained, and a communication distance between a reader/writer and the RFID can be extended.

Furthermore, the structure of this embodiment mode has the booster antenna in addition to the structure of Embodiment Mode 1. Therefore, there is an advantage in that communication can be performed surely for transmitting and receiving data between the RFID and the reader/writer and receiving a signal for charging from the charger by the RFID.

Note that this embodiment mode can be implemented combining with description of other embodiment modes in this specification.

Embodiment Mode 3

This embodiment mode will describe an example of a method for manufacturing the semiconductor device shown in the above embodiment modes, with reference to drawings.

Figure 19A:
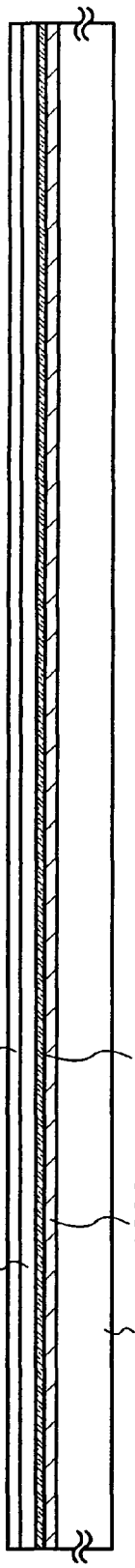
FIGS. 19A to 19D are diagrams showing a structure of a semiconductor device of Embodiment Mode 3.

First, a release layer 1903 is formed over one surface of a substrate 1901 with an insulating film 1902 interposed therebetween, and sequentially, an insulating film 1904 which serves as a base film and a semiconductor film 1905 (a film containing amorphous silicon, for example) are stacked in FIG. 19A. Note that the insulating film 1902, the release layer 1903, the insulating film 1904, and the semiconductor film 1905 can be formed sequentially.

Note that as the substrate 1901, a glass substrate, a quartz substrate, a metal substrate (such as a ceramic substrate or a stainless steel substrate), or a semiconductor substrate such as a Si substrate can be used. In addition, as a plastic substrate, a substrate formed of polyethylene terephthalate (PET), polyethylene naphthalate (PEN), polyether sulfone (PES), acrylic, or the like can be used. Note that in this process, the release layer 1903 is provided over the entire surface of the substrate 1901 with the insulating film 1902 interposed therebetween. However, the release layer may be provided over the entire surface of the substrate 1901, and then, the release layer may be selectively provided by a photolithography method, if necessary.

The insulating film 1902 and the insulating film 1904 are formed of an insulating material such as silicon oxide, silicon nitride, silicon oxynitride ($SiO_xN_y$) (x>y>0), or silicon nitride oxide ($SiN_xO_y$) (x>y>0), by a CVD method, a sputtering method, or the like. For example, in the case where the insulating film 1902 and the insulating film 1904 each have a two-layer structure, a silicon nitride oxide film may be formed as a first insulating film and a silicon oxynitride film may be formed as a second insulating film. Alternatively, a silicon nitride film may be formed as the first insulating film and a silicon oxide film may be formed as the second insulating film. The insulating film 1902 functions as a blocking layer which prevents an impurity element from being mixed from the substrate 1901 into the release layer 1903 or an element formed thereover. The insulating film 1904 functions as a blocking layer which prevents an impurity element from being mixed from the substrate 1901 and the release layer 1903 into an element formed over the insulating film 1904. By forming the insulating film 1902 and the insulating film 1904 each functioning as a blocking layer in this manner, it is possible to prevent alkaline earth metal or alkali metal such as Na in the substrate 1901, or an impurity element contained in the release layer 1903 from adversely affecting the element to be formed over the insulating film 1904. In the case of using quartz as the substrate 1901, the insulating film 1902 and the insulating film 1904 may be omitted.

As the release layer 1903, a metal film, a stacked-layer structure of a metal film and a metal oxide film, or the like can be used. The metal film is formed as a single layer or stacked layers of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir), or an alloy material or a compound material containing the above-described element as its main component. The metal film can be formed by a sputtering method, various CVD methods such as a plasma CVD method, or the like, using these materials. As the stacked-layer structure of a metal film and a metal oxide film, after the above-described metal film is formed, an oxide or oxynitride of the metal film can be formed on the metal film surface by performing plasma treatment in an oxygen atmosphere or an $N_2O$ atmosphere, or heat treatment in an oxygen atmosphere or an $N_2O$ atmosphere. For example, in the case where a tungsten film is formed by a sputtering method, a CVD method, or the like as the metal film, a metal oxide film of a tungsten oxide can be formed on the tungsten film surface by performing plasma treatment on the tungsten film. In this case, an oxide of tungsten is expressed by $WO_x$, and x is 2 to 3. There are cases of x=2 ($WO_2$), x=2.5 ($W_2O_5$), x=2.75 ($W_4O_{11}$), x=3 ($WO_3$), and the like. When an oxide of tungsten is formed, the value of x described above is not particularly restricted, and which oxide is to be formed may be decided based on an etching rate or the like. Alternatively, for example, a metal film (such as tungsten) may be formed, and then, an insulating film of silicon oxide ($SiO_2$) or the like may be formed over the metal film by a sputtering method, and a metal oxide may be formed over the metal film (for example, tungsten oxide over tungsten). In addition, as plasma treatment, the above-described high-density plasma treatment may be performed, for example. In addition, other than the metal oxide film, a metal nitride or a metal oxynitride may also be used. In this case, the metal film may be subjected to the plasma treatment or the heat treatment in a nitrogen atmosphere or an atmosphere of nitrogen and oxygen.

The semiconductor film 1905 is formed with a thickness of 25 to 200 nm (preferably 30 to 150 nm) by a sputtering method, an LPCVD method, a plasma CVD method, or the like.

Figure 19B:
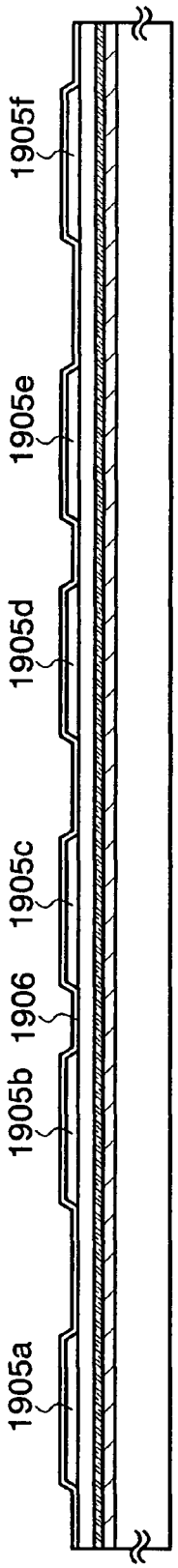

Next, the semiconductor film 1905 is crystallized by being irradiated with laser light as shown in FIG. 19B. The semiconductor film 1905 may be crystallized by a method or the like in which a laser irradiation method is combined with a thermal crystallization method using an RTA or an annealing furnace or a thermal crystallization method using a metal element for promoting crystallization. After that, the obtained crystalline semiconductor film is etched so as to have a desired shape; thereby forming crystalline semiconductor films 1905a to 1905f. Then, a gate insulating film 1906 is formed so as to cover the crystalline semiconductor films 1905a to 1905f.

The gate insulating film 1906 is formed of an insulating material such as silicon oxide, silicon nitride, silicon oxynitride ($SiO_xN_y$), (x>y>0), or silicon nitride oxide ($SiN_xO_y$), (x>y>0), by a CVD method, a sputtering method, or the like. For example, in the case where the gate insulating film 1906 has a two-layer structure, a silicon oxynitride film may be formed as a first insulating film and a silicon nitride oxide film may be formed as a second insulating film. Alternatively, a silicon oxide film may be formed as the first insulating film and a silicon nitride film may be formed as the second insulating film.

An example of a manufacturing step of the crystalline semiconductor films 1905a to 1905f will be briefly described below. First, an amorphous semiconductor film with a thickness of 50 to 60 nm is formed by a plasma CVD method. Next, a solution containing nickel that is a metal element for promoting crystallization is retained on the amorphous semiconductor film, and dehydrogenation treatment (at 500° C., for one hour) and thermal crystallization treatment (at 550° C., for four hours) are performed on the amorphous semiconductor film; thereby forming a crystalline semiconductor film. After that, the crystalline semiconductor film is irradiated with laser light, and a photolithography method is used, so that the crystalline semiconductor films 1905a to 1905f are formed. Note that without conducting the thermal crystallization using the metal element for promoting crystallization, the amorphous semiconductor film may be crystallized only by laser light irradiation.

As a laser oscillator which is used for crystallization, a continuous wave laser beam (a CW laser beam) or a pulsed wave laser beam (a pulsed laser beam) can be used. As a laser beam which can be used here, a laser beam emitted from one or more of the following can be used: a gas laser such as an Ar laser, a Kr laser or an excimer laser; a laser of which the medium is single crystalline YAG, $YVO_4$, forsterite ($Mg_2SiO_4$), $YAlO_3$, $GdVO_4$, or polycrystalline (ceramic) YAG; $Y_2O_3$, $YVO_4$, $YAlO_3$, $GdVO_4$, to which one or more of Nd, Yb, Cr, Ti, Ho, Er, Tm and Ta as a dopant is added; a glass laser; a ruby laser; an alexandrite laser; a Ti: sapphire laser; a copper vapor laser; or a gold vapor laser. It is possible to obtain crystals with a large grain size when fundamental waves of such laser beams or second to fourth harmonics of the fundamental waves are used. For example, the second harmonic (532 nm) or the third harmonic (355 nm) of an Nd:YVO$_4$ laser (fundamental wave of 1064 nm) can be used. An energy density of the laser at this time is required to be about 0.01 to 100 MW/cm (preferably, 0.1 to 10 MW/cm$^2$). Irradiation is conducted with a scanning rate of about 10 to 2000 cm/sec. Note that a laser using, as a medium, single crystalline YAG YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ to which one or more of Nd, Yb, Cr, Ti, Ho, Er, Tm, and Ta as a dopant is added; an Ar ion laser; or a Ti: sapphire laser can be continuously oscillated. Furthermore, pulse oscillation thereof can be performed with a repetition rate of 10 MHz or more by carrying out a Q-switch operation, mode synchronization or the like. In the case where a laser beam is oscillated with a repetition rate of 10 MHz or more, after a semiconductor film is melted by a laser and before it is solidified, the semiconductor film is irradiated with a next pulse. Therefore, unlike the case of using a pulsed laser with a low repetition rate, a solid-liquid interface can be continuously moved in the semiconductor film, so that crystal grains which continuously grow in a scanning direction can be obtained.

Alternatively, the gate insulating film 1906 may be formed by performing the above-described high-density plasma treatment on the semiconductor films 1905*a* to 1905*f* to oxidize or nitride the surfaces. For example, the film is formed by plasma treatment introducing a mixed gas of a rare gas such as He, Ar, Kr or Xe and oxygen, nitrogen oxide (NO$_2$), ammonia, nitrogen, hydrogen or the like. When excitation of the plasma in this case is performed by introduction of a microwave, high density plasma can be generated with a low electron temperature. By an oxygen radical (there is the case where an OH radical is included) or a nitrogen radical (there is the case where an NH radical is included) generated by this high-density plasma, the surface of the semiconductor film can be oxidized or nitrided.

By treatment using such high-density plasma, an insulating film with a thickness of 1 to 20 nm, typically 5 to 10 nm, is formed over a semiconductor film. Since the reaction of this case is a solid-phase reaction, interface state density between the insulating film and the semiconductor film can be extremely low. Since such high-density plasma treatment oxidizes (or nitrides) a semiconductor film (crystalline silicon, or polycrystalline silicon) directly, unevenness of a thickness of the insulating film to be formed can be extremely small, ideally. In addition, oxidation is not strengthened even in a crystal grain boundary of crystalline silicon, which makes a very preferable condition. That is, by a solid-phase oxidation of the surface of the semiconductor film by the high-density plasma treatment shown here, an insulating film with good uniformity and low interface state density can be formed without causing oxidation reaction abnormally in a crystal grain boundary.

As the gate insulating film 1906, an insulating film formed by the high-density plasma treatment may be used by itself, or an insulating film of silicon oxide, silicon oxynitride, silicon nitride or the like may be formed thereover by a CVD method using plasma or thermal reaction, so as to make stacked layers. In any case, a transistor including an insulating film formed by high-density plasma, in a part of the gate insulating film or in the whole gate insulating film, can reduce unevenness of the characteristic.

Furthermore, the semiconductor films 1905*a* to 1905*f* obtained by irradiating a semiconductor film with a continuous wave laser beam or a laser beam oscillated with a repetition rate of 10 MHz or more and scanning the semiconductor film in one direction for crystallization, have a characteristic that the crystal grows in the scanning direction of the beam. When a transistor is placed so that the scanning direction is aligned with the channel length direction (the direction in which a carrier flows when a channel formation region is formed) and the above-described gate insulating layer is used, a thin film transistor (TFT) with fewer characteristic variation and high electron field-effect mobility can be obtained.

Next, a first conductive film and a second conductive film are stacked over the gate insulating film 1906. Here, the first conductive film is formed with a thickness of 20 to 100 nm by a CVD method, a sputtering method or the like. The second conductive film is formed with a thickness of 100 to 400 nm. The first conductive film and the second conductive film are formed using an element selected from tantalum (Ta), tungsten (W), titanium (Ti), molybdenum (Mo), aluminum (Al), copper (Cu), chromium (Cr), niobium (Nb) or the like, or an alloy material or a compound material containing the above-described element as its main component. Alternatively, they are formed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in the case of a three-layer structure instead of a two-layer structure, a stacked-layer structure of a molybdenum film, an aluminum film and a molybdenum film may be adopted.

Next, a resist mask is formed by using a photolithography method, and etching treatment for forming a gate electrode and a gate line is performed, so that gate electrodes 1907 are formed over the semiconductor films 1905*a* to 1905*f*. Here, an example in which one of the gate electrodes 1907 has a stacked-layer structure of a first conductive film 1907*a* and a second conductive film 1907*b* is shown.

Figure 19C:
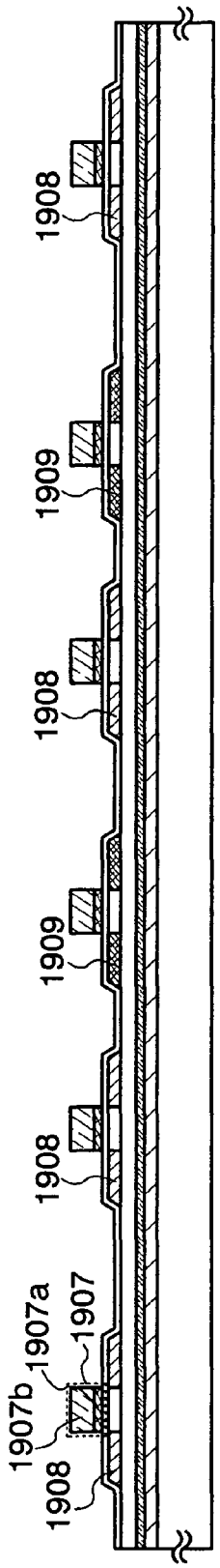

Next, as shown in FIG. 19C, the gate electrodes 1907 are used as masks, and an impurity element imparting n-type conductivity is added at low concentration to the semiconductor films 1905*a* to 1905*f*, by an ion doping method or an ion implantation method. Then, a resist mask is selectively formed by a photolithography method, and an impurity element imparting p-type conductivity is added at high concentration to the semiconductor films 1905*a* to 1905*f*. As an impurity element which shows n-type conductivity, phosphorus (P), arsenic (As), or the like can be used. As an impurity element which shows p-type conductivity, boron (B), aluminum (Al), gallium (Ga), or the like can be used. Here, phosphorus (P) is used as an impurity element imparting n-type conductivity and selectively introduced into the semiconductor films 1905*a* to 1905*f* so that they contain phosphorus (P) at a concentration of $1\times10^{15}$ to $1\times10^{19}$/cm$^3$, and thus, n-type impurity regions 1908 are formed. In addition, boron (B) is used as an impurity element imparting p-type conductivity and selectively introduced into the semiconductor films 1905*c* and 1905*e* so that they contain boron (B) at a concentration of $1\times10^{19}$ to $1\times10^{20}$/cm$^3$, and thus, p-type impurity regions 1909 are formed.

Next, an insulating film is formed so as to cover the gate insulating film 1906 and the gate electrodes 1907. The insulating film is formed as a single layer or stacked layers of a film containing an inorganic material such as silicon, an oxide of silicon, or a nitride of silicon, or an organic material such as an organic resin, by a plasma CVD method, a sputtering method, or the like. Next, the insulating film is selectively etched by anisotropic etching which mainly etch in a vertical direction, so that insulating films 1910 (also referred to as side walls) which are in contact with side surfaces of the gate electrodes 1907 are formed. The insulating films 1910 are used as masks for doping when LDD (Lightly Doped Drain) regions are formed.

Next, using a resist mask formed by a photolithography method, the gate electrodes 1907 and the insulating films 1910 as masks, an impurity element imparting n-type conductivity is added at high concentration to the semiconductor films 1905*a*, 1905*b*, 1905*d*, and 1905*f*, so that n-type impurity regions 1911 are formed. Here, phosphorus (P) is used as an impurity element imparting n-type conductivity and selectively introduced into the semiconductor films 1905*a*, 1905*b*, 1905*d*, and 1905*f* so that they contain phosphorus (P) at a concentration of $1\times10^{19}$ to $1\times10^{20}/\text{cm}^3$, and thus, the n-type impurity regions 1911, which has higher concentration than the impurity regions 1908, are formed.

Figure 19D:
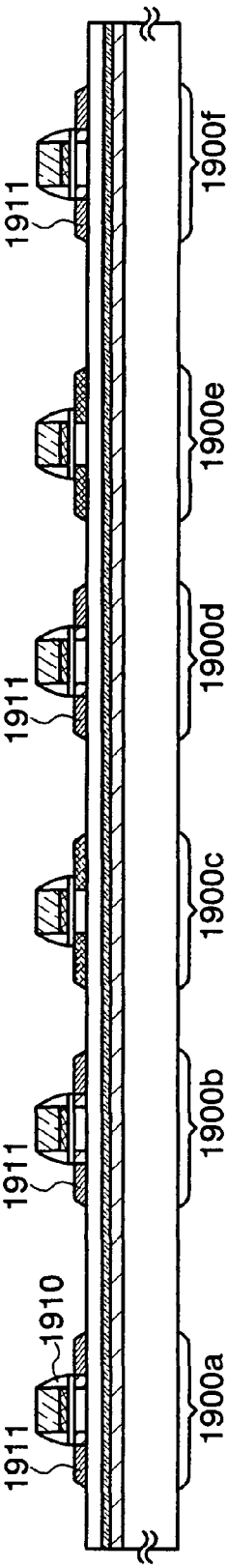

By the above-described steps, n-channel thin film transistors 1900*a*, 1900*b*, 1900*d*, and 1900*f*, and p-channel thin film transistors 1900*c* and 1900*e* are formed as shown in FIG. 19D.

Note that in the n-channel thin film transistor 1900*a*, a channel formation region is formed in a region of the semiconductor film 1905*a*, which overlaps with one of the gate electrodes 1907; the impurity regions 1911 which form a source region or a drain region are formed in regions which do not overlap with the gate electrodes 1907 and the insulating films 1910; and lightly doped drain regions (LDD regions) are formed in regions which overlap with the insulating films 1910 and between the channel formation region and the impurity regions 1911. In addition, the n-channel thin film transistors 1900*b*, 1900*d*, and 1900*f* are similarly provided with channel formation regions, lightly doped drain regions, and the impurity regions 1911.

Further, in the p-channel thin film transistor 1900*c*, a channel formation region is formed in a region of the semiconductor film 1905*c*, which overlaps with one of the gate electrodes 1907, and the impurity regions 1909 which form a source region or a drain region are formed in regions which do not overlap with one of the gate electrodes 1907. In addition, the p-channel thin film transistor 1900*e* is similarly provided with a channel formation region and the impurity regions 1909. Note that the p-channel thin film transistors 1900*c* and 1900*e* are not provided with an LDD region here; however, the p-channel thin film transistor may be provided with an LDD region and the n-channel thin film transistor is not necessarily provided with an LDD region.

Figure 20A:
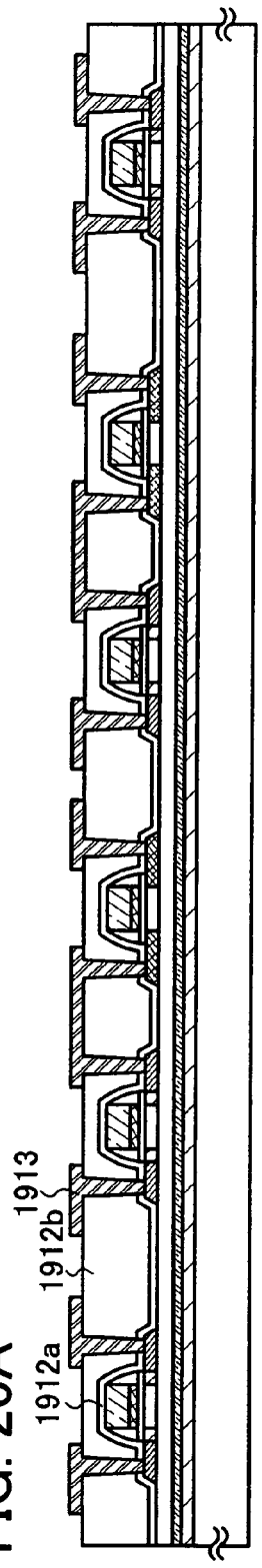
FIGS. 20A to 20C are diagrams showing a structure of a semiconductor device of Embodiment Mode 3.

Next, as shown in FIG. 20A, an insulating film is formed in a single layer or stacked layers so as to cover the semiconductor films 1905*a* to 1905*f*, the gate electrodes 1907, and the like; thereby forming a conductive film 1913 which is electrically connected to the impurity regions 1909 and 1911 which form the source regions or the drain regions of the thin film transistors 1900*a* to 1900*f*, over the insulating film. The insulating film is formed in a single layer or stacked layers using an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharge method, a screen printing method, or the like. Here, the insulating film has a two-layer structure, a silicon nitride oxide film is formed as a first insulating film 1912*a*, and a silicon oxynitride film is formed as a second insulating film 1912*b*. In addition, the conductive film 1913 forms the source electrodes or drain electrodes of the semiconductor films 1905*a* to 1905*f*.

Note that before the insulating films 1912*a* and 1912*b* are formed or after one or more of thin films of the insulating films 1912*a* and 1912*b* are formed, heat treatment for recovering the crystallinity of the semiconductor film, for activating the impurity element which has been added into the semiconductor film, or for hydrogenating the semiconductor film may be performed. For the heat treatment, thermal annealing, a laser annealing method, an RTA method, or the like may be adopted.

The conductive film 1913 is formed in a single layer or stacked layers using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or a compound material containing the above-described element as its main component by a CVD method, a sputtering method, or the like. An alloy material containing aluminum as its main component corresponds to a material which contains aluminum as its main component and also contains nickel, or an alloy material which contains aluminum as its main component and which also contains nickel and one or both of carbon and silicon, for example. The conductive film 1913 preferably employs, for example, a stacked-layer structure of a barrier film, an aluminum-silicon (Al—Si) film and a barrier film, or a stacked-layer structure of a barrier film, an aluminum-silicon (Al—Si) film, a titanium nitride (TiN) film and a barrier film. Note that a barrier film corresponds to a thin film formed by using titanium, a nitride of titanium, molybdenum, or a nitride of molybdenum. Aluminum and aluminum silicon which have low resistance and are inexpensive are optimal materials for forming the conductive film 1913. In addition, generation of a hillock of aluminum or aluminum silicon can be prevented when upper and lower barrier layers are formed. Furthermore, when the barrier film is formed by using titanium that is a highly-reducible element, even if a thin natural oxide film is formed over the crystalline semiconductor film, the natural oxide film is reduced, so that preferable contact with the crystalline semiconductor film can be obtained.

Next, an insulating film 1914 is formed so as to cover the conductive film 1913, and conductive films 1915*a* and 1915*b* to be electrically connected to the conductive film 1913 which forms the source electrodes or drain electrodes of the semiconductor films 1905*a* and 1905*f* are formed over the insulating film 1914. Conductive films 1916*a* and 1916*b* to be electrically connected to the conductive film 1913 which forms the source electrodes or drain electrodes of the semiconductor films 1905*b* and 1905*e* are formed. Note that the conductive films 1916*a* and 1916*b* may be formed of the same material at the same time as the conductive films 1915*a* and 1915*b*. The conductive films 1915*a* and 1915*b*, and the conductive films 1916*a* and 1916*b* can be formed using any material given for the conductive film 1913.

Figure 20B:
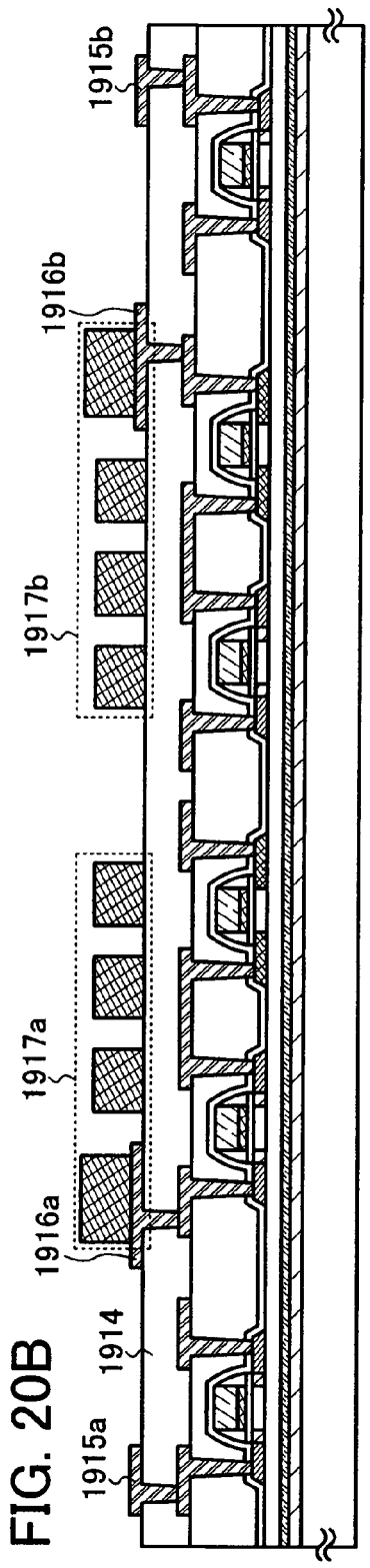

Next, as shown in FIG. 20B, conductive films 1917*a* and 1917*b* which function as antennas are formed so as to be electrically connected to the conductive films 1916*a* and 1916*b*.

Note that the insulating film 1914 can be provided with a single-layer structure of an insulating film containing oxygen and/or nitrogen such as silicon oxide ($SiO_x$), silicon nitride ($SiN_x$), silicon oxynitride ($SiO_xN_y$) (x>y), or silicon nitride oxide ($SiN_xO_y$) (x>y), a film containing carbon such as DLC (Diamond Like Carbon), an organic material such as epoxy, polyimide, polyamide, polyvinyl phenol, benzocyclobutene, or acrylic, or a siloxane material such as a siloxane resin; or a stacked-layer structure thereof by a CVD method, a sputtering method, or the like. Note that the siloxane material corresponds to a material having Si—O—Si bonds. Siloxane has a skeleton formed of a bond of silicon (Si) and oxygen (O). As a substituent, an organic group containing at least hydrogen (for example, an alkyl group or aromatic hydrocarbon) is used. As a substituent, a fluoro group can also be used. Alternatively, an organic group containing at least hydrogen and a fluoro group may be used as a substituent.

The conductive films 1917a and 1917b are formed of a conductive material by using a CVD method, a sputtering method, a printing method such as a screen printing method or a gravure printing method, a droplet discharge method, a dispensing method, a plating method, or the like. The conductive material is an element selected from aluminum (Al), titanium (Ti), silver (Ag), copper (Cu), gold (Au), platinum (Pt), nickel (Ni), palladium (Pd), tantalum (Ta), or molybdenum (Mo), an alloy material or a compound material containing the above-described element as its main component. The conductive films are formed to have a single-layer structure or a stacked-layer structure.

For example, in the case of forming the conductive films 1917a and 1917b which function as the antennas by using a screen printing method, the conductive films 1917a and 1917b can be provided by selectively printing a conductive paste in which conductive particles having a grain size of several nm to several tens of μm are dissolved or dispersed in an organic resin. As the conductive particles, metal particles of one or more kinds from any of silver (Ag), gold (Au), copper (Cu), nickel (Ni), platinum (Pt), palladium (Pd), tantalum (Ta), molybdenum (Mo), titanium (Ti), and the like, fine particles of silver halide, or dispersing nano particles can be used. In addition, as the organic resin included in the conductive paste, one or more of organic resins which are selected from organic resins which function as a binder, a solvent, a dispersing agent, and a coating member for the metal particles can be used. Typically, an organic resin such as an epoxy resin or a silicon resin can be used. Further, when the conductive film is formed, baking may be preferably performed after the conductive paste is applied. For example, in the case of using fine particles containing silver as a main component (e.g., the grain size is in the range of 1 nm to 100 nm, inclusive) as a material for the conductive paste, the conductive film can be obtained by curing by baking at a temperature of 150 to 300° C. Alternatively, fine particles containing solder or lead-free solder as a main component may be used as well; in that case, fine particles having a grain size of 20 μm or less are preferably used. Solder or lead-free solder has advantages such as a low cost.

In addition, each of the conductive films 1915a and 1915b can function as wiring which is electrically connected to a battery included in a semiconductor device of this embodiment mode in a later process. Further, when the conductive films 1917a and 1917b which function as the antennas are formed, another conductive film may be separately formed so as to be electrically connected to the conductive films 1915a and 1915b, and the conductive film may be used as the wiring connected to the battery. Note that the conductive films 1917a and 1917b in FIG. 20B correspond to the first antenna circuit and the second antenna circuit shown in Embodiment Mode 1.

Figure 20C:
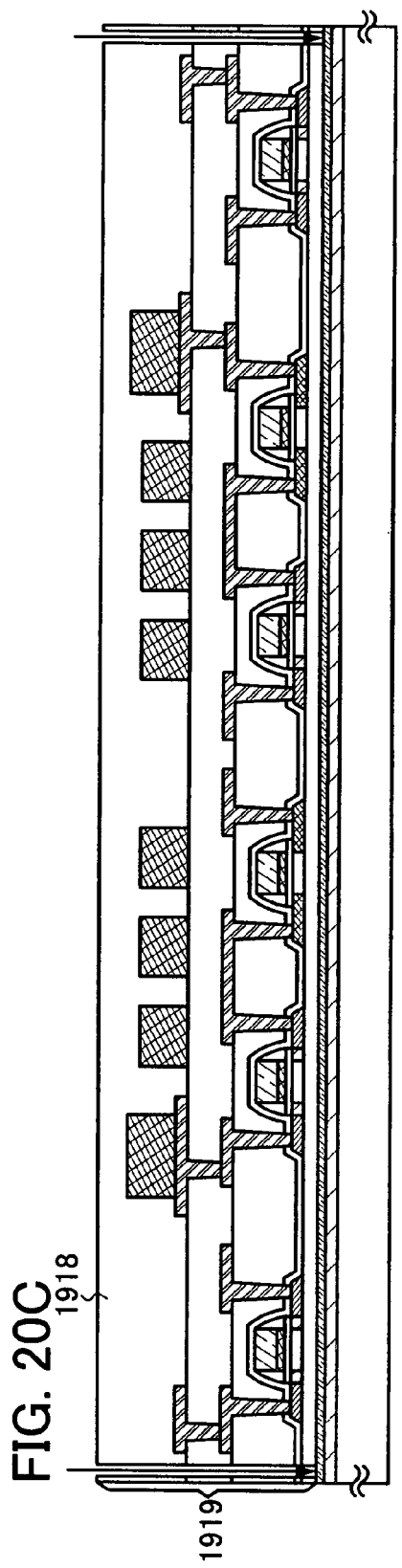

Next, as shown in FIG. 20C, after an insulating film 1918 is formed so as to cover the conductive films 1917a and 1917b, a layer (hereinafter referred to as an "element formation layer 1919") including the thin film transistors 1900a to 1900f, the conductive films 1917a and 1917b, and the like is peeled off from the substrate 1901. Here, openings are formed in regions where the thin film transistors 1900a to 1900f are not formed by laser light irradiation (e.g., UV light), and then, the element formation layer 1919 can be peeled off from the substrate 1901 by using physical force. Alternatively, before the element formation layer 1919 is peeled off from the substrate 1901, an etchant may be introduced into the formed openings to selectively remove the release layer 1903. As the etchant, gas or liquid containing halogen fluoride or an interhalogen compound is used. For example, chlorine trifluoride ($ClF_3$) is used as gas containing halogen fluoride. Accordingly, the element formation layer 1919 is peeled off from the substrate 1901. Note that the release layer 1903 may be partially left instead of being removed entirely. By leaving a part of the release layer 1903, consumption of the etchant can be reduced and time for removing the release layer can be shortened. In addition, the element formation layer 1919 can be retained over the substrate 1901 even after the release layer 1903 is removed. Further, the substrate 1901 is reused after the element formation layer 1919 is peeled off; therefore, cost can be reduced.

The insulating film 1918 can be provided with a single-layer structure of an insulating film containing oxygen and/or nitrogen such as silicon oxide ($SiO_x$), silicon nitride ($SiN_x$), silicon oxynitride ($SiO_xN_y$) (x>y), or silicon nitride oxide ($SiN_xO_y$) (x>y), a film containing carbon such as DLC (Diamond Like Carbon), an organic material such as epoxy, polyimide, polyamide, polyvinyl phenol, benzocyclobutene, or acrylic, or a siloxane material such as a siloxane resin; or a stacked-layer structure thereof by a CVD method, a sputtering method, or the like.

In this embodiment mode, as shown in FIG. 21A, after the openings are formed in the element formation layer 1919 by laser light irradiation, a first sheet material 1920 is attached to one surface of the element formation layer 1919 (a surface where the insulating film 1918 is exposed), and then, the element formation layer 1919 is peeled off from the substrate 1901.

Next, as shown in FIG. 21B, after a second sheet material 1921 is attached to the other surface (a surface exposed by peeling) of the element formation layer 1919 by one or both of heat treatment and pressure treatment. As the first sheet material 1920 and the second sheet material 1921, a hot-melt film or the like can be used.

As the first sheet material 1920 and the second sheet material 1921, a film on which an antistatic treatment for preventing static electricity or the like is performed (hereinafter referred to as an antistatic film) can be used. As the antistatic film, a film with an antistatic material dispersed in a resin, a film with an antistatic material attached thereon, and the like can be given as examples. The film provided with an antistatic material may be a film with an antistatic material provided over one of its surfaces, or a film with an antistatic material provided over each of its surfaces. As for the film with an antistatic material provided over one of its surfaces, the film may be attached to the layer so that the antistatic material is placed on the inner side of the film or the outer side of the film. The antistatic material may be provided over the entire surface of the film, or over a part of the film. As the antistatic material here, a metal, indium tin oxide (ITO), a surfactant such as an amphoteric surfactant, a cationic surfactant, or a nonionic surfactant can be used. In addition to that, as the antistatic material, a resin material containing cross-linked copolymer having a carboxyl group and a quaternary ammonium base on its side chain, or the like can be used. By attaching, mixing, or applying such a material to a film, an antistatic film can be formed. By performing the sealing using the antistatic film, adverse effects on a semiconductor element, when dealt with as a commercial product, due to static electricity from outside can be reduced.

Note that the battery is formed to be connected to the conductive films 1915*a* and 1915*b*. However, the connection with the battery may be performed before the element formation layer 1919 is peeled off from the substrate 1901 (in a step of FIG. 20B or FIG. 20C); the connection with the battery may be performed after the element formation layer 1919 is peeled off from the substrate 1901 (in a step of FIG. 21A); or the connection with the battery may be performed after the element formation layer 1919 is sealed with the first sheet material and the second sheet material (in a step of FIG. 21B). An example in which the element formation layer 1919 and the battery are formed to be connected is described with reference to FIGS. 22A to 23B below.

In FIG. 22A, conductive films 1931*a* and 1931*b* which are electrically connected to the conductive films 1915*a* and 1915*b* respectively are formed at the same time as the conductive films 1917*a* and 1917*b* which function as the antennas are formed. Next, the insulating film 1918 is formed so as to cover the conductive films 1917*a*, 1917*b*, 1931*a*, and 1931*b*. Then, openings 1932*a* and 1932*b* are formed so that surfaces of the conductive films 1931*a* and 1931*b* are exposed. Then, as shown in FIG. 22A, after openings are formed in the element formation layer 1919 by laser light irradiation, the first sheet material 1920 is attached to one surface of the element formation layer 1919 (the surface where the insulating film 1918 is exposed), and then, the element formation layer 1919 is peeled off from the substrate 1901.

Next, as shown in FIG. 22B, the second sheet material 1921 is attached to the other surface (a surface exposed by peeling) of the element formation layer 1919, and then, the element formation layer 1919 is peeled off from the first sheet material 1920. Accordingly, here, a sheet material with weak adhesion is used as the first sheet material 1920. Then, conductive films 1934*a* and 1934*b* which are electrically connected to the conductive films 1931*a* and 1931*b* through the openings 1932*a* and 1932*b* respectively are selectively formed.

The conductive films 1934*a* and 1934*b* are formed of a conductive material by using a CVD method, a sputtering method, a printing method such as a screen printing method or a gravure printing method, a droplet discharge method, a dispensing method, a plating method, or the like. The conductive material is an element selected from aluminum (Al), titanium (Ti), silver (Ag), copper (Cu), gold (Au), platinum (Pt), nickel (Ni), palladium (Pd), tantalum (Ta), or molybdenum (Mo), an alloy material or a compound material containing the above-described element as its main component. The conductive films are formed to have a single-layer structure or a stacked-layer structure.

Note that an example in which the element formation layer 1919 is peeled off from the substrate 1901, and then, the conductive films 1934*a* and 1934*b* are formed, is shown here. However, after the conductive films 1934*a* and 1934*b* are formed, the element formation layer 1919 may be peeled off from the substrate 1901.

Figure 23A:
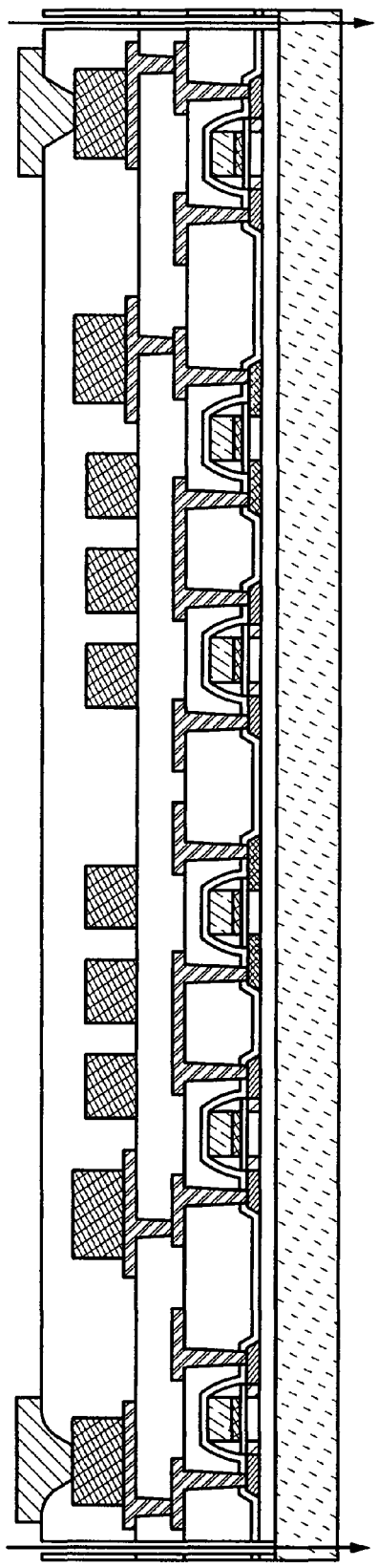
FIGS. 23A and 23B are diagrams showing a structure of a semiconductor device of Embodiment Mode 3.

Next, as shown in FIG. 23A, in the case where a plurality of elements is formed over the substrate, the element formation layer 1919 is separated by the element. A laser irradiation apparatus, a dicing apparatus, a scribing apparatus, or the like can be used for separation. Here, the plurality of elements formed over one substrate is separated from one another by laser light irradiation.

Figure 23B:
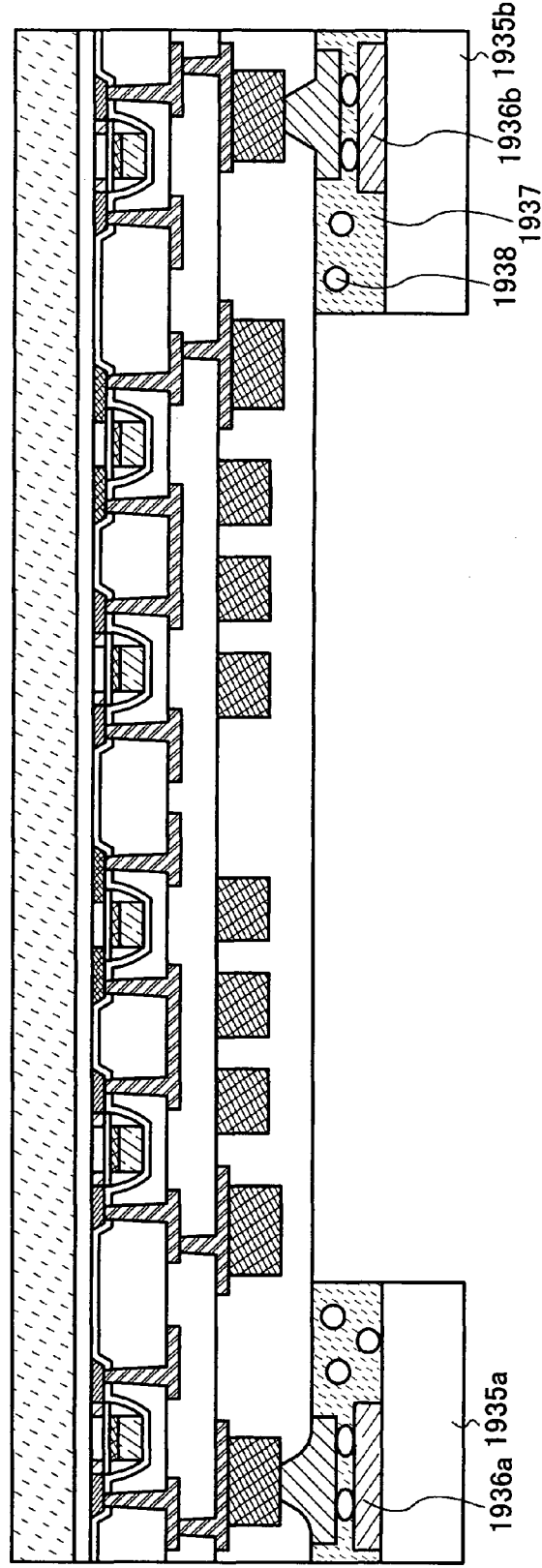

Next, as shown in FIG. 23B, the separated element is electrically connected to connecting terminals of the battery. Here, conductive films 1936*a* and 1936*b* which serve as connecting terminals of the battery provided over substrates 1935*a* and 1935*b* are connected to the conductive films 1934*a* and 1934*b* provided over the element formation layer 1919 respectively. Here, the case where the conductive film 1934*a* and the conductive film 1936*a*, or the conductive film 1934*b* and the conductive film 1936*b* are pressure-bonded to each other via a material having an adhesive property such as an anisotropic conductive film (ACF) or an anisotropic conductive paste (ACP) so as to be electrically connected to each other, is shown. Here, an example in which conductive particles 1938 contained in a resin 1937 having an adhesive property is used for connection is shown. In addition, connection can be performed by using a conductive adhesive agent such as a silver paste, a copper paste, or a carbon paste; by using solder bonding; or the like.

When the battery is larger than the element, a plurality of elements is formed over one substrate as shown in FIGS. 22A to 23B, and the element is connected to the battery after being separated. Therefore, the number of elements which can be formed in one substrate can be increased, so that a semiconductor device can be formed at low cost.

Note that as shown in the above-mentioned embodiment mode, a booster antenna may be provided over the substrate.

Note that this embodiment mode can be implemented freely combining with any of the above embodiment modes.

Embodiment Mode 4

This embodiment mode will describe an example of a semiconductor device which is different from the above embodiment mode and a manufacturing method thereof, with reference to drawings.

First, as shown in FIGS. 24A to 24D, a release layer 2403 is formed over one surface of a substrate 2401 with an insulating film 2402 interposed therebetween, and then, an insulating film 2404 which functions as a base film and a conductive film 2405 are stacked. Note that the insulating film 2402, the release layer 2403, the insulating film 2404, and the conductive film 2405 can be formed sequentially.

Note that the conductive film 2405 is formed as a single layer or stacked layers of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir), or an alloy material or a compound material containing the above-described element as its main component. The conductive film can be formed by a sputtering method, various CVD methods such as a plasma CVD method, or the like, using these materials.

In addition, each of the substrate 2401, the insulating film 2402, the release layer 2403, and the insulating film 2404 can be formed using any material of the substrate 1901, the insulating film 1902, the release layer 1903, and the insulating film 1904, described in the above embodiment mode.

Next, as shown in FIG. 24B, the conductive film 2405 is selectively etched to form conductive films 2405*a* to 2405*e*, and insulating films 2406 and 2407 are stacked so as to cover the conductive films 2405*a* to 2405*e*.

The insulating film 2406 and the insulating film 2407 are formed with an insulating material such as silicon oxide, silicon nitride, silicon oxynitride ($SiO_xN_y$) (x>y>0), or silicon nitride oxide ($SiN_xO_y$) (x>y>0) by a CVD method, a sputtering method, or the like. For example, silicon nitride oxide can be used as the insulating film 2406 and silicon oxynitride can be used as the insulating film 2407. In addition, although an example in which two insulating films are stacked is shown here, either the insulating film 2406 or the insulating film 2407 may be provided, or three or more insulating films may be stacked.

Next, as shown in FIG. 24C, semiconductor films 2408a to 2408d are selectively formed over the conductive films 2405a to 2405d. Here, an amorphous semiconductor film (for example an amorphous silicon film) is formed with a thickness of 25 to 200 nm (preferably, with a thickness of 30 to 150 nm) over the insulating film 2407 by a sputtering method, an LPCVD method, a plasma CVD method, or the like, and the amorphous semiconductor film is crystallized. Then, etching is selectively performed, so that the semiconductor films 2408a to 2408d are formed. The method shown in the above embodiment mode can be used for a material of the semiconductor film, a crystallization method thereof, or the like. In addition, the insulating film 2406, the insulating film 2407, and the amorphous semiconductor film can be formed sequentially.

Note that when a surface of the insulating film 2407 has unevenness due to the conductive films 2405a to 2405d, it is preferable that a planarization process be performed on the insulating film 2407 and the surface of the insulating film 2407 be flattened before forming the amorphous semiconductor film over the insulating film 2407. As the planarization process, a polishing process such as a CMP method can be used. As shown in FIG. 24A, by performing a polishing process such as a CMP method, a semiconductor film can be formed over the insulating film 2407 whose surface is flattened; therefore, when an element is formed using the semiconductor films 2408a to 2408d, an adverse effect on the characteristic of the element can be reduced.

Next, as shown in FIG. 24D, a gate insulating film 2409 is formed so as to cover the semiconductor films 2408a to 2408d, and gate electrodes 2410 are selectively formed over the semiconductor films 2408a to 2408c. Then, an impurity element is added to the semiconductor films 2408a to 2408d to form impurity regions 2411 by using the gate electrodes 2410 as masks. As the impurity element, an impurity element imparting n-type conductivity or p-type conductivity is added to the semiconductor films 2408a to 2408d. As the impurity element which shows n-type conductivity, phosphorus (P), arsenic (As), or the like can be used. As the impurity element which shows p-type conductivity, boron (B), aluminum (Al), gallium (Ga), or the like can be used. Here, phosphorus (P) which is an impurity element imparting n-type conductivity is introduced into the semiconductor films 2408a to 2408d so that they contain phosphorus (P) at a concentration of $1 \times 10^{19}$ to $1 \times 10^{20}/cm^3$, and thus, the n-type impurity regions 2411 are formed. Note that the present invention is not limited to this, a p-type impurity region may be formed by adding an impurity element imparting p-type conductivity, or an impurity element imparting n-type conductivity and p-type conductivity may be selectively introduced into the semiconductor films 2408a to 2408d. Here, an example in which one of the gate electrodes 2410 has a stacked-layer structure of a first conductive film 2410a and a second conductive film 2410b is shown.

By the above-described steps, n-channel thin film transistors 2400a to 2400c and an element 2400d which functions as a capacitor can be formed as shown in FIG. 24D.

In the n-channel thin film transistor 2400a, a channel formation region is formed in a region of the semiconductor film 2408a, which overlaps with one of the gate electrodes 2410; and the impurity regions 2411 which form a source region or a drain region are formed to be adjacent to the channel formation region which does not overlap with the gate electrode 2410. In addition, each of the n-channel thin film transistors 2400b and 2400c is similarly provided with a channel formation region and the impurity regions 2411 which form the source region or the drain region.

In the element 2400d, a capacitor is formed by a stacked-layer structure of the conductive film 2405d, the insulating films 2406 and 2407, and one of the impurity regions 2411 into which an impurity element is introduced.

Note that an example in which the n-channel thin film transistors 2400a to 2400c are provided is shown here; however, a p-channel thin film transistor may be provided; or as shown in the above embodiment mode, an insulating film can be provided in contact with side surfaces of the gate electrodes 2410, and lightly doped drain regions (LDD regions) can be provided in the semiconductor films of the n-channel thin film transistors 2400a to 2400c.

Here, as shown in FIG. 27A, an example in which the conductive films 2405a to 2405c are formed larger than the semiconductor films 2408a to 2408c (the conductive films 2405a to 2405c are formed so as to overlap with the channel formation regions and the impurity regions 2411 of the thin film transistors 2400a to 2400c) is shown; however, the present invention is not limited to this. For example, as shown in FIG. 27B, the conductive films 2405a to 2405c may be provided so as to overlap with a part of the impurity regions 2411 and the entire surface of the channel formation regions of the thin film transistors 2400a to 2400c; the conductive films 2405a to 2405c may be provided so as to overlap with a part of the impurity regions 2411 and a part of the channel formation regions; or the conductive films 2405a to 2405c may be provided so as to overlap with only a part of the channel formation regions. In the case of providing the conductive films 2405a to 2405c in this manner, particularly, a polishing process such as CMP is performed so that the insulating film 2407 is preferably flattened.

As shown in FIGS. 24A to 24D, this embodiment mode shows a structure in which each of the conductive films 2405a to 2405c is provided on the opposite side of the gate electrode with the semiconductor film interposed therebetween. With the structure, static electricity leaks through the conductive films 2405a to 2405c, so that electro-static discharge (ESD) of a semiconductor layer due to concentration of static electricity in the semiconductor films can be reduced. Therefore, this structure is preferably used.

In addition, by applying a constant potential to the conductive films 2405a to 2405c in this embodiment mode, a short channel effect associated with a smaller transistor size can be reduced. Accordingly, distortion of a curve of an ID-VG curve which shows a characteristic of a transistor can be reduced. In addition, by applying a constant potential to the conductive films 2405a to 2405c in this embodiment mode, a threshold value can be controlled, which is preferable. At this time, a potential which is applied to the conductive films 2405a to 2405c is preferably a potential other than a GND potential (0 V), and an applied potential may be set as appropriate in accordance with the degree of a shift of the threshold value of the transistor.

In addition to the above advantageous effect, particularly in this embodiment, as shown in FIG. 27B, the size of each of the conductive films 2405a to 2405c which is located on the opposite side of the gate electrode with the semiconductor film interposed therebetween can be larger than the size of the semiconductor films, so that physical strength of the semiconductor layer in the transistor is increased. Therefore, breakdown of the transistor in accordance with physical force applied to the transistor can be prevented.

In addition, when the gate electrodes 2410 have a function reverse to that of each of the conductive films 2405a to 2405c which is opposite side to the gate electrode with the semiconductor film interposed therebetween, or the gate electrodes 2410 and each of the conductive films 2405a to 2405c have the same function, they can complement the functions with each other. For example, ON and OFF of a transistor may be controlled by a potential to be applied to the conductive films 2405a to 2405c, and a short channel effect may be suppressed and a threshold value of a transistor may be controlled by applying a constant potential from the gate electrodes 2410. In order to surely control ON and OFF of the transistor, ON and OFF of the transistor may be controlled by both of the gate electrodes 2410 and the conductive films 2405a to 2405c.

Note that an antenna circuit may be formed over the conductive films at the same time as the conductive films 2405a to 2405c in this embodiment mode are formed. By forming the conductive films and the antenna circuit at the same time, the number of steps can be reduced and the number of masks can be reduced, which is preferable. In addition, the conductive films 2405a to 2405c can serve as wiring between semiconductor films, which is preferable.

Figure 25A:
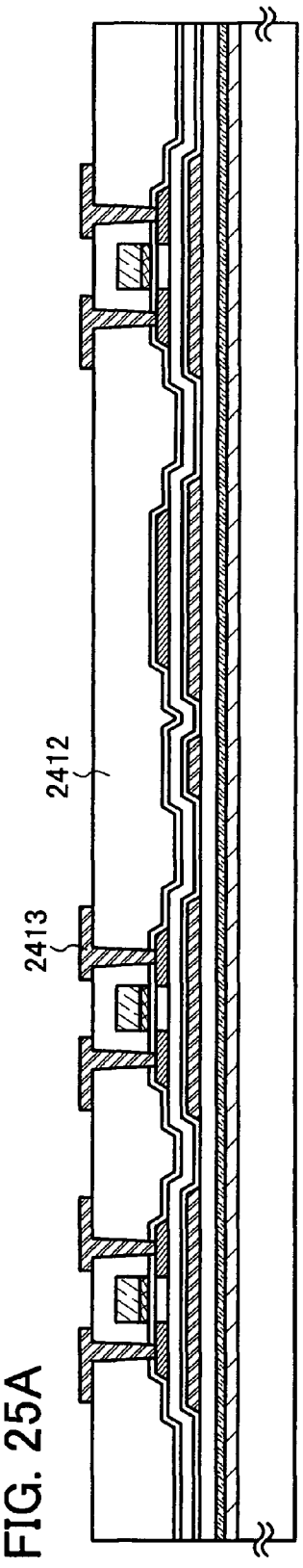
FIGS. 25A and 25B are diagrams showing a structure of a semiconductor device of Embodiment Mode 4.

Next, as shown in FIG. 25A, an insulating film 2412 is formed so as to cover the thin film transistors 2400a to 2400c, and the element 2400d. A conductive film 2413 electrically connected to the impurity regions 2411 which form the source regions or drain regions of the thin film transistors 2400a to 2400c is formed over the insulating film 2412.

The insulating film 2412 is formed in a single layer or stacked layers using an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharge method, a screen printing method, or the like.

The conductive film 2413 can be formed using any material of the conductive film 1913 described in the above embodiment mode.

Figure 25B:
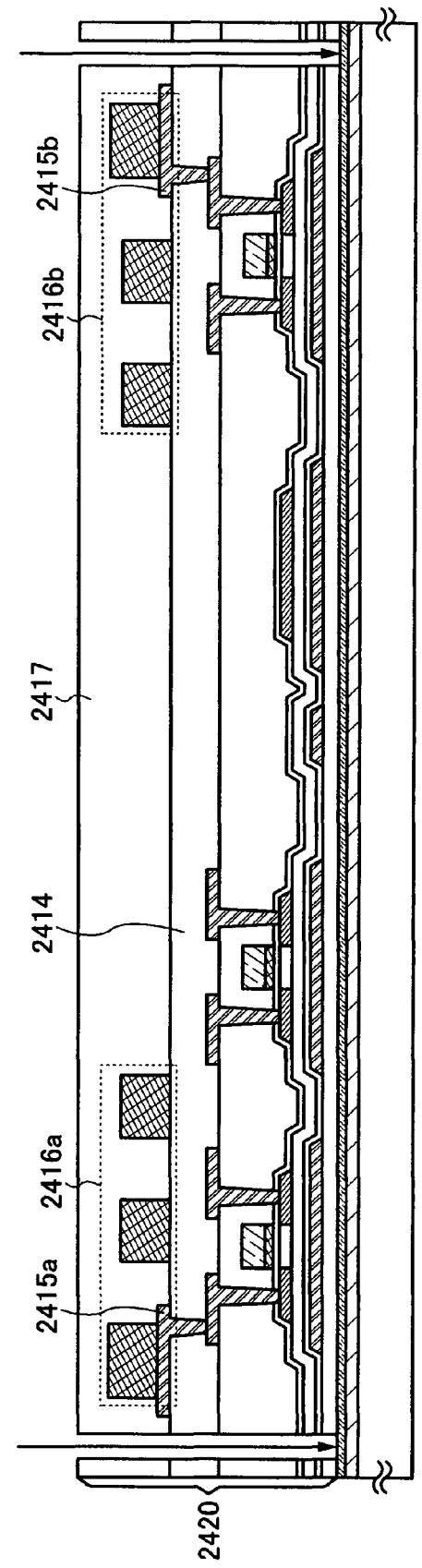

Next, as shown in FIG. 25B, an insulating film 2414 is formed so as to cover the conductive film 2413, and conductive films 2415a and 2415b which are electrically connected to the conductive film 2413 which forms the source electrodes or drain electrodes of the thin film transistors 2400a to 2400c, are formed over the insulating film 2414. Then, conductive films 2416a and 2416b which function as antennas are formed so as to be electrically connected to the conductive films 2415a and 2415b. Note that the conductive films 2416a and 2416b in FIG. 25B correspond to the first antenna circuit and the second antenna circuit shown in Embodiment Mode 1.

Next, after an insulating film 2417 is formed so as to cover the conductive films 2416a and 2416b, a layer (hereinafter referred to as an "element formation layer 2420") including the thin film transistors 2400a to 2400c, the element 2400d, the conductive films 2416a and 2416b, and the like is peeled off from the substrate 2401. As a method for peeling, any of the methods shown in the above embodiment mode can be used.

Here, as shown in FIG. 26A, after openings are formed in the element formation layer 2420 by laser light irradiation, a first sheet material 2418 is attached to one surface of the element formation layer 2420 (a surface where the insulating film 2417 is exposed), and then, the element formation layer 2420 is peeled off from the substrate 2401.

Next, as shown in FIG. 26B, after a second sheet material 2419 is attached to the other surface (a surface exposed by peeling) of the element formation layer 2420 by one or both of heat treatment and pressure treatment. As the first sheet material 2418 and the second sheet material 2419, a hot-melt film or the like can be used.

By the above-described process, the semiconductor device can be formed. Note that in this embodiment mode, the element 2400d which forms a capacitor can be used as a battery. In addition, a battery may be provided separately from the element 2400d. In this case, the battery can be provided using any of the methods shown in the above embodiment mode.

Note that the semiconductor device shown in this embodiment mode is not limited to this. For example, the conductive film which functions as the battery or the antenna may be provided below the thin film transistors 2400a to 2400c.

An example in which the battery is provided below the thin film transistors 2400a to 2400c is shown in FIGS. 28A and 28B. Here, an example, in which a conductive film 2431a is provided so as to be electrically connected to the conductive film 2413 which functions as the source electrode or drain electrode of the thin film transistor 2400b, and the conductive film 2431a and a conductive film 2433a which forms connection wiring of the battery are connected below the element formation layer 2420 (a surface where the element formation layer 2420 is peeled off from the substrate 2401 and exposed), is shown. In addition, here, an example, in which a thin film transistor is provided instead of the element 2400d which forms a capacitor; a conductive film 2433b is provided so as to be electrically connected to the conductive film 2413 which functions as the source electrode or drain electrode of the thin film transistor; and the conductive film 2433b and the conductive film 2433a which forms connection wiring of the battery are connected below the element formation layer 2420 (the surface where the element formation layer 2420 is peeled off from the substrate 2401 and exposed), is shown.

In the case of providing the thin film transistors in this manner, in FIG. 25A, since the impurity regions 2411 of the thin film transistors 2400a to 2400c are exposed, second openings are formed in the insulating films 2406 and 2407, the gate insulating film 2409, and the insulating film 2412 at the same time as first openings are formed in the gate insulating film 2409 and the insulating film 2412; the conductive film 2413 is provided so as to fill the first openings; and the conductive films 2431a and 2431b are formed so as to fill the second openings. The first openings and the second openings can be formed at the same time. When the first openings are formed, the semiconductor films 2408a to 2408c function as stoppers, and when the second openings are formed, the release layer 2403 functions as a stopper. Then, as described in FIG. 28A, the conductive films 2416a and 2416b which function as the antennas are formed, and then, the element formation layer 2420 is peeled off from the substrate 2401.

Then, as shown in FIG. 28B, the conductive films 2433a and 2433b which serve as connection wiring of the battery provided over a substrate 2432 are connected to the conductive films 2431a and 2431b provided over the exposed surface of the element formation layer 2420 which is peeled off from the substrate 2401 respectively. Here, the case where the conductive film 2431a and the conductive film 2433a, or the conductive film 2431b and the conductive film 2433b are pressure-bonded to each other via a material having an adhesive property such as an anisotropic conductive film (ACF) or an anisotropic conductive paste (ACP) so as to be electrically connected, is shown. Here, an example in which conductive particles 2435 contained in a resin 2434 having an adhesive property, is shown. In addition, connection can be performed by using a conductive adhesive agent such as a silver paste, a copper paste, or a carbon paste; by using solder bonding; or the like.

Note that in this embodiment mode, the conductive film which functions as the antenna as well as the battery may be provided below the thin film transistors 2400a to 2400c.

Figure 29A:
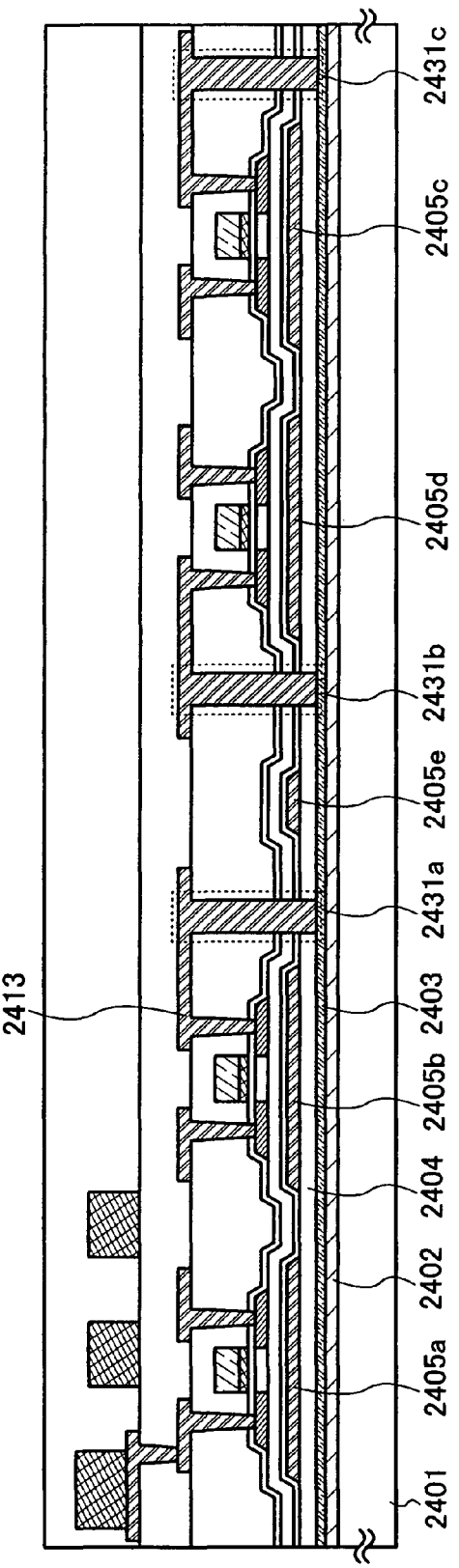
FIGS. 29A and 29B are diagrams showing a structure of a semiconductor device of Embodiment Mode 4.
Figure 29B:
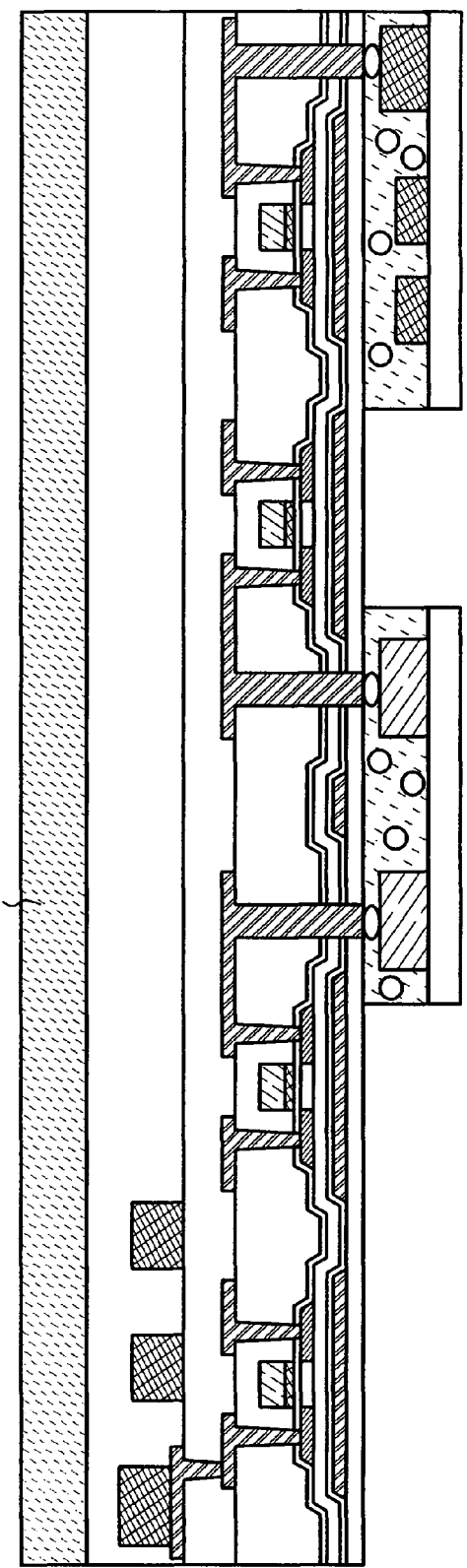

FIGS. 29A and 29B show an example in which the conductive film 2416*b* which functions as the antenna described in FIGS. 28A and 28B is provided below the thin film transistors 2400*a* to 2400*c*.

Here, an example, in which a conductive film 2431*c* is provided so as to be electrically connected to the conductive film 2413 which functions as the source electrode or drain electrode of the thin film transistor 2400*c*, and the conductive film 2431*c* and the conductive film 2416*b* which functions as the antenna are connected below the element formation layer 2420 (the surface where the element formation layer 2420 is peeled off from the substrate 2401 and exposed), is shown. In addition, an example in which the battery is also provided similarly to FIGS. 28A and 28B is shown.

In the case of providing the thin film transistor in this manner, in FIG. 25A, since the impurity regions 2411 of the thin film transistors 2400*a* to 2400*c* are exposed, the second openings are formed in the insulating films 2406 and 2407, the gate insulating film 2409, and the insulating film 2412 at the same time as the first openings are formed in the gate insulating film 2409 and the insulating film 2412; the conductive film 2413 is provided so as to fill the first openings; and the conductive films 2431*a*, 2431*b*, and 2431*c* are formed so as to fill the second openings, as shown in FIG. 29A. The first openings and the second openings can be formed at the same time. When the first openings are formed, the semiconductor films 2408*a* to 2408*c* function as stoppers, and when the second openings are formed, the release layer 2403 functions as the stopper. Then, as described in FIG. 28A, the conductive film 2416*a* which functions as the antenna is formed, and then, the element formation layer 2420 is peeled off from the substrate 2401.

Then, as shown in FIG. 29B, the conductive films 2433*a* and 2433*b* which serve as the connection wiring of the battery provided over the substrate 2432 are connected to the conductive films 2431*a* and 2431*b* provided over the exposed surface of the element formation layer 2420 which is peeled off from the substrate 2401 respectively. In addition, the conductive film 2431*c* formed over the exposed surface of the element formation layer 2420 which is peeled off from the substrate 2401 is connected to the conductive film 2416*b* which functions as the antenna provided over a substrate 2436.

In such the case where the battery and the antenna are larger than the element provided with the thin film transistors 2400*a* to 2400*c* or the like, the element formation layer and the battery or the antenna are preferably attached to each other as shown in FIGS. 28A to 29B. In the case where the battery and the antenna are larger than the element, a plurality of elements can be formed over one substrate, and the element is attached to the battery and the antenna after being separated. Therefore, the semiconductor device can be formed at low cost.

Note that this embodiment mode can be implemented freely combining with any of the above embodiment modes.

Embodiment Mode 5

This embodiment mode will describe a connection structure of the first antenna, the second antenna, the signal processing circuit, the battery, and the booster antenna in the semiconductor device shown in the above embodiment modes, with reference to drawings.

First, FIG. 33A shows a structure including a signal processing circuit 9901, an upper electrode 9902 of the signal processing circuit, a lower electrode 9903 of the signal processing circuit, a battery 9904, a side electrode 9905 of the battery, a substrate 9906, and an antenna circuit 9907. In FIG. 33A, the signal processing circuit 9901 includes the electrodes which are provided above and below the signal processing circuit 9901; the battery includes the electrode at the side portion of the battery; and the antenna circuit includes the electrode at the upper portion of the antenna circuit. In addition, the battery 9904, the signal processing circuit 9901, and the substrate 9906 having the antenna circuit are sequentially stacked.

Note that an upper portion, a lower portion, and a side portion in this embodiment mode are names for description with reference to the drawing, and in actual connection, a position of each portion may be specified and connected by comparing the shape with the drawing.

Note that the antenna circuit 9907 in this embodiment mode is referred to the first antenna circuit or the second antenna circuit described in the above embodiment modes. In addition, the antenna circuit 9907 and the signal processing circuit 9901 are connected at a terminal portion in the antenna circuit.

Further, connection between each component shown in this embodiment mode is described showing that one portion is connected to one portion. However, the actual number of connections between each component is not limited to this, and the connection shown in this embodiment mode may be performed at a plurality of positions.

Note that as a structure in which the upper electrode and the lower electrode are connected in the signal processing circuit, the structure in which electrical connection is performed at the upper portion of the transistor shown in FIG. 22B in the above embodiment mode may be used, or the structure in which electrical connection is performed at the lower portion of the transistor shown in FIG. 29B in the above embodiment mode may be used. In addition, the side electrode in which the upper electrode and the lower electrode are connected through a side surface may be formed by using a sputtering method, a plating method, or the like.

Next, FIG. 33B shows a structure which is different from that of FIG. 33A. FIG. 33B shows a structure including the signal processing circuit 9901, an upper electrode 9912 of the signal processing circuit, a side electrode 9913 of the signal processing circuit, the battery 9904, the side electrode 9905 of the battery, the substrate 9906, and the antenna circuit 9907. In FIG. 33B, the signal processing circuit 9901 includes two electrodes of the upper electrode connected to the battery side and the side electrode 9913 which extends from the battery side to the substrate side so as to surround the side surface of the signal processing circuit; the battery includes the electrode at the side portion of the battery; and the antenna circuit includes the electrode at the upper portion of the antenna circuit. In addition, the battery 9904, the signal processing circuit 9901, and the substrate 9906 having the antenna circuit are sequentially stacked.

Next, FIG. 33C shows a structure which is different from those of FIGS. 33A and 33B. FIG. 33C shows a structure including the signal processing circuit 9901, the upper electrode 9902 of the signal processing circuit, the battery 9904, the side electrode 9905 of the battery, the substrate 9906, and a booster antenna 9909. In FIG. 33C, the signal processing circuit 9901 includes the upper electrode connected to the battery side; the battery includes the electrode at the side portion of the battery; and the booster antenna includes an electrode at the upper portion of the booster antenna. In addition, the battery 9904, the signal processing circuit 9901, and the substrate 9906 having the booster antenna are sequentially stacked.

Unlike the structures shown in FIGS. 33A and 33B, FIG. 33C shows a structure in which the first antenna circuit and the second antenna circuit which are described in the above embodiment modes are provided with the signal processing circuit.

Next, FIG. 33D shows a structure which is different from those of FIGS. 33A to 33C. FIG. 33D shows a structure including the signal processing circuit 9901, the upper electrode 9902 of the signal processing circuit, the lower electrode 9903 of the signal processing circuit, the battery 9904, a lower electrode 9915 of the battery, the substrate 9906, and the antenna circuit 9907. In FIG. 33D, the signal processing circuit 9901 includes the electrodes which are provided above and below the signal processing circuit 9901; the battery includes the electrode at the lower portion of the battery; and the antenna circuit includes the electrode at the upper portion of the antenna circuit. In addition, the battery 9904, the signal processing circuit 9901, and the substrate 9906 having the antenna circuit are sequentially stacked.

Next, FIG. 33E shows a structure which is different from those of FIGS. 33A to 33D. FIG. 33E shows a structure including the signal processing circuit 9901, the upper electrode 9912 of the signal processing circuit, the side electrode 9913 of the signal processing circuit, the battery 9904, the lower electrode 9915 of the battery, the substrate 9906, and the antenna circuit 9907. In FIG. 33E, the signal processing circuit 9901 includes two electrodes of the upper electrode connected to the battery side and the side electrode 9913 which extends from the battery side to the substrate side so as to surround the side surface of the signal processing circuit; the battery includes the electrode at the lower portion of the battery; and the antenna circuit includes the electrode at the upper portion of the antenna circuit. In addition, the battery 9904, the signal processing circuit 9901, and the substrate 9906 having the antenna circuit are sequentially stacked.

Next, FIG. 33F shows a structure which is different from those of FIGS. 33A to 33E. FIG. 33F shows a structure including the signal processing circuit 9901, the upper electrode 9902 of the signal processing circuit, the battery 9904, the lower electrode 9915 of the battery, the substrate 9906, and the booster antenna 9909. In FIG. 33F, the signal processing circuit 9901 includes the upper electrode connected to the battery side; the battery includes the electrode at the lower portion of the battery; and the booster antenna includes the electrode at the upper portion of the booster antenna. In addition, the battery 9904, the signal processing circuit 9901, and the substrate 9906 having the booster antenna are sequentially stacked.

Unlike the structures shown in FIGS. 33A, 33B, 33D, and 33E, FIG. 33F shows a structure in which the first antenna circuit and the second antenna circuit which are described in the above embodiment modes are provided with the signal processing circuit.

As described above, the antenna circuit, the signal processing circuit, the battery, and the booster antenna in this embodiment mode can be connected in various ways. By using any of the structures shown in FIGS. 33A to 33F, the antenna circuit, the signal processing circuit, and the battery can be directly connected; therefore, wiring is not required to be extended to the outer periphery of the substrate to perform connection. In addition, when the sizes of the antenna circuit, the signal processing circuit, and the battery are adjusted as appropriate, a semiconductor device including an RFID can be made smaller, which is preferable.

Note that this embodiment mode can be implemented freely combining with any of the above embodiment modes.

Embodiment Mode 6

This embodiment mode will describe applications of a semiconductor device of the present invention which communicates data by wireless communication (hereinafter referred to an RFID). The semiconductor device of the present invention can be used as a so-called ID label, ID tag, or ID card, which is incorporated in, for example, bills, coins, securities, bearer bonds, certificates (driving licenses, resident cards, and the like), containers for wrapping objects (wrapping paper, bottles, and the like), recording media (DVD software, video tapes, and the like), vehicles (bicycles and the like), personal belongings (bags, glasses, and the like), foods, plants, animals, human bodies, clothes, commodities, products such as electronic devices, or shipping tags of baggage, and the like. The electronic devices include a liquid crystal display device, an EL display device, a television set (also simply called a television, a TV receiver, or a television receiver), a mobile phone, and the like.

This embodiment mode will describe an application of the present invention and an example of an article provided with it with reference to FIGS. 30A to 30E.

Figure 30A:
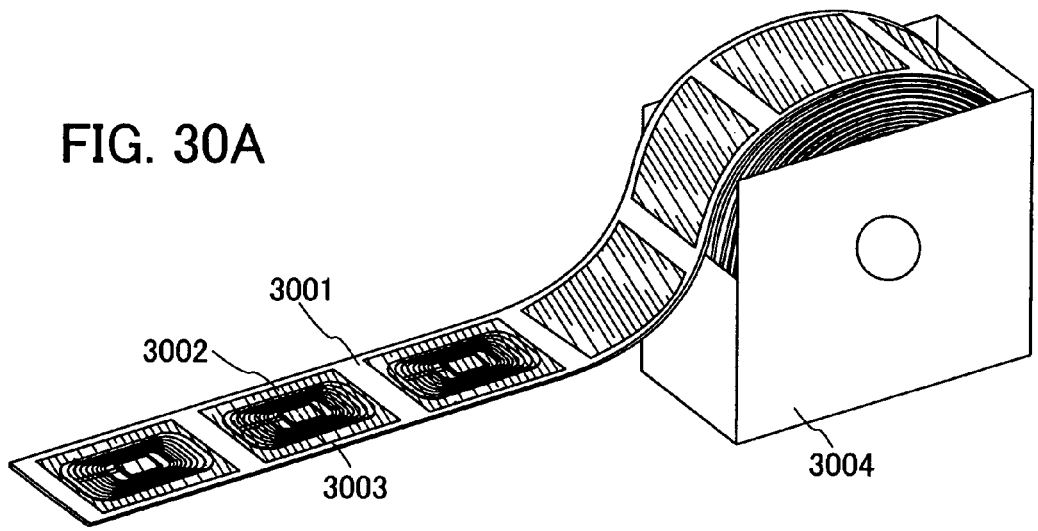
FIGS. 30A to 30E are views each showing a mode of an embodiment mode.

FIG. 30A shows an example of a state of completed products of a semiconductor device including an RFID of the present invention. On a label board (separate paper) 3001, a plurality of ID labels 3003 each incorporating an RFID 3002 are formed. The ID labels 3003 are put in a box 3004. In addition, on the ID label 3003, information on a commercial product or service (for example, a name of the product, a brand, a trademark, a trademark owner, a seller, a manufacturer, and the like) is written, while an ID number that is unique to the commercial product (or the kind of the commercial product) is assigned to the incorporated RFID to make it possible to easily figure out forgery, infringement of intellectual property rights such as a patent and a trademark, and illegality such as unfair competition. In addition, a lot of information that is too much to write clearly on a container of the commercial product or the label, for example, the production area, selling area, quality, raw material, efficacy, use, quantity, shape, price, production method, directions for use, time of the production, time of the use, expiration date, instructions of the commercial product, information on the intellectual property of the commercial product and the like can be inputted to the RFID so that a trader and a consumer can access the information by using a simple reader. While the producer can also easily rewrite or delete the information, or the like, a trader or consumer is not allowed to rewrite or delete the information, or the like.

Figure 30B:
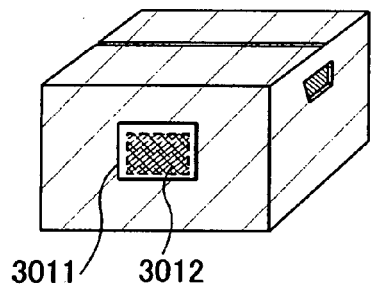

FIG. 30B shows a label-shaped ID tag 3011, which has an RFID 3012 incorporated. By mounting the ID tag 3011 on commercial products, the management of the commercial products becomes easier. For example, movement of the commercial product can be obtained by tracing the pathway of the commercial product. In this manner, by providing the ID tag, commercial products that are superior in so-called traceability can be distributed.

Figure 30C:
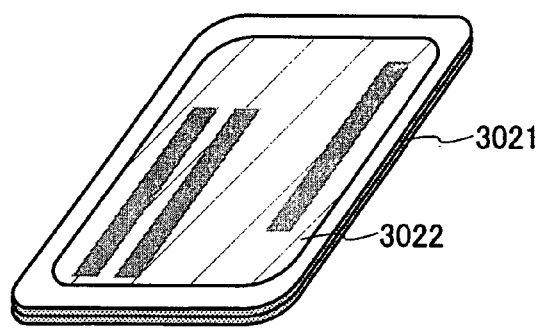

FIG. 30C shows an example of a state of a completed product of an ID card 3021 including an RFID 3022 of the present invention. The ID card 3021 includes all kinds of cards such as a cash card, a credit card, a prepaid card, an electronic ticket, electronic money, a telephone card, and a membership card.

Figure 30D:

FIG. 30D shows a state of a completed product of a bearer bond 3031. The bearer bond 3031 has an RFID 3032 incorporated, and a resin is molded at the periphery thereof to protect the RFID, where a filler is included in the resin. The bearer bond 3031 can be made in the same way as an ID label, an ID tag, or an IC card of the present invention. The bearer bonds include stamps, tickets, admission tickets, merchandise coupons, book coupons, stationery coupons, beer coupons, rice coupons, various gift coupons, various service coupons, and the like; needless to say, the invention is not limited to these. In addition, the RFID 3032 of the present invention can be provided in bills, coins, securities, bearer bonds, certificates, or the like, so that an authentication function can be provided. In addition, when the authentication function is used, forgery of them can be prevented.

Figure 30E:
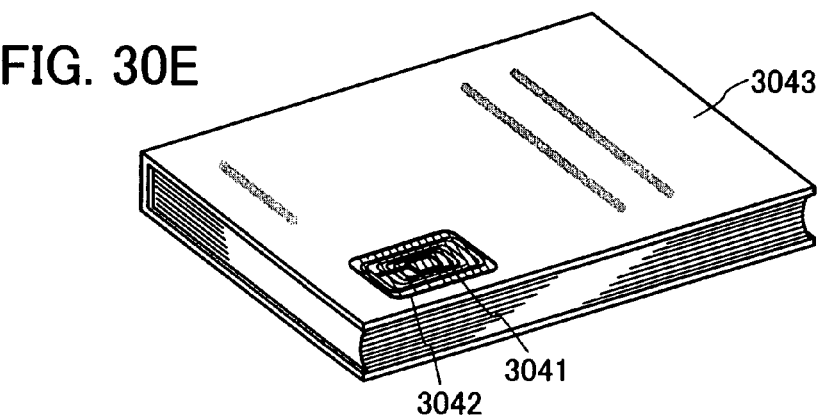
Figure 31:
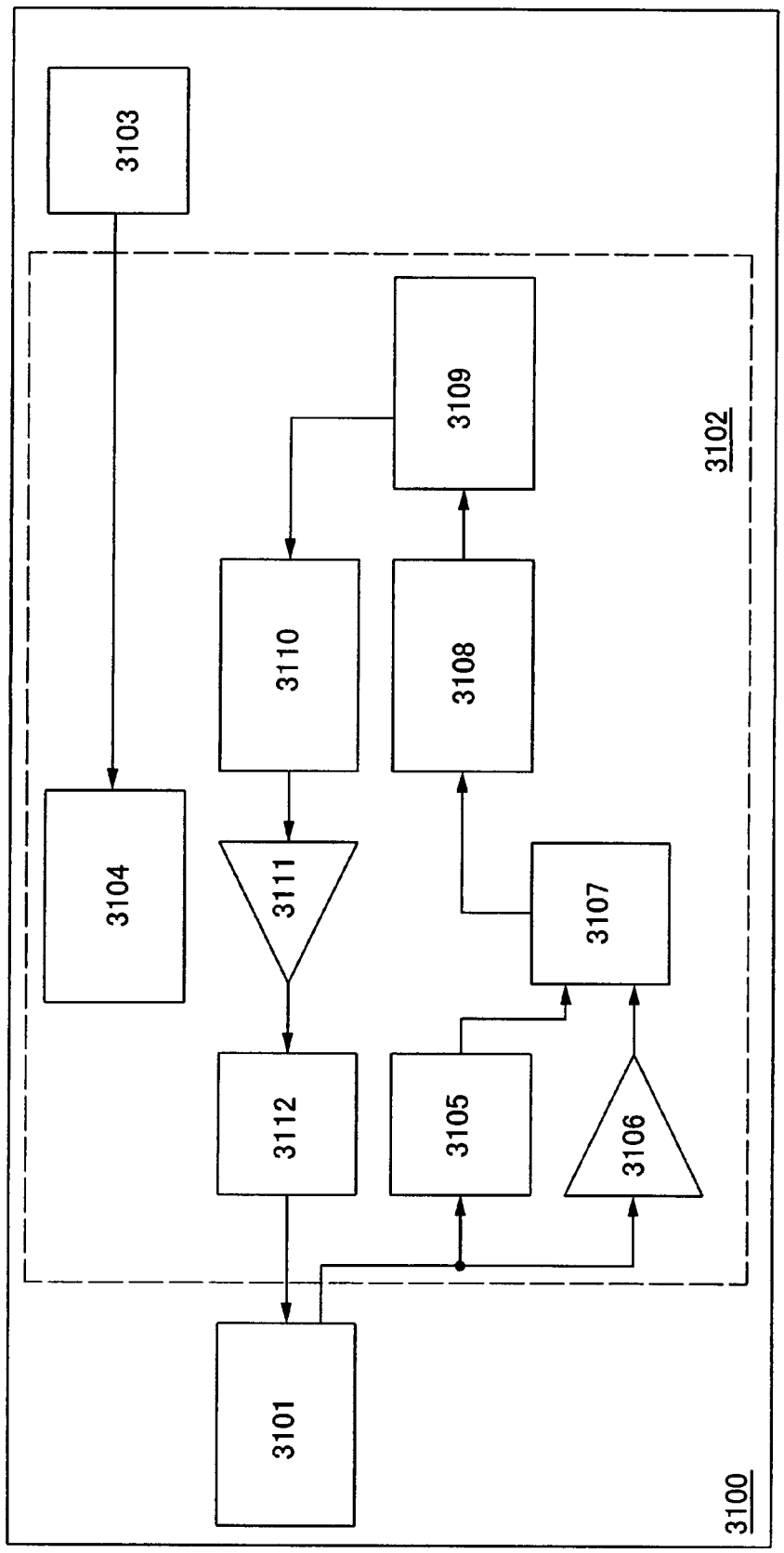
FIG. 31 is a diagram showing a conventional structure.
Figure 32:
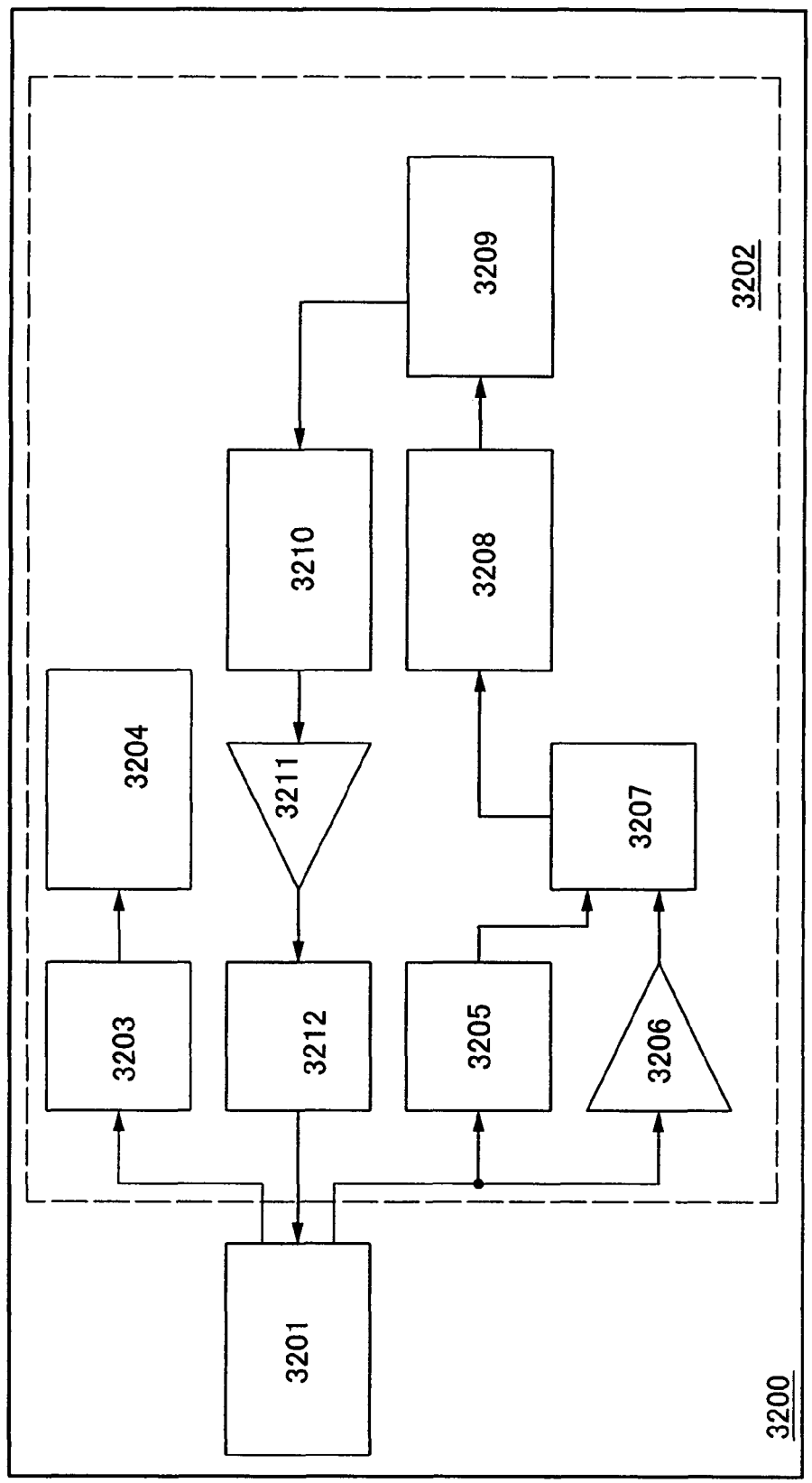
FIG. 32 is a diagram showing a conventional structure.

FIG. 30E shows a book 3043 to which an ID label 3041 including an RFID 3042 of the present invention is attached. The RFID 3042 of the present invention is fixed on goods by being attached to a surface of the goods or incorporated in the goods. As shown in FIG. 30E, the RFID 3042 is fixed on each of the goods such that the RFID 3042 is fixed on a book by being embedded in paper, or the RFID 3042 is fixed on a packaging case made of an organic resin by being embedded in the organic resin. The RFID 3042 of the present invention is small, thin, and lightweight; therefore, design of goods is not damaged after the RFID 3042 is fixed on the goods.

Although not shown here, when the RFID of the present invention is equipped for containers for wrapping objects, recording media, personal belongings, foods, clothes, livingware, electronic devices, and the like, inspection system or the like can be performed more efficiently. The RFID also prevents vehicles from being forged or stolen by being provided in vehicles. In addition, when the RFID is implanted into creatures such as animals, each creature can be identified easily. For example, when the RFID is implanted into creatures such as domestic animals, the year of birth, sex, breed and the like can be easily identified.

As described above, the RFID of the present invention can be provided in any goods (including creatures) and used.

This embodiment mode can be implemented freely combining with any of the above embodiment modes.

This application is based on Japanese Patent Application serial No. 2006-066808 filed in Japan Patent Office on Mar. 10, 2006, the entire contents of which are hereby incorporated by reference.

EXPLANATION OF REFERENCE

100: RFID, 101: antenna circuit, 102: antenna circuit, 103: signal processing circuit, 104: battery, 105: rectifier circuit, 106: power supply circuit, 107: rectifier circuit, 108: demodulation circuit, 109: amplifier, 110: logic circuit, 111: memory control circuit, 112: memory circuit, 113: logic circuit, 114: amplifier, 115: modulation circuit, 201: reader/writer, 202: charger, 301: substrate, 302: signal processing circuit, 303: antenna, 401: antenna, 402: resonant capacitor, 403: antenna circuit, 404: diode, 405: diode, 406: smoothing capacitor, 407: rectifier circuit, 500: reader/writer, 501: receiving portion, 502: transmitting portion, 503: control portion, 504: interface portion, 505: antenna circuit, 506: higher-level device, 507: antenna, 508: resonant capacitor, 600: charger, 601: transmission control portion, 602: antenna circuit, 603: antenna, 604: resonant capacitor, 700: RFID, 701: antenna circuit, 702: antenna circuit, 703: transmission control portion, 704: antenna circuit, 705: antenna, 800: RFID, 801: antenna circuit, 900: RFID, 901: antenna circuit, 902: antenna circuit, 1001: resistor, 1002: transistor, 1003: transistor, 1004: current supply resistor, 1005: transistor, 1006: transistor, 1007: transistor, 1008: transistor, 1009: transistor, 1010: resistor, 1101: antenna circuit, 1102: antenna circuit, 1104: battery, 1201: booster antenna, 1600: RFID, 1601: antenna circuit, 1602: antenna circuit, 1603: booster antenna, 1604: transmission control portion, 1605: antenna circuit, 1606: antenna, 1801: antenna circuit, 1802: antenna circuit, 1804: battery, 1805: booster antenna, 1901: substrate, 1902: insulating film, 1903: release layer, 1904: insulating film, 1905: semiconductor film, 1906: gate insulating film, 1907: gate electrode, 1908: impurity region, 1909: impurity region, 1910: insulating film, 1911: impurity region, 1913: conductive film, 1914: insulating film, 1918: insulating film, 1919: element formation layer, 1920: sheet material, 1921: sheet material, 1937: resin, 1938: conductive particle, 2401: substrate, 2402: insulating film, 2403: release layer, 2404: insulating film, 2405: conductive film, 2406: insulating film, 2407: insulating film, 2409: gate insulating film, 2410: gate electrode, 2411: impurity region, 2412: insulating film, 2413: conductive film, 2414: insulating film, 2417: insulating film, 2418: sheet material, 2419: sheet material, 2420: element formation layer, 2432: substrate, 2434: resin, 2435: conductive particle, 2436: substrate, 3001: label board, 3002: RFID, 3003: ID label, 3004: box, 3011: ID tag, 3012: RFID, 3021: ID card, 3022: RFID, 3031: bearer bond, 3032: RFID, 3041: ID label, 3042: RFID, 3043: book, 3100: RFID, 3101: antenna circuit, 3102: signal processing circuit, 3103: cell, 3104: power supply circuit, 3105: demodulation circuit, 3106: amplifier, 3107: logic circuit, 3108: memory control circuit, 3109: memory circuit, 3110: logic circuit, 3111: amplifier, 3112: modulation circuit, 3200: RFID, 3201: antenna circuit, 3202: signal processing circuit, 3203: rectifier circuit, 3204: power supply circuit, 3205: demodulation circuit, 3206: amplifier, 3207: logic circuit, 3208: memory control circuit, 3209: memory circuit, 3210: logic circuit, 3211: amplifier, 3212: modulation circuit, 1103A: signal processing circuit, 11036: signal processing circuit, 1803A: signal processing circuit, 18036: signal processing circuit, 1900a: thin film transistor, 1900b: thin film transistor, 1900c: thin film transistor, 1900d: thin film transistor, 1900e: thin film transistor, 1900f: thin film transistor, 1905a: semiconductor film, 1905b: semiconductor film, 1905c: semiconductor film, 1905d: semiconductor film, 1905e: semiconductor film, 1905f: semiconductor film, 1907a: conductive film, 1907b: conductive film, 1912a: insulating film, 1912b: insulating film, 1915a: conductive film, 1915b: conductive film, 1916a: conductive film, 1916b: conductive film, 1917a: conductive film, 1917b: conductive film, 1931a: conductive film, 1931b: conductive film, 1932a: opening, 1932b: opening, 1934a: conductive film, 1934b: conductive film, 1935a: substrate, 1935b: substrate, 1936a: conductive film, 1936b: conductive film, 2400a: thin film transistor, 2400b: thin film transistor, 2400c: thin film transistor, 2400d: element, 2405a: conductive film, 2405b: conductive film, 2405c: conductive film, 2405d: conductive film, 2405e: conductive film, 2408a: semiconductor film, 2408b: semiconductor film, 2408c: semiconductor film, 2408d, semiconductor film, 2410a: conductive film, 2410b conductive film, 2415a: conductive film, 2415b: conductive film, 2416a: conductive film, 2416b: conductive film 2431a: conductive film, 2431b: conductive film, 2431c: conductive film, 2433a: conductive film, 2433b: conductive film, 9901: signal processing circuit 9902: upper electrode, 9903: lower electrode, 9904: battery, 9905: side electrode, 9906: substrate,

9907: antenna circuit, 9909: booster antenna, 9912: upper electrode, 9913: side electrodes, and 9915: lower electrode.

The invention claimed is:

1. A semiconductor device comprising:
   a booster antenna;
   a signal processing circuit on a first surface of an insulating film;
   a battery on a second surface of the insulating film opposite to the first surface of the insulating film;
   a first antenna circuit configured to receive a first signal through the booster antenna and transmit a second signal for transmitting data stored in the signal processing circuit through the booster antenna; and
   a second antenna circuit configured to receive a third signal for charging the battery.

2. A semiconductor device comprising:
   a booster antenna;
   a signal processing circuit on a first surface of an insulating film;
   a battery on a second surface of the insulating film opposite to the first surface of the insulating film;
   a first antenna circuit configured to receive a first signal and transmit a second signal for transmitting data stored in the signal processing circuit; and
   a second antenna circuit configured to receive a third signal for charging the battery through the booster antenna.

3. A semiconductor device according to claim 1,
   wherein the second antenna circuit is configured to receive the third signal for charging the battery from a charger comprising an antenna circuit through the booster antenna.

4. A semiconductor device according to claim 1,
   wherein the first antenna circuit is configured to receive the first signal and transmit the second signal for transmitting the data stored in the signal processing circuit between a reader/writer and the first antenna circuit through the booster antenna.

5. A semiconductor device according to claim 2,
   wherein the first antenna circuit is configured to receive the first signal and transmit the second signal for transmitting the data stored in the signal processing circuit between a reader/writer and the first antenna circuit, and
   wherein the second antenna circuit is configured to receive the third signal for charging the battery from a charger comprising an antenna circuit through the booster antenna.

6. A semiconductor device according to claim 2,
   wherein the first antenna circuit is configured to receive the first signal and transmit the second signal for transmitting the data stored in the signal processing circuit between a reader/writer and the first antenna circuit through the booster antenna, and
   wherein the second antenna circuit is configured to receive the third signal for charging the battery from a charger including comprising an antenna circuit through the booster antenna.

7. The semiconductor device according to any one of claims 1 to 6,
   wherein the signal processing circuit comprises a power supply circuit, and
   wherein the battery is configured to supply power to the power supply circuit.

8. The semiconductor device according to any one of claims 1 to 6, wherein each of the first antenna circuit and the second antenna circuit is configured to transmit and receive a radio signal by an electromagnetic induction method.

9. A semiconductor device comprising:
   a first antenna circuit;
   a second antenna circuit;
   a signal processing circuit;
   a battery; and
   a booster antenna,
   wherein the booster antenna and at least one of the first antenna circuit and the second antenna circuit are formed on a first surface of an insulating film,
   wherein the battery is formed on a second surface of the insulating film,
   wherein the first antenna circuit is configured to receive a first signal and transmit a second signal for transmitting data stored in the signal processing circuit; and
   wherein the second antenna circuit is configured to receive a third signal for charging the battery.

10. A semiconductor device according to claim 9,
    wherein the first antenna circuit is configured to receive the first signal and transmit the second signal for transmitting the data stored in the signal processing circuit between a reader/writer and the first antenna circuit, and
    wherein the second antenna circuit is configured to receive the third signal for charging the battery from a charger comprising an antenna circuit.

11. The semiconductor device according to any one of claims 1-6, 9 and 10, wherein the battery comprises one selected from a lithium cell, a nickel metal hydride cell, a nickel cadmium cell, and a capacitor.

12. A semiconductor device comprising:
    a booster antenna;
    a signal processing circuit;
    a battery;
    a first antenna circuit to receive a first signal through the booster antenna and transmit a second signal for transmitting data stored in the signal processing circuit through the booster antenna; and
    a second antenna circuit to receive a third signal for charging the battery,
    wherein the second antenna circuit is operationally connected to the battery through the signal processing circuit, further comprising:
    a first substrate;
    a second substrate opposed to the first substrate;
    the first and second antenna circuits and the signal processing circuit comprising first and second signal processing circuits over the first substrate;
    the booster antenna under the second substrate;
    wherein a portion of the battery is located between the booster antenna and one of the first and second antenna circuits.

13. A semiconductor device according to claim 1,
    wherein the battery is electrically connected to the signal processing circuit through an opening formed in the insulating film.

14. A semiconductor device according to claim 2,
    wherein the battery is electrically connected to the signal processing circuit through an opening formed in the insulating film.

15. A semiconductor device according to claim 9,
    wherein the battery is electrically connected to the signal processing circuit through an opening formed in the insulating film.

* * * * *

UNITED STATES PATENT AND TRADEMARK OFFICE
CERTIFICATE OF CORRECTION

PATENT NO. : 8,232,880 B2
APPLICATION NO. : 11/716018
DATED : July 31, 2012
INVENTOR(S) : Shunpei Yamazaki et al.

Page 1 of 1

It is certified that error appears in the above-identified patent and that said Letters Patent is hereby corrected as shown below:

At column 8, line 51, "m≅M" should be --m≠M--;

At column 18, line 62, "YAG; $Y_2O_3$" should be --YAG, $Y_2O_3$--;

At column 19, line 5, "100 MW/cm" should be --100 $MW/cm^2$--;

At column 37, line 56, "including comprising" should be --comprising--.

Signed and Sealed this
Ninth Day of October, 2012

David J. Kappos
*Director of the United States Patent and Trademark Office*